US009516373B1

(12) United States Patent
Abecassis et al.

(10) Patent No.: US 9,516,373 B1
(45) Date of Patent: Dec. 6, 2016

(54) PRESETS OF SYNCHRONIZED SECOND SCREEN FUNCTIONS

(71) Applicants: Max Abecassis, Boca Raton, FL (US); Ryan M. Donahue, Boynton Beach, FL (US)

(72) Inventors: Max Abecassis, Boca Raton, FL (US); Ryan M. Donahue, Boynton Beach, FL (US)

(*) Notice: Subject to any disclaimer, the term of this patent is extended or adjusted under 35 U.S.C. 154(b) by 0 days.

(21) Appl. No.: 14/977,548

(22) Filed: Dec. 21, 2015

(51) Int. Cl.
*H04H 60/32* (2008.01)
*H04N 21/43* (2011.01)
*H04N 21/232* (2011.01)
*H04N 21/439* (2011.01)
*H04N 21/478* (2011.01)
*H04N 21/4722* (2011.01)
*H04N 21/81* (2011.01)
*H04N 21/435* (2011.01)
*H04N 21/41* (2011.01)

(52) U.S. Cl.
CPC ........ *H04N 21/4307* (2013.01); *H04N 21/232* (2013.01); *H04N 21/4122* (2013.01); *H04N 21/435* (2013.01); *H04N 21/4394* (2013.01); *H04N 21/4722* (2013.01); *H04N 21/4781* (2013.01); *H04N 21/8133* (2013.01)

(58) Field of Classification Search
CPC ........... H04H 60/58; H04N 21/44008; H04N 21/4307
See application file for complete search history.

(56) References Cited

U.S. PATENT DOCUMENTS

| 4,181,813 A | 1/1980 | Marley |
| 4,903,305 A | 2/1990 | Gillick et al. |
| 5,596,705 A | 1/1997 | Reimer et al. |
| 5,809,471 A | 9/1998 | Brodsky |
| 5,909,667 A | 6/1999 | Leontiades et al. |
| 6,263,505 B1 | 7/2001 | Walker et al. |
| 6,408,128 B1 | 6/2002 | Abecassis |
| 6,480,823 B1 | 11/2002 | Zhao et al. |
| 6,577,346 B1 | 6/2003 | Perlman |
| 6,889,383 B1 | 5/2005 | Jarman |
| 6,990,453 B2 | 1/2006 | Wang et al. |
| 7,194,752 B1 | 3/2007 | Kenyon et al. |
| 7,430,360 B2 | 9/2008 | Abecassis |
| 7,627,477 B2 | 12/2009 | Wang et al. |
| 7,698,131 B2 | 4/2010 | Bennett |
| 7,899,915 B2 | 3/2011 | Reisman |
| 7,907,211 B2 | 3/2011 | Oostveen et al. |
| 7,975,021 B2 | 7/2011 | Jarman et al. |
| 8,009,861 B2 | 8/2011 | Lu et al. |
| 8,117,282 B2 | 2/2012 | Jarman et al. |

(Continued)

OTHER PUBLICATIONS

"Amazon announces X-Ray for Movies, a Kindle feature that uses IMDB to name the actors for you" by Dana Wollman, http://www.engadget.com/2012/09/06/amazon-announces-x-ray-for-movies-a-kindle-feature-that-uses-im/ Downloaded Oct. 29, 2014.

(Continued)

*Primary Examiner* — Sumaiya A Chowdhury

(57) ABSTRACT

A method comprising the steps of: generating an acoustic fingerprint that is responsive to a playing of a movie on a primary screen device; searching, responsive to the acoustic fingerprint, an acoustic database; identifying, responsive to the searching of the acoustic database, a location within the movie; displaying an information item that is responsive to the identified location within the movie, a predefined playing time separation from a previous display of an information item, and a selecting of information items of each of a plurality of movie related information functions, the selecting being disproportionately in favor of at least one of the plurality of movie related information functions.

20 Claims, 16 Drawing Sheets

(56) References Cited

U.S. PATENT DOCUMENTS

| | | | |
|---|---|---|---|
| 8,150,165 B2 | 4/2012 | Melikian | |
| 8,374,387 B2 | 2/2013 | Lienhart et al. | |
| 8,402,500 B2 | 3/2013 | Walker et al. | |
| 8,424,037 B2 | 4/2013 | Landow et al. | |
| 8,452,586 B2 | 5/2013 | Master et al. | |
| 8,494,346 B2 | 7/2013 | Abecassis | |
| 8,516,528 B2 | 8/2013 | Sandoval et al. | |
| 8,516,533 B2 | 8/2013 | Davis et al. | |
| 8,645,991 B2 | 2/2014 | McIntire et al. | |
| 8,686,271 B2 | 4/2014 | Wang et al. | |
| 8,738,367 B2 | 5/2014 | Emori | |
| 8,856,004 B2 | 10/2014 | Basson et al. | |
| 9,043,845 B2* | 5/2015 | Davis | H04N 21/458 725/62 |
| 9,161,066 B1* | 10/2015 | Oztaskent | H04N 21/24 |
| 9,185,458 B2* | 11/2015 | Jacoby | H04N 21/4351 |
| 9,195,650 B2 | 11/2015 | Basson et al. | |
| 2002/0039481 A1 | 4/2002 | Jun et al. | |
| 2003/0037068 A1 | 2/2003 | Thomas et al. | |
| 2003/0093790 A1 | 5/2003 | Logan et al. | |
| 2003/0151621 A1 | 8/2003 | McEvilly et al. | |
| 2003/0206710 A1 | 11/2003 | Ferman et al. | |
| 2004/0196570 A1 | 10/2004 | Nurishi | |
| 2005/0008328 A1 | 1/2005 | Kawa et al. | |
| 2006/0051063 A1 | 3/2006 | Kim et al. | |
| 2006/0149552 A1* | 7/2006 | Bogdanov | G10L 25/48 704/273 |
| 2007/0250848 A1 | 10/2007 | Gorti et al. | |
| 2007/0250901 A1 | 10/2007 | McIntire et al. | |
| 2008/0022300 A1 | 1/2008 | Angiolillo et al. | |
| 2009/0102848 A1 | 4/2009 | Park et al. | |
| 2009/0305677 A1* | 12/2009 | Ellison | H04H 60/13 455/414.1 |
| 2009/0327894 A1 | 12/2009 | Rakib et al. | |
| 2011/0289532 A1 | 11/2011 | Yu et al. | |
| 2012/0123780 A1 | 5/2012 | Gao et al. | |
| 2012/0151509 A1 | 6/2012 | McCarthy et al. | |
| 2012/0210349 A1 | 8/2012 | Campana et al. | |
| 2012/0311649 A1 | 12/2012 | Patten et al. | |
| 2013/0007793 A1 | 1/2013 | Anthru et al. | |
| 2013/0014155 A1 | 1/2013 | Clarke et al. | |
| 2013/0061267 A1 | 3/2013 | Cansino et al. | |
| 2013/0097643 A1 | 4/2013 | Stone et al. | |
| 2013/0111514 A1 | 5/2013 | Slavin et al. | |
| 2013/0124371 A1 | 5/2013 | Mehta et al. | |
| 2013/0151534 A1 | 6/2013 | Luks et al. | |
| 2013/0188927 A1 | 7/2013 | Seryakov et al. | |
| 2013/0205212 A1* | 8/2013 | Sinha | G06T 1/0021 715/719 |
| 2013/0251337 A1 | 9/2013 | Abecassis | |
| 2013/0343721 A1 | 12/2013 | Abecassis | |
| 2014/0071342 A1 | 3/2014 | Winograd | |
| 2014/0215545 A1 | 7/2014 | Lian et al. | |
| 2014/0219630 A1 | 8/2014 | Minder | |
| 2014/0219633 A1 | 8/2014 | Chiu et al. | |
| 2014/0380167 A1 | 12/2014 | Bloch et al. | |
| 2015/0037003 A1 | 2/2015 | Fastige | |
| 2015/0037006 A1 | 2/2015 | Tapper | |
| 2015/0086174 A1 | 3/2015 | Abecassis et al. | |
| 2015/0093093 A1 | 4/2015 | Abecassis | |
| 2015/0110458 A1 | 4/2015 | Abecassis et al. | |

OTHER PUBLICATIONS

"Google Play Movies 'Info Cards' Feature Rolled-Out to All Countries" by Hitesh Arora, Jun. 4, 2014, http://gadgets.ndtv.com/apps/news/google-play-movies-info-cards-feature-rolled-out-to-all-countries-536097 Downloaded Oct. 29, 2014.

"IMDb Movies & TV" by IMDb, https://itunes.apple.com/us/app/imdb-movies-tv/id342792525?mt=8 Downloaded Oct. 29, 2014.

"Apple releases iTunes 11.3, including all-new iTunes Extras for HD movies for Mac and Apple TV" by Christian Zibreg, Jul. 10, 2014. http://www.idownloadblog.com/2014/07/10/itunes-11-3-itunes-extras/ Downloaded Oct. 29, 2014.

"RunPee App Ensures You'll Never Miss Big Scenes at the Movies" by Kate Freeman, Oct. 25, 2012, http://mashable.com/2012/10/25/runpee/ Downloaded Oct. 29, 2014.

"What is Xbox SmartGlass?" by Casey Chan, http://gizmodo.com/5915553/what-is-xbox-smartglass Downloaded Oct. 29, 2014, http://gizmodo.com/5915553/what-is-xbox-smartglass Downloaded Oct. 29, 2014.

"X-Men Movies Cerebro" by Fox Digital Entertainment, Inc., https://itunes.apple.com/us/app/x-men-movies-cerebro/id869718796?mt=8 Downloaded Oct. 29, 2014.

"Scene It?" Wikipedia http://en.wikipedia.org/wiki/Scene_It%3F Downloaded Nov. 3, 2014.

* cited by examiner

PRESETS OF SYNCHRONIZED SECOND SCREEN FUNCTIONS

FIELD OF THE INVENTIONS

Systems and methods for selectively displaying, on a second screen device, movie related information from each of a plurality of information functions, and for synchronizing the displaying on the second screen device with a playing of the movie on a primary screen device.

BRIEF SUMMARY OF THE INVENTIONS

The present inventions relate to systems and methods for displaying movie related information on a second screen device (e.g., a remote web server that processes API requests from a user's device, a website server, a smartphone, a tablet, a hybrid, a laptops, and a computing communications device) comprising processing, memory, and communications capabilities required to fully operate the application's various functions and methodologies and capable of displaying information and features of the application's movie related functions (e.g., dilemmas, filmmaking, locations, music, plot info, quotes, food recipes, shopping, superfans, trivia, vehicles & weapons identification, and performer/character identification) in synchronization with a playing of a movie on a primary screen device (e.g., television, monitor).

Accordingly, it is an object of the present inventions to display on a device information items and features of each of a plurality of an application's movie related functions (e.g., dilemmas, filmmaking, locations, music, plot info, quotes, food recipes, shopping, superfans, trivia, vehicles & weapons identification, and performer/character identification) in synchronization with a playing of a movie on the same device or on second device.

It is also an object of the present inventions to synergistically integrate in a device a playing of a movie and the synchronized display of information and/or features of each of a plurality of an application's movie related functions.

It is also an object of the present inventions to synergistically integrate in a device a playing of a movie and the synchronized display of information and/or features responsive to a presets that are each responsive to a pre-established selection among the plurality of movie related functions, options within the functions, categories, and subcategories.

It is also an object of the present inventions to associate a character profile with at least one pre-established selection of the plurality of movie related functions, options within the functions, categories, and subcategories.

It is also an object of the present inventions to, in synchronization with a playing of a movie, to display information and/or features of one of a plurality of an application's functions responsive to either an on-demand methodology or a notify methodology.

It is also an object of the present inventions to display shopping information items that are responsive to a user's pre-established preferences for categories of shopping items (e.g., clothing & accessories, electronics & entertainment, home & office, references & unexpected, toys & games, misc, vehicles, and weapons & gear) and subcategories of shopping items (e.g., in the weapons & gear category, subcategories comprises firearms & accessories, futuristic weapons, non-lethal weapons, other weapons & accessories, and tactical gear; and in the references & unexpected category, subcategories comprises references, and unexpected).

It is also an object of the present inventions to display trivia items that are responsive to a user's pre-established preferences for categories of trivia items such as movie questions (e.g., questions relating to a single movie), general questions (e.g., questions relating to general movie knowledge, polls (e.g., movie related polling questions), and write-ups (e.g., presentation of trivia factoids).

Briefly, these and other objects are enabled by systems for, and methods of, for example, analyzing a movie to identify item information opportunities, such as locations, trivia, and dilemmas; and creating a movie map comprising notification points in a movie, and movie related information comprising descriptors, write-ups, video frame identifications, and website links to support the applications various functions (e.g., dilemmas, filmmaking, locations, music, plot info, quotes, food recipes, shopping, superfans, trivia, vehicles & weapons identification, and performer/character identification) in each of a plurality of presentation modes (e.g., Sync, Lists, and Games modes).

The application and application databases and images are utilized by and/or downloaded to systems such as a remote web server that processes API requests from a user's device, website server, smartphone, tablet, hybrid device, laptops, and computing communications device comprising processing, memory, communications, and a display. Individual movie maps are utilized as a user specifically requests them. Function features and information are displayed according to the user's selected mode, activated functions, and preferences.

Sync mode provides the opportunity, while viewing the movie, to access the functions via on-demand and notification methodologies. Lists mode provides the opportunity, independently of viewing the movie, to access a list of the items available in each of the functions. Games mode provides the opportunity, independently of viewing the movie, to play dilemma, movie master, trivia, music, and food recipe games. For example, in Sync mode, a user may select among pre-established subsets of the plurality of the application's movie related sync functions (e.g., dilemmas, filmmaking, locations, plot info, food recipes, shopping, superfans, and trivia) and the options available for some of the functions (e.g., men's fashions category in the shopping function). Pre-established subsets are each associated with a preset identifier (e.g., character name and icon). Advantageously, the pre-set identifier suggests to the user the profile of the particular combination of functions, options within the functions, categories, and subcategories that are associated with the preset identifier.

The synchronized display of features and information of a function on a second screen device with a movie playing on a primary screen device are enhanced by the implementation of conceptually differentiated and complementary synchronization methodologies that are synergistically integrated to provide a more effective identification of a play location within the movie. Each methodology being responsive and tuned to different characteristics of the audio provided by the movie. An exemplary synergistic combination of methodologies comprises the steps of: generating an acoustic fingerprint that is responsive to a playing of a movie; searching, responsive to the acoustic fingerprint, an acoustic database; generating a dialogue fingerprint that is responsive to the playing of the movie; searching, responsive to the dialogue fingerprint, a dialogue database; identifying, responsive to the searching of the acoustic database and responsive to the searching of the dialogue database, a location within the movie; and displaying, responsive to the identified location, an information item that is associated with the identified location; and wherein the generating the dialogue fingerprint comprises a conversion of a portion of dialogue to text; wherein the searching the acoustic database is initially limited to a portion of the acoustic database; wherein the identifying is further responsive to a confidence indicator; and wherein a subsequent searching is responsive to a synchronization suspend timer.

These and other embodiments, features, advantages, and objects, are apparent in the context of the detailed description, accompanying drawings, and appended claims that follow. As is detailed below, the present inventions define novel systems and methods that produce useful, new, unexpected, and significant results that offer material advantages.

BRIEF DESCRIPTION OF THE DRAWINGS

The following drawing figures, that form a part of this application, are illustrative of embodiments of the present invention and are not meant to limit the scope of the invention in any manner.

DETAILED DESCRIPTION OF THE PREFERRED EMBODIMENTS

Figure 1:
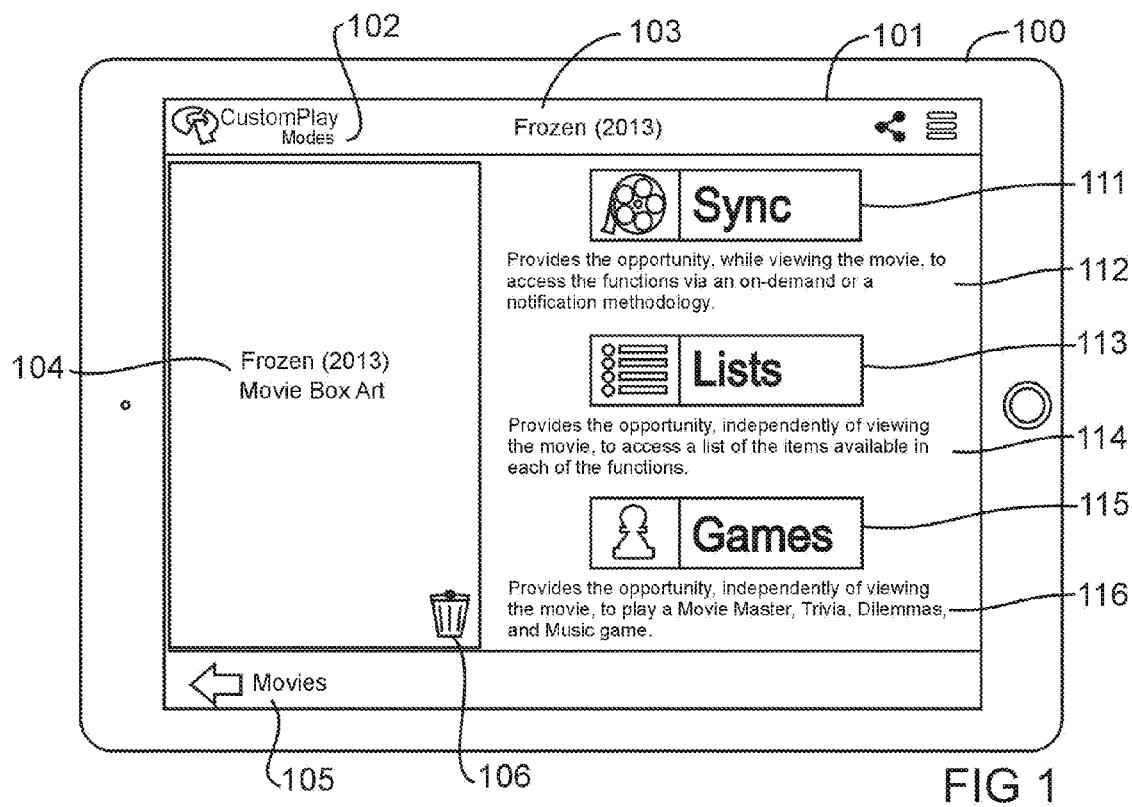
FIG. 1 is an illustration of an application interface enabling the selection of the Sync, Lists, and Games modes.

For purposes of the present disclosure, various terms used in the art are defined as follows:

The term "herein" shall mean in the entirety of this specification including drawings, abstract, and claims. The term herein is not limited to the paragraph or section in which it may appear.

The terms "include", "comprise", and "contains" do not limit the elements to those listed. By contrast, only the term "consist" limits the elements to those listed.

No conceptual distinction should be drawn from the use of the terms "on", "at", or "in" (e.g., no distinction should be drawn from the use of the phrase receiving on, receiving at, or receiving in a device).

No conceptual distinction should be drawn between the use of the terms "and", "and/or", or "or". For example, the scope of the embodiment is not narrowed by the use of the term "and" rather than the use of the terms "and/or", or "or". The applicability of the "and/or" concept is not limited to the explicit instances where the terms "and/or" are used. The explicit use of the terms "and/or" serves to underscore the available permutations.

The term "responsive" does not limit the elements, conditions, preferences, and/or requirements that may be taken into consideration. For example, an event that is responsive to a specified requirement is not limited to being responsive to only that specified requirement. An event may be responsive to a specified requirement and may be responsive, although not necessarily, to a second non-specified requirement, specially, when the second requirement, while described as an alternative requirement, may be also deemed complementary.

The terms "application software", "software application", "application", "app", "routine", and "computer software" shall mean any one or more executables, libraries, scripts, instructions, and/or processor executable steps in any format that causes, or is required by, a system to perform a task, function, or process. Application software or routines comprises a computer program designed to assist a user to perform task, function, process, or activity. In some instances application software and operating system software may be synergistically integrated and indivisible.

The term "associate" shall mean assign, give, allocate, associate, designate, ascribe, attribute, link, and/or relate.

The term "descriptor" shall mean a keyword, word, term, code, phrase, designations, write-ups, and linkages. The term descriptor shall also mean any information, image, and video-frame that identifies, describes, links, and/or categorizes content of a movie, portions of a movie, or a video-frame. A linkage is any information, data, and method that enables retrieving and/or downloading data from a local/internal and/or a remote/external source.

The term "dialog" shall mean a dialog, conversation, monologue, lyric, utterance, and/or communication. Dialog also comprises information that may be included in the subtitles or the closed captioning.

The term "geographic map" shall mean any map, including satellite, topographical, street, and such maps as Google Maps, Google Earth, Google Earth View, Google Street View, OpenStreetMap, and whether 2D or 3D, static or dynamic and interactive, single or multi-featured, and representative or photorealistic. The term "geographic map" shall also mean any depiction (e.g., map) that provides context for a locale.

The term "information" shall mean information, infotainment, data, descriptors, keywords, linkages, write-ups, and/or features. Information may also mean any content or material that may inform and/or entertain. Information may be provided as text, image, audio, movie, and multimedia content. Information may be factual or fictional. The term features comprises the manner in which information is displayed, presented, provided, or executed.

The term "information item" shall mean any information, supplementary information, infotainment, data, descriptors, keywords, linkages, write-ups, and/or features.

The term "item" shall mean: (i) an object, article, artifact, instrument, device, and product; (ii) a specific act or action within an activity, process, event, and operation; (iii) an emotion, expression, gesture, and movement; (iv) an effect, consequence, and result; (v) a sound, occasional foreign language, and melodic content; (vi) a portion of a dialog, line, and linguistic expression; (vii) cinematography, cinematographic technique, cinematographic effect, a special effect, technical transition, and production error; (viii) a cameo or special appearance; and (ix) a locale.

The term "keywords" shall mean words, terms, phrases, designations, codes, descriptors, labels, data, metadata, and numbers. The term "keywording" shall mean associating keywords.

The term "locale" shall mean a locale, location, site, setting, place, area, spot, landmark, location of interest, tourist attraction, building, building exterior, building interior, structure, and a geographically identifiable point. A locale is generally a location or place outside of the movie studio that is used for filming a movie or portion of a movie. A locale may be depicted as the actual locale or may be represented in the depictions as a locale other than the actual locale. The term "locale" is differentiated from the term "location" when the term location refers to a point in the timeline of the movie.

The term "movie" shall mean any moving image regardless of the source, motion, or technology implemented. A movie may comprise images and audio found in videos, full motion picture programs, films, movies, interactive electronic games, multi-media content, television programs, commercials, advertisements, and/or entertaining, instructional, and/or educational programming. A typical, but not exclusive, example of a movie is a full length motion picture usually released in theaters and/or optical discs (e.g., a DVD-Movie or Blu-ray Disc). Responsive to the particular embodiment implemented, subtitles, sub picture information, user interface, application software, software program routines, system control codes for controlling the playing of the video/audio, movie map, bookmark instructions, seek/step data, and/or map synchronization data may be provided with a movie.

The terms "movie map", "map", and "segment map", shall mean any combination, arrangement, table, database, listing, index, and/or information that: defines a beginning and ending of one or more segments; identifies one or a plurality of individual video-frames; and/or identifies one or a plurality of play locations in a movie or the audio of a movie. A movie map further comprises information associated with at least: one segment, a sequence of segments, a video-frame, and/or a play location in a movie or the audio of a movie. A movie map's information may comprise, for example: (i) a descriptor; (ii) an implicit or explicit editing and/or filtering action; (iii) a linkage among segments; (iv) a linkage to an internal/external source of information/content; (v) data, textual, image, audio, and/or movie content; and/or (vi) such information, data, linkages, and content that may required to enable or support the information, features, and functions detailed herein. A movie map may further comprise bookmark generating data, seek/step data, and movie synchronizing information (e.g., an acoustic signature matching database).

The term "noteworthy" in connection with content shall mean content that: (i) may be of interest to a significant audience; (ii) is noteworthy, remarkable, or compelling; and/or (iii) is uncommon, atypical, peculiar, unusual, unique, rare, or extraordinary.

The term "performer" shall mean an individual, participant, actor, or actress, appearing in a movie and/or credited for the physical and/or the verbal performance of a character. A performer refers to, for example, an actor in a movie, an athlete in a televised sporting event, a newscaster in a news program, and a chef in a cooking show.

The terms "play" and "playing", as in play or playing a segment of a movie, shall mean playing meaningfully, or substantially all or a portion of a segment. In other words, while a method or system disclosed herein may claim or intend to play the entirety of, or all, of a segment, a complete playing of a segment does not necessarily require the playing of every video-frame, interlaced field, audio and sub picture portion, and/or bit of data of the segment.

The term "plot info" shall mean information, rationale, and/or explanation relating to, or relevant to understanding or appreciating, a plot, sub-plot, theme, storyline, principle, idea, key point, clue, and/or item in the movie. The term "plot point" shall mean a plot, sub-plot, theme, storyline, principle, idea, key point, clue, and item.

The term "preferences" shall mean "programming preference", "version preference", "presentation preference", "content preferences", "function preferences", "information preferences", "technical preferences", and "playback preferences". The term "programming preference" shall mean a preference or preferences for a specific movie (e.g. Spider-Man), genres of movies (e.g., Action), types of movies (e.g. interactive movie detective games), series of movies (e.g., 007) broad subject matter of movies (e.g. mysteries), and/or time and date for playback of the movie. The term "version preference" shall mean a preference or preferences for a version of a movie (e.g., "Theatrical", "Unrated", and "Director's Cut") released by the copyright owner (e.g., motion picture studio). The version of a movie does not refer to sequels and/or remakes of a movie such as Spider-Man (2002), Spider-Man 2 (2204) and The Amazing Spider-Man (2012). The term "presentation preference" shall mean a preference or preferences that cause the selective inclusion, in a presentation, of segments from within a movie, from a version of a movie, or from within a plurality of movies. The term "presentation preference" shall also mean a preference or preferences for any one of the plurality of features provided by each of the following: Presentations, Compilations, Subjects, Dilemmas, Best Of, Performers, Shopping, Music, Search, and Preview. The term "content preferences" shall mean preferences for the form of expression, explicitness, inclusion or exclusion of objectionable content, a level of explicitness in each of a plurality of content categories of possibly objectionable content, length, level of detail, type of thematic content, and/or depictions of potentially objectionable items, and/or acts. The term "function preference" shall mean a preference or preferences for any one or more of the application functions (e.g., Dilemmas, Filmmaking, Locations, Music, Plot Info, Quotes, Recipes, Shopping, SuperFans, Trivia, Vehicles, Weapons, and Who), function modes, and/or features of one or more functions. The term "information preference" shall mean a preference or preferences for the suitability of a function's information for specific audiences (e.g., seniors, adults, families, teens, children, couples, gamers, beginners, advanced, movie fanatics). The term "technical preference" shall mean a preference or preferences for the technical and/or artistic elements (e.g., dissolves, fades, and wipes) that may be implemented during the playing of non-sequential segments. The term "playback preference" shall mean a preference or preferences for visual and audio options (e.g., camera angles, picture with picture, subtitles, closed captioning, and commentaries) that may be available for a movie.

The term "pre-established" shall mean that the preference, requirement, condition, variable, factor, or element, whether user or system established, is established at a time prior to, and not at the same time as, the application of the preference, requirement, condition, variable, factor, or element.

The term "search terms" shall mean terms, words, phrases, designations, codes, descriptors, labels, data, metadata, numbers, or other information that identifies, describes, or specifies what is being searched.

The terms "segment" and "movie segment" shall mean one or more video-frames. In the example of a feature presentation (e.g., Sixty minutes) a segment definition generally comprises an identification of a beginning and ending points (e.g., frames) within a movie. However, in the examples of second screen function implementations, a segment definition generally identifies a single point (e.g., frame) within a movie.

The term "subtitles" shall mean subtitles, and/or any textual information representative of a portion or portions of a movie's audio dialogue. A display of subtitles does not require a display of all the subtitles of a movie. A display of subtitles may only display a subtitle portion, line, phrase, or unit. Herein, subtitles are materially distinct from closed captioning. The term "subtitle information" shall mean information (e.g., data, text, and/or images) that enables displaying subtitles on a screen. Embodiments that are detailed with respect to the display of subtitles and/or use of subtitle information may be alternatively or complementary display and/or use other supplementary information.

The term "supplementary information" shall mean any information, text, data, depiction, images, movie, and/or content, that informs, entertains, elucidates, illuminates, illustrates, clarifies, and/or explains.

The term "system" shall mean a system, device, apparatus, remote system, remote server, web server, and system infrastructure. A system is capable of, independently, or in combination with another system or system infrastructure, communicating, processing, playing, and/or displaying content, e.g., movie, audio, images, subtitles, and/or information. In a system infrastructure, systems such as tablets, smartphones, and mobile devices may be used independently of, or in synergistic communication with, another personal system or commercial system (e.g. remote data or web server). A user's system may perform as a primary screen device and/or a second screen device and comprise, for example, televisions, personal computers, laptop and portable computers, tablets, smartphones, and mobile devices, remote control devices, and computing devices having a display screen.

The term "user" is interchangeable with the terms "subscriber", "viewer", and "person", and shall mean an end-user person actively using movie content, passively viewing a movie, interactively playing a movie game, retrieving movie from a movie provider, and/or actively subscribing to and using multimedia, internet, and/or communication services.

The term "variable content movie" shall mean a movie characterized by a nonlinear architecture facilitating a variety of possible logical sequences of segments. A variable content movie comprises parallel, transitional, and/or overlapping segments to provide multiple versions of a movie. Responsive to the particular embodiment implemented, a variable content movie may also include a user interface, application software, software program routines, system control codes for controlling the playing of the movie/audio, movie map, bookmark generating data, seek/step data, and/or map synchronization data. A movie that does require parallel, transitional, and/or overlapping segments to be variably played.

The term "video/snapshot" shall mean a movie, video, multimedia content, video frame, image, photograph, and visual depiction.

The term "write-up" is not necessarily limited to the written word. Specifically, in the context of a movie, a write-up may comprise information, video, and/or a multimedia presentation including video and audio (e.g., a video).

The above defined terms and other terms explicitly defined herein are to be understood as defined in this document, and not as they may be defined by incorporation. Incorporation by reference shall not act to modify, limit, or broaden the definitions hereinabove provided or formally defined in this document. A term that is not formally defined in this document is defined herein to have its ordinary and customary meanings.

Systems for, and methods of, displaying movie related information include those disclosed in, for example, U.S. publication 20130251337 titled "Providing item information during video playing"; U.S. publication 20150037003 titled "Synchronizing A Map To Multiple Video Formats"; U.S.

publication 20150037006 titled "Downloading Video Bookmark Generating Data"; U.S. publication 20130343721 titled; "Playing A Video Presentation With Playback Functions"; U.S. publication 20140219630 titled "Video Map Responsive To A Video Release"; U.S. publication 20150086174 titled "Second Screen Dilemma Function"; U.S. publication 20150110458 titled "Second Screen Trivia Function"; and U.S. publication 20150170325 titled "Second Screen Recipes Function", all of which are incorporated herein by reference.

In a preferred embodiment, a movie related application comprises a set of informative entertaining movie-related functions such as Dilemmas, Filmmaking, Locations, Music, Plot Info, Quotes, Recipes, Shopping, SuperFans, Trivia, Vehicles, Weapons, and Who. Advantageously, the functions are provided in multiple modes, such as, Sync, Lists, and Games. In Sync mode the user is provided the opportunity, while viewing the movie, to access the application's functions of interesting film-related content either on-demand or via a notification methodology. In Lists mode the user is provided the opportunity, independently of viewing the movie, to access the application's functions via a list of the items presented for each of the functions. In Games mode the user is provided the opportunity, independently of viewing the movie, to access the application's games, such as the Movie Master, Trivia, Dilemmas, and Music games.

Generally, the information items supporting a function's informational and entertainment features comprises, for example, an identification of a location within the movie relating to a depiction of an item, one or a plurality of segment definitions, an identification of a location within the movie to be used by a function's notification feature, a video-frame identifier to provide images and icons, a write-up, supplementary information, information for retrieving, from a local or remote source, supplementary information, an individual's and community ratings, and any other information item that a user of the function may deem informative and/or entertaining. While attention is drawn in certain functions to some particular exemplary information items, the information supporting a function is not limited to those specified generally or particularly. Advantageously, information items and features analogous to those specified in one function may be utilized in a different function.

The Dilemma function provides information relating to the depictions of moral dilemmas within a movie. The disclosures of U.S. patent application publication 20150093093 (the "'093 publication") with respect to the Dilemmas Second Screen Function (e.g., ¶¶ 133-142 and related FIGS) are incorporated herein by reference.

A moral dilemma usually arises when an individual's decision or action implicates two moral principles that are in conflict with each other, and neither moral principle appears to clearly override the other. Moral principles include, for example, compassion, financial responsibility, obligation to employees, parental responsibility, protection of a loved one, pursuit of soul mate, and self-actualization. In the Spider-Man movie, for example, the character Peter Parker is faced with the decision to either pursue a romantic relationship with Mary-Jane (i.e., Pursuit Of Soul Mate) or sacrifice the potential relationship in order to protect her from his enemies (i.e., Protection Of A Loved One). A moral dilemma is herein referred to as a dilemma, and an agent is the individual facing the dilemma.

The particular information items supporting the Dilemmas function's informational and entertainment features comprises, for example, an identification of the location within the movie that depicts a dilemma, a dilemma title, a relationship descriptor, two competing moral principle descriptors, a more detailed identification of the moral principles, a dilemma write-up to provide a recap and an explanation of the specific moral dilemma being depicted, a movie-frame identifying a video frame representative of the depicted dilemma, a generalized moral dilemma question that is subject matter related to the moral dilemma depicted within the movie, information for retrieving from a remote source an in-depth philosophical analysis, a rating, supplementary information, and any other information that a user of the dilemma function may deem informative and/or entertaining.

Generally, the identification of the location of a depiction within a movie may be, for example, the location in which the depiction is introduced, completed, resolved, or, specifically in the case of the Dilemma function, immediately prior to the agent implicitly or explicitly making a decision. The identification of the location may be in the forms of information identifying a video-frame or location in the movie, and/or identifying one or a plurality of movie segments. The latter is advantageous in those instances, e.g., a complex dilemma, where the elements are not present in a contiguous segment or scene. Also generally, a write-up or video presentation should be brief to enhance, rather than detract, from a conventional movie playback experience.

The dilemma relationship descriptor is one of a number of possible descriptors that categorizes the social relationship of the agent, e.g., Spouse/Romantic Partner, Parent/Child, Family, Social Relationships, Government, Business/Profession, and Inner Self To facilitate search across a plurality of movies, the relationship descriptors and the moral principle descriptors are advantageously standardized as descriptors of a few words. In the Spider-Man 2 example, the relationship descriptor is "Spouse/Romantic Partner" and the two moral principle descriptors are "Pursuit Of Soul Mate" and "Protection Of A Loved One".

The Filmmaking function provides cinematic technical information and explanation on how a scene, clip, or segment was created. The Filmmaking function is principally dedicated to cinematography as art and as technique. The disclosures of the '093 publication with respect to the Filmmaking Second Screen Function (e.g., ¶¶127-132 and related FIGS) are incorporated herein by reference.

The information items supporting the Filmmaking function's informational and entertainment features comprises, for example, a segment definition (e.g., frame identifier); a write-up to provide, for example, an in-video explanation of how the shot, clip, or scene was filmed/created; a linkage to more detailed technical information, and a linkage to movie specific information. Filmmaking information may also include a playable clip of the sequence from the movie, a playable video from behind the scenes, production photos and other pictorial material, playable audio track from the director's commentary, information for retrieving, from a remote source, supplementary information, and any other information that a user of the Filmmaking function may deem informative and/or entertaining.

The Locations function provides information relating to locales depicted within a movie. The disclosures of the '093 publication with respect to the Locations Second Screen Function (e.g., ¶¶ 110-120 and related FIGS) are incorporated herein by reference.

The information items supporting the Locations function's informational and entertainment features comprises, for example, an identification of the location within the movie that depicts a locale; an identity of the locale as represented in the movie, an actual identity of the locale, information for retrieving, from a remote source, an interactive geographic map that is responsive to the actual locale, the type of geographic map, magnification, orientation, and such other parameters as the provider of the geographic map's API may require; a video-frame identifier to provide a reference image and thumbnail, a write-up to provide brief in-video information, and information for retrieving, from a remote source, supplementary information. Such supplementary information may comprise, for example, a menu in the case of the locale being depicted being a restaurant.

Advantageously, the Locations function information in synergistic combination with an identification of the devices present location enables notifying the user of a nearby filmed locale and displaying movie related information. The later taking advantage of the information associated with other of the applications features e.g., Trivia information associated with the scene.

The Music function provides information relating to musical items in a movie, including: songs, score, themes, instrumentals, and ringtones. Innovatively, the Music function also identifies a small score sample from one movie that is included in the musical item of another movie. For example, in the movie Ted, the iconic score from the movie Indiana Jones is incorporated in the score used in a scene in the movie Ted when he escapes. The information items supporting the Music function's informational and entertainment features comprises, for example, a song title, artist, album, album art, release year, information for retrieving supplementary information and/or purchase information from a remote source, and a write-up providing information relating to the musical item. The supplementary information comprises, for example, artist tour dates, ticket purchases, album/band images, and band bios. An advantageous feature of the Music function is an efficient methodology that facilitates the purchase of musical items within the context of a playing of a movie.

The Plot Info function provides plot information, rationale, or explanation. An advantageous feature of the Plot Info function is to bring attention to certain clues as they occur in the movie. Clues are easily-missed items or moments that are important to obtaining a complete understanding of a movie. The Plot Info explanation for a clue draws the viewer's attention to an important item depicted within the movie. The Plot Info function may also provide an explanation of a character's motivations, recaps from previous movies in a series, and post-credit alerts. The disclosures of the '093 publication with respect to the Plot Info Second Screen Function (e.g., ¶¶ 121-126 and related FIGS) are incorporated herein by reference.

The information items supporting the Plot Info function's informational and entertainment features comprises, for example, an identification of a location within the movie to be used to notify the user that Plot Info information is available; an explanation for a plot point, theme, and item depicted within the movie, a write-up, links to blogs and forums that discuss a particular plot point, on-point interview videos with the cast and crew, and information for retrieving, from a remote source, supplementary information.

Advantageously, the information items supporting the Plot Info function categorizes the information (e.g., Recap, Plot Info, Clues, and After The Credits) to enable the user to establish a preference for the types of information to be provided. For example, a user may prefer to receive information categorizes as plot information or explanation, but not receive information relating to clues. Alternatively, for example, a user may prefer to only be notified in the event that there is content during or after the credits.

The Quotes function provides access to noteworthy dialog of a movie. A Meme style presentation of text and an image from the movie are displayed for the user to save, rate, and share on social media. The information items supporting the Quotes function's informational and entertainment features comprises, for example, an identification of a location within the movie that is associated with the immediately ending quotable dialog, the dialog text, a video-frame identifier to serve as the meme image, reference image, and/or thumbnail. The disclosures of the '093 publication with respect to Ratings Second Screen Function (e.g., ¶¶ 197-202 and related FIGS) are incorporated herein by reference.

The Recipes function provides a drink and food recipes relating to a depiction within a movie. The recipe may be directly related to a drink or food being depicted in a segment within the movie. Alternatively, a drink and/or food recipe may be inspired by a depiction within the movie or a movie's theme. The thematic idea, whether general to the movie or specific to a scene, need not be based on the depiction of a drink/food item or a drink/food theme.

The information items supporting the Recipe function's informational and entertainment features comprises, for example, a recipe title; a recipe description; a recipe image (e.g., an image, photograph, illustration, and/or other visual representation) specifically produced to illustrate a prepared recipe; a recipe ingredient list; a recipe directions; a recipe write-up associating a recipe with a depiction within the movie (e.g., a paragraph describing the association between the recipe and the specific depiction); a quote from within the movie (e.g., a line of dialogue); and a video frame from within the movie (e.g., a video frame representative of the depiction within the movie that is associated with the recipe). Advantageously, the information items supporting the Recipe function may further comprise additional movie specific data and pictures, as well as links to additional movie data, recipe sources, and shopping opportunities. The disclosures of U.S. patent application publication 20150170325 (the "'325 publication") with respect to the Second Screen Recipes Function (e.g., ¶¶183-196 and related FIGS) are incorporated herein by reference.

The Recipe function's information may also comprise information for facilitating the purchase of items relating to a recipe. Purchase items comprise items included in a recipe's list of ingredients; decorative items, glassware, and dishware included in the photograph; and special equipment used in the preparation of the recipe. An advantageous feature of the Recipe function is an efficient methodology that facilitates the purchase of recipe related items within the context of a playing of a movie.

The Shopping function provides information relating to purchasable items depicted within the movie. The information items supporting the Shopping function's informational and entertainment features comprises, for example, an identification of the depicted item, an identification of a purchase item related to the depicted item, and information for retrieving, from a remote source, purchase information. The disclosures of the '093 publication with respect to Shopping Second Screen Function (e.g., ¶¶167-183 and related FIGS) are incorporated herein by reference. An advantageous feature of the Shopping function is an efficient methodology that facilitates the purchase of noteworthy items within the context of a playing of a movie.

Identification information comprises, for example, a name, brand, make, model, image of the depicted item, image of the purchasable item, an identification of the manufacturer/retailer, and an identification of the character depicted within the movie and associated with the purchasable item. Additional information comprises information for the purchase of an alternative item and lowest price comparisons. Additional shopping features include a save for later button, and social media and sharing features.

Advantageously, the information items supporting the Shopping function's features comprise an identification of a subcategory appropriate for the item or service. A subordinate, secondary, sub-category, and child categories is a division of, and is associated with, a parent category. The principal, main, primary, or parent categories comprise, for example, Clothing & Accessories, Electronics & Entertainment, Home & Office, Toys & Games, Misc, Vehicles, and Weapons & Gear. In other words subcategories drill down from a main category. For example, in the Weapons & Gear category, subcategories may comprise Firearms & Accessories, Futuristic Weapons, Non-Lethal Weapons, Other Weapons & Accessories, and Tactical Gear. A Shopping category preference function enables a user to establish a preference for only those categories and subcategories of shopping items of interest to the user.

Advantageously, the information items supporting the Shopping function's features are responsive to information preferences, marketing, and audience targeting objectives. For example, identification of a purchase item related to the depicted item is associated with a specific audience (e.g., seniors, adults, families, teens, children, couples, gamers, movie fanatics). Thus, for example, irrespective of a user's product category preferences, a product intended or suitable for one audience (e.g., seniors) would not be presented to an unsuitable audience (e.g., children).

The SuperFan function provides information relating to the depictions, within a movie, of the following four categories of items: Easter eggs, production errors, hidden items, and cameos. The subject matter covered by the SuperFan function is conceptually distinguished from the type of trivia subject matter covered by the Trivia function. In Sync mode, the presentation of the information associated with the SuperFan function requires notification prior to the depiction of the corresponding content during the playing of the movie. As indicated above, generally each function comprises an identification of a location within the movie to be used by a function's notification feature. While in most instances, the notification of an item follows the depiction of the related content, in the case of the SuperFan function, the notification of an item precedes the depiction of the related content. Therefore, unlike the Trivia function, the SuperFan function is a spoiler that provides the information prior to the playing of the related depiction, and it is intended for users that have previously viewed the motion picture or who are not concerned.

The information items supporting the SuperFan function's informational and entertainment features additionally comprises, for example, a title, write-up, and information for retrieving, from a remote source, supplementary information. In the Lists mode, the SuperFan function provides access to a replay of the segment relating to the SuperFan item and/or the playing of supplementary videos retrieved from a source other than the movie. As in the case of the Shopping function, a category listing (e.g., Easter eggs, production errors, hidden items, and cameos) enables the user to establish a preference for the notification, within the playing of the movie, of only those items of interest to the user.

The Trivia function provides information relating to the depictions, within a movie, of trivia items. Specifically, the Trivia function provides movie specific trivia questions and corresponding sets of multiple choice answers. Unlike general movie related trivia games, in a preferred embodiment, the trivia questions provided for a movie relate to that movie, and the movie itself provides (directly or indirectly, explicitly or implicitly, prominently or inconspicuously) the information necessary to correctly answer the questions. Advantageously, the Trivia function may comprise polling questions relating to the movie. The disclosures of the '093 publication with respect to Trivia, Info, and Identification Second Screen Functions (e.g., ¶¶ 143-106 and related FIGS) are incorporated herein by reference.

The Trivia function preferences enable the options to include/exclude the presentation of movie questions (e.g., questions relating to the current movie); include/exclude the presentation of general questions (e.g., questions relating to general movie knowledge, or relating to subject matter extraneous to the current movie); include/exclude the presentation of movie related polling questions; and to include/exclude the presentation of write-ups (e.g., trivia factoids). In the movie Frozen, an example of a movie question is: "In the song Let It Go, what does Else say never bothered her anyway? and the corresponding answers are: "The snow", "The cold", "The winter", and "The solitude". An example of a general question is: "What was the first Disney 3D movie ever released?" and the corresponding answers are: "The Nightmare Before Christmas", "Chicken Little", "Meet the Robinsons", and "Hanna Montana & Miley Cyrus: Best of Both Worlds Concert". An example of a poll question is: "Which of these modern Disney Princesses is your favorite?" and the corresponding answers are: "Elsa—Frozen", "Merida—Brave", "Belle—Beauty And The Beast", and "Ariel—The Little Mermaid". An example of a write-up is: "Olaf dancing in a boater hat with the seagulls is an homage to Mary Poppins, when Dick Van Dyke's character, Bert, dances with the penguins."

The information items supporting the Trivia function's informational and entertainment features comprises, for example, a question, a set of possible answers, an image from the movie displayable with the question, an image relating to the correct answer for the question, a write-up explaining a correct answer, comparable user percentages for each answer, polling questions, and information categorizing the questions and write-ups (e.g., questions relating to subject matter extraneous to the movie, polling questions, questions requiring Sync mode, write-ups that can be presented without the presentation of the related questions). A movie's plurality of trivia questions comprise questions that relate to the substantially synchronized depiction of content from within the movie. These depiction dependent questions are intended to be presented in Sync mode and may not be entirely suitable for the Games mode of the application, and thus would be excluded from the Trivia game in the Games mode.

The Vehicle function provides information relating to the depictions, within a movie, of land, air, and sea vehicles. The Weapons function provides information relating to the depictions, within a movie, of real, fictional, and modified weapons.

The information items supporting the Vehicles and Weapons functions' informational and entertainment features comprises, for example, an identification of the depicted item, and information for retrieving information from a remote source, e.g., Wikipedia. Identification information comprises, for example, a name, brand, make, model, image of the depicted item, and an identification of the manufacturer. Advantageously, in a preferred embodiment, the Vehicles and Weapons functions' also synergistically utilize the information, and provide the features, of the Shopping function.

The Who function provides information relating to the identification of the characters depicted within the movie and the corresponding performers. The information items supporting the Who function's informational and entertainment features comprises, for example, a performer name, character name, performer picture, character picture, and information for retrieving information from a remote source, e.g., IMDb, Wikipedia, and an official fan site. The remote source, specially in the case of a fan cite, provides, for example, a performer's filmography, age, bio, latest news, images, and a method for communicating with a performer. Advantageously, the remote sources also make available trailers of recent movies featuring the identified performer.

In a preferred embodiment, the character picture is a video-frame, from within the movie, that best depicts the character, usually, but not necessarily, a close-up, 2-T, or portrait shot. In certain situations, the video-frame is cropped to maximize the presentation of the character for purposes of facilitating a user's visual recognition of the character. The identification of characters depicted in a movie also comprises the identification of non-human characters, including, for example, animals, monsters, animations, and robots (e.g., Jabba the Hut, Chewbacca, R2-D2). The identification of non-human characters comprises, when available, for example, a character's name or identification, specific biological identification, and model number.

The information and methodologies supporting the Who function's informational and entertainment features comprises, for example, the information and methodologies disclosed in U.S. Pat. No. 8,494,346 (the "'346 patent") titled: "Identifying A Performer During A Playing Of A Video", which is incorporated herein by reference.

In a preferred embodiment, the information items supporting the Who function's informational and entertainment features comprises associating a video-frame within the movie with a first appearance of a first character; associating subsequent video-frames within the movie with the appearances of subsequent characters; and associating a subsequent video-frame within the movie with a subsequent appearance of the first character. By contrast to a methodology that associates characters with a scene, clip, or segment, the ordered movie-frame interleaving of the association of characters within a scene, clip, or segment, improve the ordered identification of the most recently depicted characters in response to a user's on-demand request during movie playback. The sequence of identified characters is more responsive to their actual appearance in the movie timeline. An additional and material advantage is that the association of a character at the video-frame level rather than at the scene, clip, or segment level avoids identifying characters within a scene, clip, or segment, prior to their appearance. As opposed to a methodology that rigorously identifies each character in each video frame through, for example, face recognition technology, this methodology permits maximizing the efficiency and suitability of a manual process.

FIG. 1 is an illustration of an application interface enabling the selection of the Sync, Lists, and Games modes. The application modes provide for multiple methods of accessing of the various movie related informational and entertainment functions. In this particular exemplary embodiment, the application is downloaded and installed on an iPad device 100. Together with the application information, data, databases, and images supporting, for example, non-movie specific functions are also downloaded. This includes, for example, the character database and images to support the Dilemmas game matching of a character to a user's responses to the Dilemma game questions.

The modes interface screen 101 identifies the Mode selection as the active function 102, identifies the title of the movie 103 (e.g., Frozen), provides other movie related information, e.g., the release year, and displays the movie box art 104. Following a selection of a movie (e.g., Frozen) on a previous movie selection screen, for which information is desired, and the subsequent downloading of the corresponding movie map, this subsequent exemplary interface 101 displays a selection button for the Sync mode 111, the Lists mode 113, and the Games mode 115. The interface 101 explains that the Sync mode 111 "Provides the opportunity, while viewing the movie, to access the functions via an on-demand or a notification methodology." 112; the Lists mode 113 "Provides the opportunity, independently of viewing the movie, to access a list of the items available in each of the functions." 114; and that the Games mode 115 "Provides the opportunity, independently of viewing the movie, to play a Movie Master, Trivia, Dilemmas, and Music game." 116. The interface screen 101 also enables returning to the movies' map selection screen 105 and deleting the current movie map 106.

The Sync mode is dependent on establishing substantial synchronization between a playing of a movie and a written, visual, and/or audio display/presentation of information. With respect to movie playback functions and movie synchronization, the disclosures of U.S. patent publication 20150037006 titled "Downloading Video Bookmark Generating Data" (the "'006 publication") are incorporated herein by reference; and with respect to identifying a particular release of a movie in order to retrieve and apply the appropriate movie map, the disclosures of U.S. patent publication 20140219630 titled "Video Map Responsive To A Video Release" (the "'630 publication") relating to a Video Maps Responsive to Video Releases ¶¶0269-0284 are additionally incorporated herein by reference. Those references and the references cited therein are foundational to movie synchronization and are incorporated herein by reference.

Figure 2A:
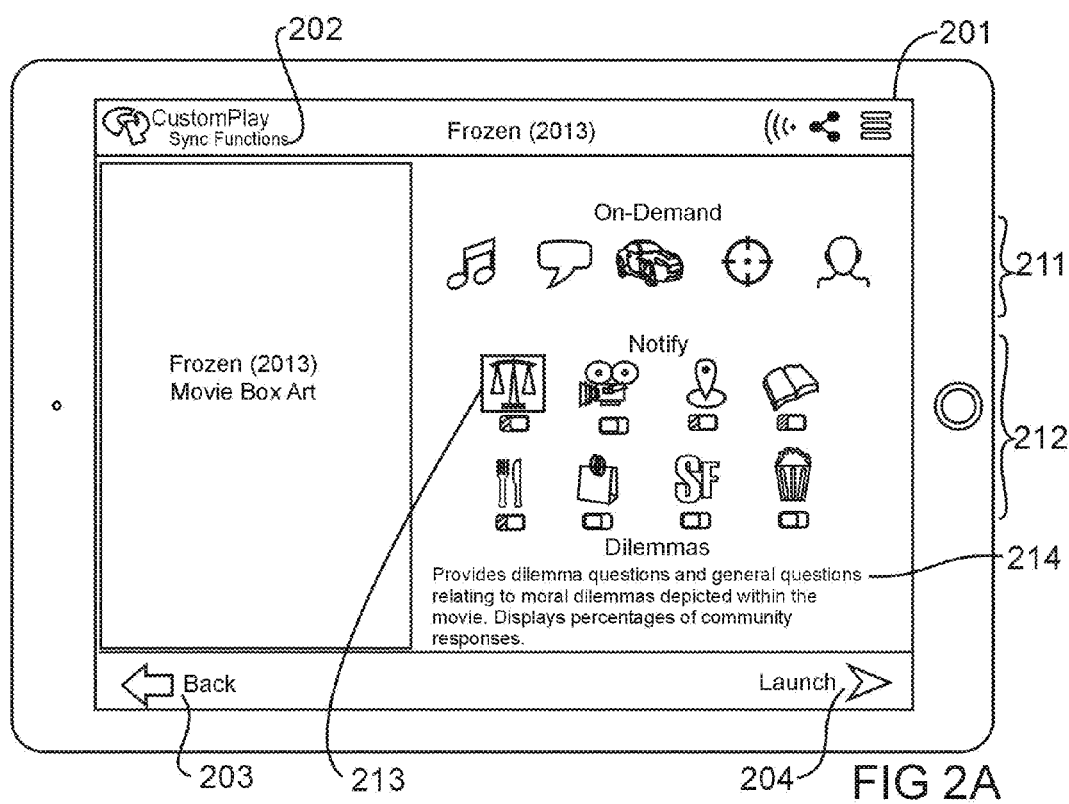
FIG. 2A is an illustration of an application interface enabling the selection among the informational and entertainment functions available in Sync mode.

FIG. 2A is an illustration of an application interface enabling the selection among the informational and entertainment functions available in Sync mode. This interface screen 201 identifies the Sync functions selection as the active function 202. A back icon 203 enables returning to the Modes screen. A Launch icon 204 launches, during movie playback, the synchronized access of the on-demand functions and the synchronized notification of the enabled notify functions.

In Sync mode the user is provided the opportunity, while viewing the movie, to access the application's functions of interesting film-related content either on-demand 211 or via a notification methodology 212. The Sync on-demand functions 211 comprise (left to right) the Music, Quotes, Vehicles, Weapons, and Who functions. The Sync notify functions 212 comprise (left to right) the Dilemmas 213, Filmmaking, Locations, Plot Info, Recipes, Shopping, SuperFans, and Trivia functions. In this particular illustration, notify function have been enabled, by means of an on/off toggle slide, for the Dilemmas 213, Locations, Plot Info, and Recipe functions. Selecting a function icon 213 enabled the display of a write-up 214 describing the function.

Figure 2B:
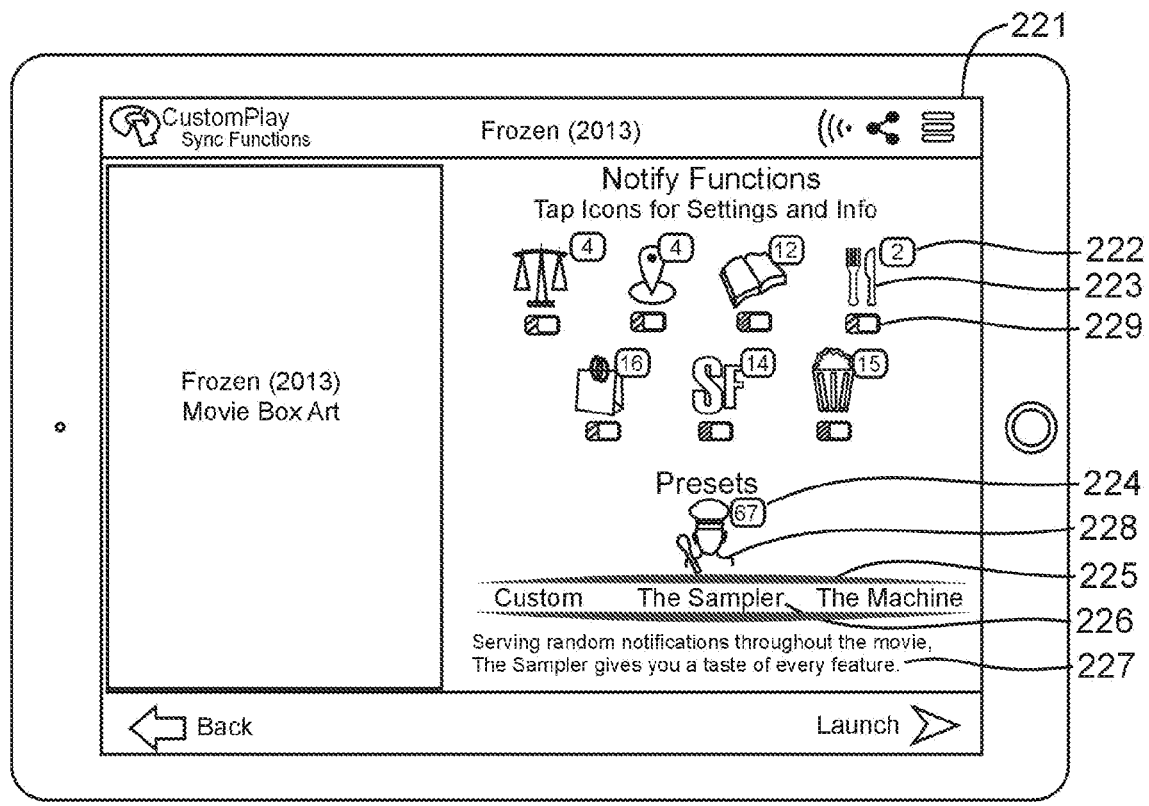
FIG. 2B is an illustration of an alternate application interface enabling the selection among notification functions available in Sync notification mode.

FIG. 2B is an illustration of an alternate application interface enabling the selection among notification functions available in Sync notification mode. This particularly advantageous embodiment comprises a number of innovative features including the identification of the number of items that are to be presented during the playing of the movie for each notification function, as well as the capability to select among a number of notification functions presets that are each responsive to a pre-established selection among the plurality of the movie related functions, options within the functions, categories, and subcategories.

In this particular illustration, the interface screen 221 includes a numeric bubble 222 indicating the number of items (e.g., 2) that can be potentially presented in notification mode for the associated notification function (e.g., Recipes) with respect to a selected preset (e.g., The Sampler). In this illustration, two notifications may be potentially provided for the Recipes function 223 during the playing of the movie. If a user elects to skip a portion of the playing of the movie, then, depending on the amount of the skip, a potential notification may not be immediately presented that would have been otherwise contemporaneously presented in synchronization with the movie. A numeric bubble 224 is displayed that indicates the total number of items (e.g., 67) that may be potentially presented in notification mode for the selected preset.

In synergistic combination with the selection of individual notification functions, the interface screen 221 provides a user the capability to select among a number of notification functions presets that are each responsive to a pre-established selection among the plurality of the movie related functions, options within the functions, categories, and subcategories. In a preferred embodiment, a selection wheel 225 enables the selection among a plurality of presets, comprising, for example, The Sampler, The Machine, The Mobster, The Fashionista, The Stuntwoman, The Jester, The Spy, The Action Hero, The Brain, The Adventurer, The Kid, and Custom. In this embodiment, an appropriate character profile is associated with each preset selected set of functions, options within the functions, categories, and subcategories. A character profile may comprise a preset title/descriptor 226 (e.g., The Sampler), a description of the characteristics of the preset 227 (e.g., "Serving random notifications throughout the movie, The Sampler gives you a taste of every feature.") and/or a responsive icon 228 (e.g., an icon of a chef). In the case of The Spy preset, the description of the characteristics of the preset comprises the following write-up: "The mission: To gain a deeper understanding of a movie's plot while exploring locations, recipes, weapons, vehicles, and character defining dilemmas."

The Machine preset comprises the rapid fire presentation of every available notification typically in the range of 250-300 notifications for an average movie. Such a preset often provides little if any time between some notifications. In other words, notifications from multiple functions may be provided at substantially the same time (i.e., collide). However, the information of every notification is available to a user through a timeline organized display of multiple function notifications.

One of the advantages of the Sampler preset is that it is configured to encourage a first time user to sample functions which they may not otherwise experience. With that object, the on/off toggle slide 229 does not permit the user to disable the notifications for a function. The on/off toggle slides for The Sampler preset may be dimmed to indicate that they are not operational. In the illustration 221, responsive to a user preference and/or the absence of relevant Filmmaking data in the movie map, the Filmmaking function is entirely omitted.

The Sampler preset, by contrast to The Machine preset, is configured to provide a temporally controlled sampling of each of the functions avoiding potential collision among notifications. In the movie Frozen, The Machine preset may use of 224 potential notifications, while The Sampler is limited to 67 of the 224 potential notifications. In one embodiment, the notifications are spaced no less than one minute apart or at such intervals as a user may prefer. Advantageously, the selection of information items is disproportionately in favor of at least one of the movie related information functions. For example, in generating a set of potential notifications, every notification for the Dilemmas, Locations, Plot Info, and Recipes functions is taken into account, while only a percentage (e.g., 50%) of temporally spaced notifications of the Filmmaking, Shopping, Super-Fan, and Trivia functions are considered. From this subset of notifications, given priority to those functions with the smaller potential number of notifications, only the notifications that provide the desired temporal separation (e.g., a predefined playing time separation from a previous display of an information item) are included in the presentation set. A system default one minute predefined playing time separation is deemed sufficient to generally accommodate a display of an information item.

Alternative methodologies may be implemented in the selection of information item notifications (also referred to as information items and/or information notifications) that disproportionately favor at least one of the movie related information functions. For example, data of all the available information items for each of the functions (e.g., in the movie Frozen 224 available information item notifications) is loaded into memory and sorted by the notification timecode. If within the first minute of the movie, more than one information item would occur, a random selection of one those information items is selected for display. Otherwise, the first available information item is selected for display. Following a display of a first information item, no other information item occurring within 50 seconds of a previously displayed information item is selected for display.

After the 50 seconds data skip period, if, for example, a next information item relates to a non-emphasized function (e.g., the Trivia and Shopping functions) it is used only if no information item event of a favored function (e.g., Recipes and Dilemmas) occurs within the next 50 seconds (i.e., 100 seconds from a previously displayed information item). If after the 50 seconds data skip period, a next information item relates to a non-emphasized function (e.g., the Trivia and Shopping functions) but an information item event of a favored function (e.g., Recipes and Dilemmas) occurs within the next 50 seconds (i.e., 100 seconds from a previously displayed information item), then the information item event of the favored function is selected for display. If no information item is available for display within 100 seconds from a previously displayed information item, then a next available information item irrespective of the function is selected for display.

Other alternative parameters, routines, and/or methodologies may be implemented in the display of information item notifications and the display of information items that satisfy the object of The Sampler preset to ensure a sampling of the information items of every Function, while also providing an adequate amount of viewing time for each notification item.

The Custom preset, by contrast to The Sampler preset, does not provide any limited preconfigured selection of functions, options within the functions, categories, and subcategories. Instead, it is the user that establishes which functions, options within the functions, categories, and subcategories are associated with the preset and are saved for future use as a user defined preset. All other presets, other than The Sampler and the Custom presets, permit the user to make temporary adjustments to the functions, options within the functions, categories, and subcategories. For example, The Action Hero preset includes all the notifications for the Dilemmas and SuperFan functions, the notifications in the Action Figures and Toys & Games subcategories of the Shopping function, the notifications in the Weapons & Gear category in the Shopping function, and the notifications in the Write-ups and InMovie options of the Trivia function. A user may elect to prevent notification in the Action Figures and Toys & Games subcategories of the Shopping function, include notifications in the Polls option of the Trivia function, and include notifications for the Recipe function.

An exemplary second screen device embodiment comprises a second screen device performing the steps of: generating an acoustic fingerprint that is responsive to a playing of a movie on a primary screen device; searching, responsive to the acoustic fingerprint, an acoustic database; identifying, responsive to the searching of the acoustic database, a location within the movie; displaying, on the second screen device, an indication that information is available (e.g., an icon of the Recipes information function), the indication that information is available being responsive to the identified location within the movie, a predefined playing time separation from a previous display of an information item (e.g., 1 minute), and a selecting (e.g., FIG. 2B) of information items of each of a plurality of movie related information functions (e.g., Dilemmas, Recipes, SuperFan, Trivia), the selecting being disproportionately in favor of at least one of the movie related information functions (e.g., Recipes); and displaying, on the second screen device and responsive to a request for information, an information item (e.g., images, write-ups, recipes) that is responsive to the displayed indication that information is available.

In such an exemplary embodiment, the at least one of the movie related information functions (e.g., Recipes) comprises fewer information items than at least another of the movie related information functions (e.g., Trivia); the selecting being disproportionately in favor of at least one of the movie related information functions is responsive to a selection of one of a plurality of information item display presets (e.g., The Sampler); a selected information item display preset is associated with a preset descriptor (e.g., a title/descriptor "The Sampler" and/or an icon of a chef); and the indication that information is available (e.g., Recipes function icon) identifies one of the movie related information functions (e.g., the Recipes function).

Figure 2C:
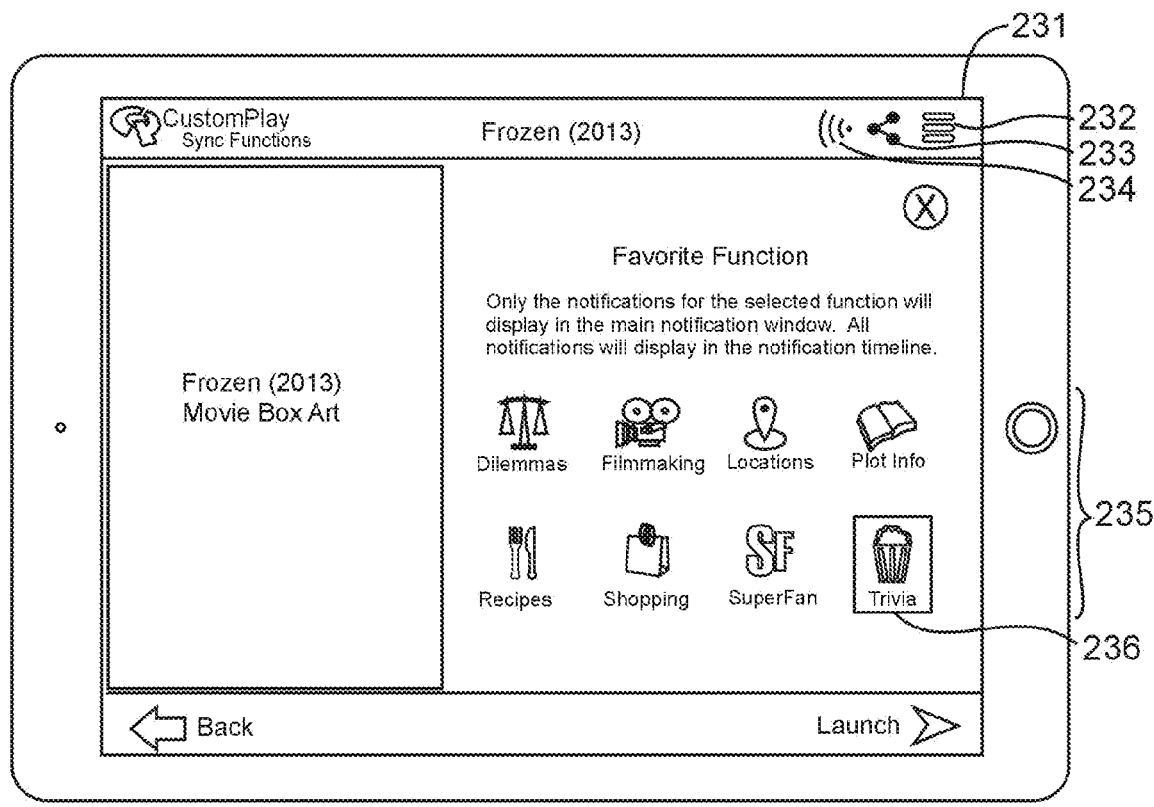
FIG. 2C is an illustration of the Favorite Function selection screen.

FIG. 2C is an illustration of the Favorite Function selection screen. This particular embodiment comprises a pull down menu icon button 232, a sharing icon button 233, and a sync icon button 234. The pull down menu icon button 232 provides access to the functions of the application such as, movie maps selection, the Sync mode, the Lists mode, the Games mode, social sharing, awards, alerts configuration, preferences and settings. The sharing icon button 233 enables social media posting and email functions. The sync icon button 234 displays the status of movie sync routines (e.g., in sync or syncing), as well as it provides access to a sync dropdown menu. The sync dropdown menu includes access to obtaining Help with Sync, adjusting Notifications (see FIG. 2B), setting a Favorite Function, selecting notification Alerts, and enabling the Re-Sync function.

The principal object of the Favorite Function selection screen is to enable a user to indicate which if any of the notification functions will dominate the principal display area during Sync mode. Advantageously, when the Favorite Function is enabled only the notifications for the selected function will display in the main notification window. All notifications will display in the notification timeline. In this particular embodiment, an icon and title is displayed for each of the available notification functions 235 (e.g., Dilemmas, Filmmaking, Locations, Plot Info, Recipes, Shopping, SuperFan, and Trivia). In the illustrated example, the Trivia function is selected as a favorite function and is highlighted 236. Prioritizing display of the Trivia notifications is particularly advantageous because of the interactive gaming characteristics of that function.

Figure 3A:
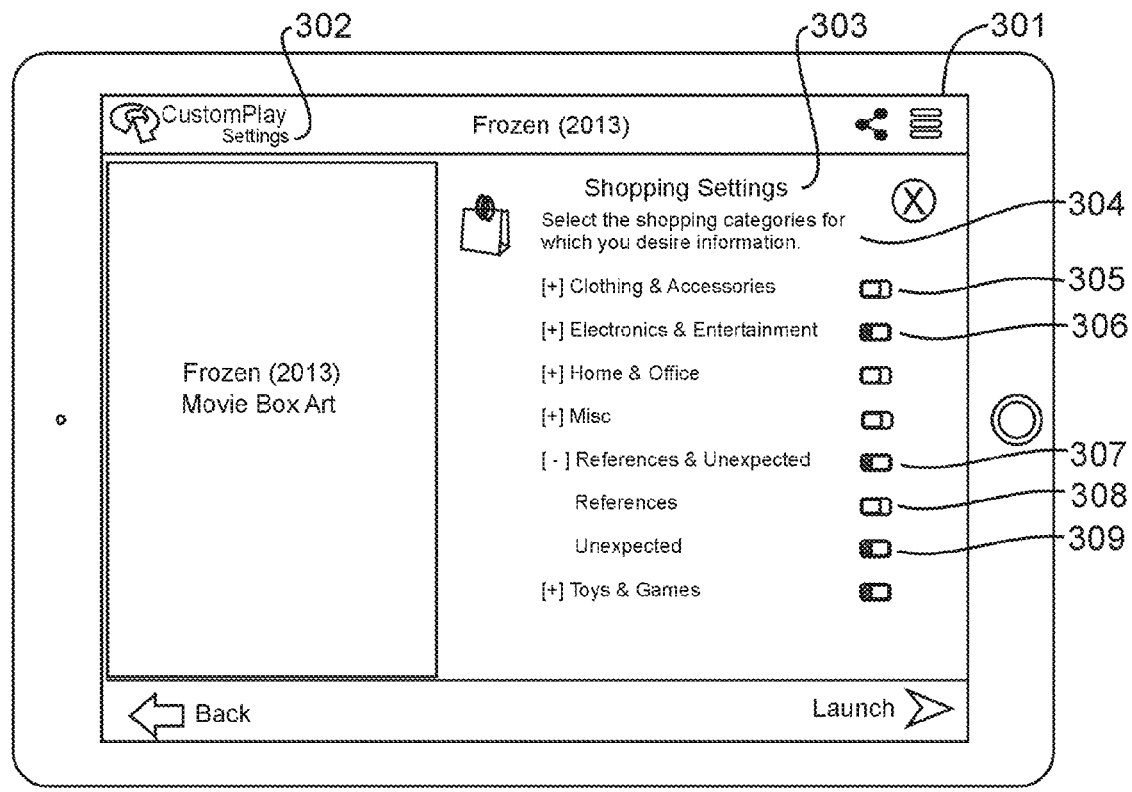
FIG. 3A is an illustration of an application interface for establishing category preferences in the Shopping function.

FIG. 3A is an illustration of an application interface for establishing category preferences in the Shopping function. The screen 301 enables a user to establish a preference for only those categories and subcategories of shopping items of interest to the user. This function is particularly advantageous in Sync mode since it minimizes unwelcomed notifications during a playing of a movie. This interface screen 301 identifies the Settings function as the active function 302, identifies that the settings are for the Shopping function 303, provides instructions 304 (e.g., "Select the shopping categories for which you desire information."), and provides an icon button (X) to exit the Shopping Settings function. The principal object of the Shopping Settings function is to enable a user to establish a preference for only those categories and subcategories of shopping items of interest to the user.

A shopping category preference feature of the Shopping function enables a user to establish a preference for only those categories and subcategories of shopping items of interest to the user. A category and subcategory structure supports an elegant display methodology that facilitates an extensive shopping preference structure. A user may select to include/exclude an entire category or select to individually include/exclude subcategories within a category. For example, in the illustration, a user has elected to exclude all the subcategories in the Clothing & Accessories category 305, while including all subcategories in the Electronics & Entertainment category 306. Innovatively and advantageously, in addition to the conventional shopping categories such as Clothing & Accessories, the shopping categories additionally comprise a References & Unexpected category 307, a References subcategory 308 and an Unexpected subcategory 309. Deselecting a category causes the exclusion of all the items in the underlying subcategories without altering their individual include/exclude settings. This provides an efficient method of temporarily disabling a category of shopping items without affecting subcategory settings for a future use.

A References subcategory 308 provides access to items that are related to a depiction that makes a reference to or pays homage to an item external to the movie. Often the depiction is in the form of a dialog reference. For example, in the movie Forrest Gump, the characters Forrest and Lt. Dan are crossing a busy New York City street while "Everybody's Talkin'" by Harry Nilsson is playing. After nearly being hit by a taxi, Lt. Dan yells, "Hey, I'm walking here!" This dialog is a Reference to the movie Midnight Cowboy. The shopping function associates the reference "Hey, I'm walking here!" with the sale of the Blu-ray disc of the movie Midnight Cowboy.

An Unexpected subcategory 309 provides access to items that are not explicit or obvious in the depiction within the movie. For example, in the movie Frozen an Unexpected item is a karaoke machine that is associated with the scene in which the song "Let It Go" is sang by the character Elsa.

Often the association of the depiction within the movie and an Unexpected subcategory item is intended to surprise, amuse, or entertain. The sale of the item is of minimal if any priority. Items categorized in the References subcategory 308 or in the Unexpected subcategory 309, are also categorized in the appropriate conventional subcategory. For example, in the case of the Midnight Cowboy Blu-ray disc, the item is also categorized in the Media subcategory within the Electronics & Entertainment category 306.

Figure 3B:
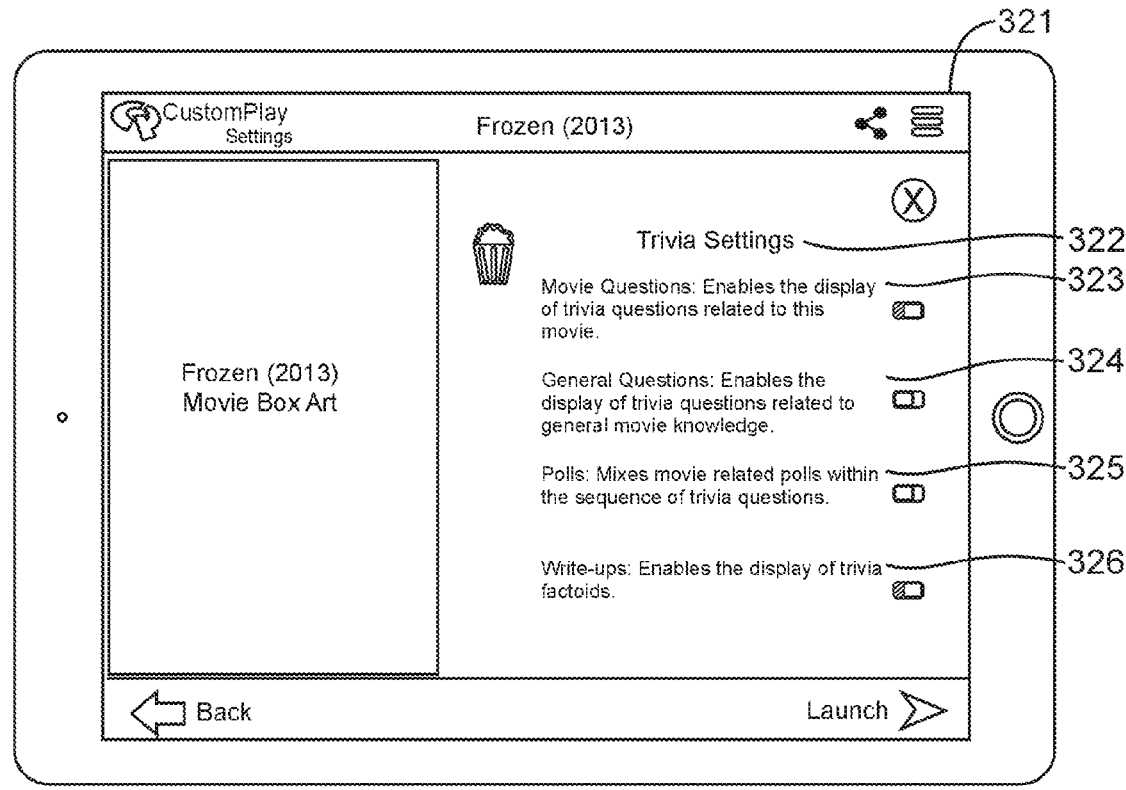
FIG. 3B is an illustration of an application interface for establishing preferences in the Trivia function.

FIG. 3B is an illustration of an application interface for establishing preferences in the Trivia function. The screen 321 enables a user to establish a preference for the display of only those trivia categories of interest to the user. This interface screen 321 identifies that the settings are for the Trivia function 322, provides an explanation of each of the trivia categories (e.g., Movie Questions, General Questions, Polls, and Write-ups). For example, "Movie Questions: Enables the display of trivia questions related to this movie." 323, "General Questions: Enables the display of trivia questions related to general movie knowledge." 324, "Polls: Mixes movie related polls within the sequence of trivia questions." 325, and "Write-ups: Enables the display of trivia factoids." 326. In the illustration, a user has elected to include trivia questions relating to the movie Frozen, include write-ups, exclude questions relating to general movie knowledge, and exclude participating in polls. An example of a poll associated with the movie Frozen is: "Which is your favorite Disney Princess?" The four options provided the user are: "Elsa from Frozen", "Belle from Beauty and the Beast", "Cinderella From Cinderella", and "Ariel from Little Mermaid".

Figure 4A:
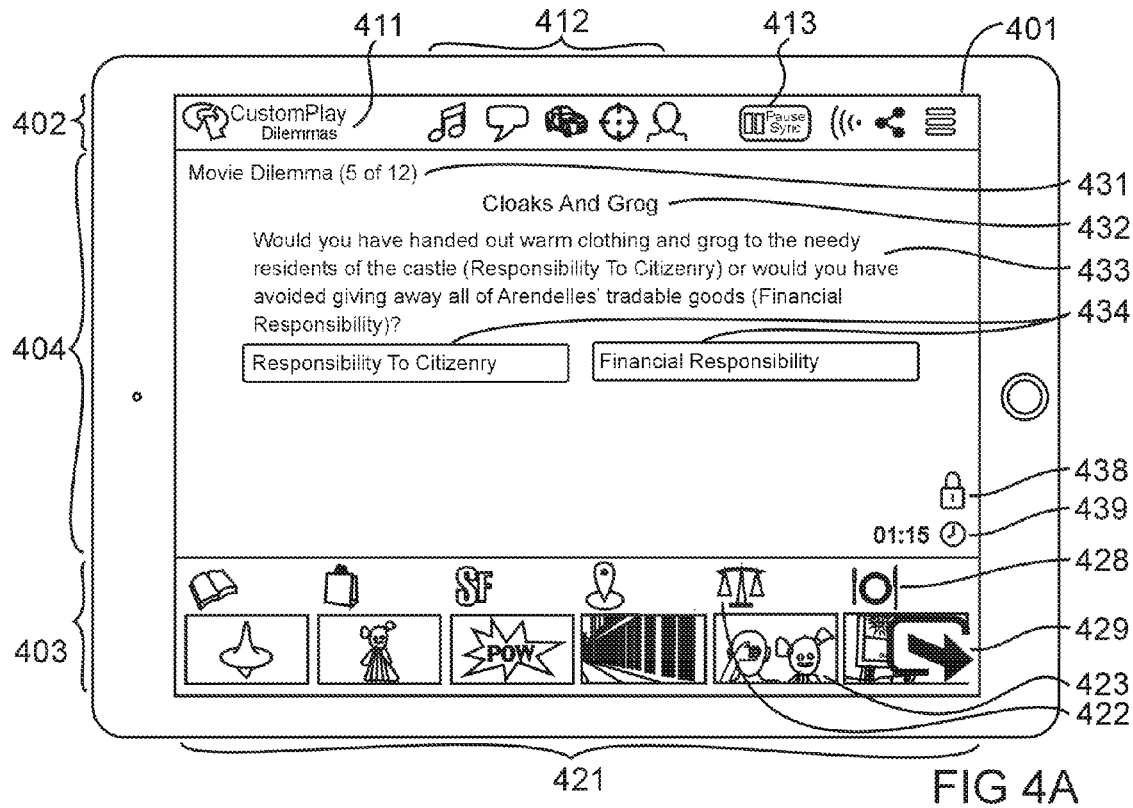
FIG. 4A is an illustration of an application interface displaying information and features of the Dilemma function in Sync notification mode.

FIG. 4A is an illustration of an application interface displaying information and features of the Dilemma function in Sync notification mode. The application interface 401 is divided into three windows, zones, areas, or portions of the interface. A top window 402 is utilized to display an identification 411 of the active function (e.g., Dilemmas), on-demand function icon buttons 412, a pause sync/sync toggle button 413, and the previously detailed sync, sharing, and pull down menu icon buttons. A bottom window 403 is utilized to display a timeline organized display of multiple function notifications 421. The primary window 404 is utilized to display the features and content of an active on-demand or notification function.

Within the top window 402, the function identification 411 is contemporaneously updated with the display or activation of features of a function in the primary window 404. The on-demand function icon buttons 412 enable the user to activate the on-demand functions (left to right) Music, Quotes, Vehicles, Weapons, and Who at any time during the playing of the movie. The pause sync/sync toggle button 413 enables a user to pause the sync routines of the application. This capability is particularly advantageous in preventing the sync routines from continuing to generate notifications when the playing of the movie has been stopped. Once the playing of the movie has been resumed, then the user would resume the sync routine by pressing the pause sync/sync toggle button 413. This aids the sync routines in more efficiently and accurately syncing to the correct location in the movie.

Within the bottom window 403, the display of the timeline organized display of multiple function notifications 421 is contemporaneously updated with the display of a current notification. In this exemplary embodiment, responsive to a movie play location and the movie map, a function notification is used to indicate the availability of content related to a function (e.g., Dilemma). A function notification utilizes an indication representing a function 422 (e.g., a Dilemma icon or descriptor), and an image (video frame) 423 extracted from within the movie. Advantageously, the video frame 423, that is extracted from within the movie, and that is responsive to the function and current play location, assist in visual recognition.

The primary window 404 is utilized to display the features and content of an active on-demand or notification function. In the exemplary embodiment illustrated in FIG. 4A, the active function is the Dilemma function. The display of features and content is focused on a movie dilemma question and comprises an identification that the moral dilemma question relates to a depiction within the movie 431 (e.g., "Movie Dilemma (5 of 12)"), a title 432 for a moral dilemma depicted within the movie (e.g., "Cloaks And Grog"), a moral dilemma question identifying the two moral principles that are in conflict 433 (e.g., "Would you have handed out warm clothing and grog to the needy residents of the castle (Responsibility To Citizenry) or would you have avoided giving away all of Arendelles' tradable goods (Financial Responsibility)?"), and two moral principle labeled buttons 434 for a user to select a choice (e.g., "Responsibility To Citizenry, and Financial Responsibility").

In an alternate embodiment, rather than displaying the two moral principle labeled buttons 434, the user is presented with two drop-down lists each displaying a set of moral principle descriptors from which the user may select what they believe to be the appropriate moral principles implicated by the recently depicted moral dilemma. In the event that a write-up is included, the moral dilemma question would not include the explicit identification of the moral principle descriptors (e.g., "Would you have handed out warm clothing and grog to the needy residents of the castle or would you have avoided giving away all of Arendelles' tradable goods?") The set of moral principles descriptors may be a subset selected from a wider set of moral principles descriptors. The subset is chosen for applicability and ease of distinction (e.g. reduce similar moral principles). Once the user has selected two moral principle descriptors, the application now displays the two moral principles descriptors 434 determined to be most applicable to the moral dilemma. The descriptors determined to be most applicable may be responsive to, for example, expert evaluation and/or community responses.

Features of the Dilemma function may also comprise displaying a relationship descriptor relating to the depicted dilemma. A relationship descriptor is one of a number of possible descriptors that categorizes the social relationship of the agent (e.g., Spouse/Romantic Partner, Parent/Child, Family, Social Relationships, Government, Business/Profession, and Inner Self). Other features may enables a user to selectively search other moral dilemma depictions matching, individually or in combination, a relationship descriptor, a first moral principle descriptor, and/or a second moral principle descriptor. To facilitate the search, drop-down lists are provided for each field. In this example, Boolean capabilities are included by toggling a search box to indicate an exclude condition (an X mark), the include condition (a check mark), or a do not consider condition (a blank box). Alternatively, since in one embodiment the default condition is a match, the user may automatically search for instances of a dilemma having the same moral principles in conflict.

In a preferred embodiment, responsive to user's pre-established or contemporaneously established preference, and during a playing of the movie on a primary screen and before the outcome of a dilemma is depicted, immediately after a Dilemma has been displayed on a second screen, the playing of the movie is paused. Once the user activate the resume playing of the movie, the playing of the movie on the primary screen is automatically resumed at a suitable point prior to the location in which the movie was paused in order to assist the user in recollecting the relevant details and context of the movie at the time it was paused.

A notification of a most current function (e.g., Recipes function identification icon 428 and video frame) shifts previous notifications to the left. The point within the movie that the notification and display of the function features are provided may be responsive to a notification point that is specified for the particular item, and may be the same or different from the video frame related to the actual depiction. Alternatively, the notification point may be responsive to a system/user pre-established relationship to the video frame related to the depiction, or responsive to the location of a related dialog. Also, illustrated is an indication of the time 439 (e.g., one minute 15 seconds) to the next function notification.

Given the number of notification function that may be activated, it is likely that information display collisions will occur from insufficient time to view or interact with an information item associated with one notification and the display of an information item from a subsequent notification. A lock feature prevents a next information item from displaying prior to a user completing the use of a current information item (e.g., answering the dilemma questions). The lock feature may be automatically enabled by a timer providing a user pre-established or system default amount of time (e.g., 20 seconds), responsive to each function, that an information item is displayed. Alternatively, or additionally, a user interacting with a displayed information item or activating the lock icon button 438 enables the locking of the currently displayed information item (lock icon button is illustrated in the lock position). Deactivating the lock icon button 438 enables the display of a feature or information item currently in synchronization with the playing of the movie. In the exemplary illustration, a last displayed notification item 428 in the timeline display of multiple notifications 421 identifies the Recipe Function as being the function currently in synchronization with the playing of the movie. Deactivating the lock icon button 438 would cause the display of features and information items associated with the Recipe Function.

Advantageously, a user may scroll backwards through the timeline and forwards up to the current notification (i.e., a notification in synchronization with the current play location in the movie). When a user scrolls backwards through the timeline so that the current notification 428 is no longer visible in the time line, a re-sync timeline icon button 429 is displayed. Additionally, or alternatively, as is illustrated, when the information displayed in the primary window 404 is not associated with the most current notification 428, then a re-sync timeline icon button 429 may also be displayed. A user activation of the re-sync timeline icon button 429 advances forward the display of the notification timeline so that the notification in synchronization with the current play location in the movie is displayed (e.g., the Recipe notification 428). Additionally, the display in the primary window 404 is updated to display the information associated with the current notification, and the lock icon button 438 is deactivated.

Figure 4B:
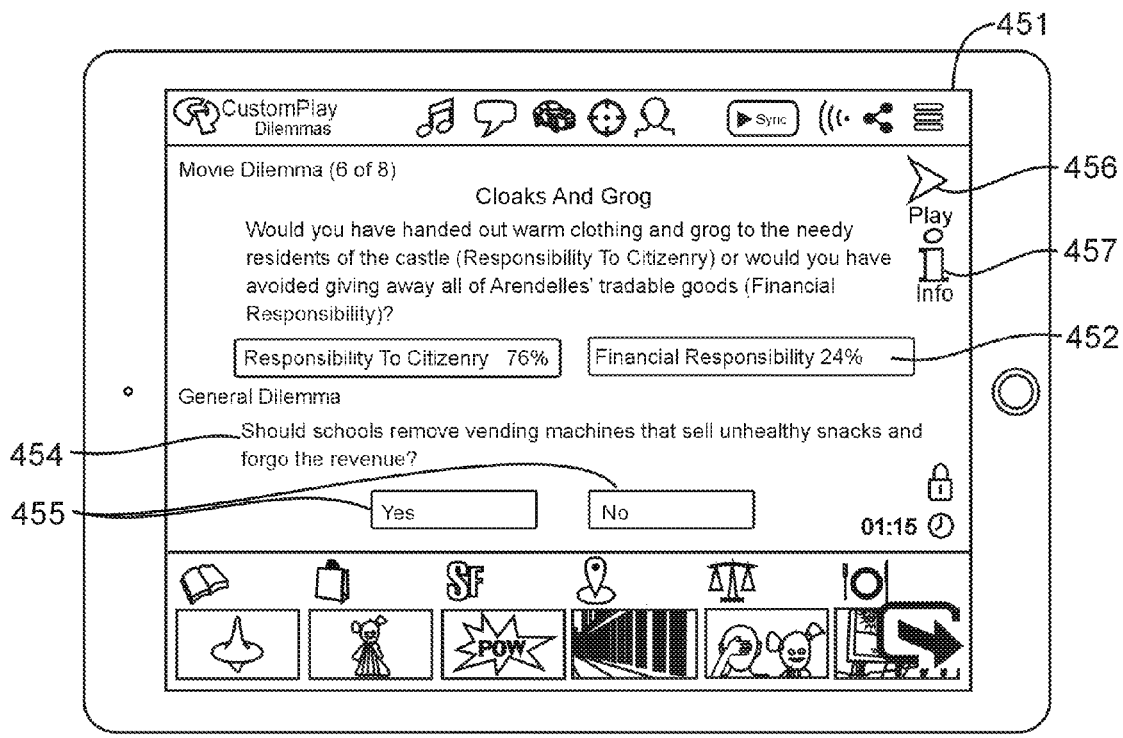
FIG. 4B is an illustration of an application interface displaying additional features of the Dilemma function in Sync notification mode.

FIG. 4B is an illustration of an application interface displaying additional features of the Dilemma function in Sync notification mode. This interface screen 451 depicts features of the Dilemma function following a user selection of either moral principle in response to the movie dilemma question. In an embodiment where data is accumulated for other user's responses, the aggregated community responses are displayed 452 (e.g., Responsibility To Citizenry 76%, and Financial Responsibility 24%).

Advantageously, features of the Dilemma function further comprise the display of an additional dilemma question. In this exemplary embodiment, the additional dilemma question is a general dilemma question 454 that relates to the moral principles of the corresponding movie dilemma but attempts to introduce a different perspective, real-world applicability, and/or entertainment value. In this particular embodiment the general dilemma question 454 is drafted in a manner that elicits from the user a yes or no answer (e.g., "Should schools remove vending machines that sell unhealthy snacks and forgo the revenue?"). As in the case with the movie dilemma, following a user selection of either the Yes or No buttons 455, the aggregated community responses are displayed.

Information items supporting the Dilemma function may also comprise an identification of the segment or segments from within the movie that provide context for the two moral principles that are in conflict in each corresponding moral dilemma, a more detailed identification of the moral principles, information (e.g., linkages) to internal or external information or discussion, a rating, and/or any other information that a user of the Dilemma function may deem informative and/or entertaining. For example, a play dilemma feature 456 causes the automatic playing of a segment or segments from within the movie that provide context for the two moral principles that are in conflict in a dilemma. In a preferred second screen embodiment, a dilemma replay feature 456 enables, for example, a replaying on the primary screen of the various previously played segments of the movie that precede the decision point and that assist the user in recollecting the relevant details and context of a dilemma. This is particularly advantageous in those instances where the depiction of one of the two moral principles is much earlier in the movie that the current play location. Further, an info dilemma feature 457 provides access to internal or external additional information relating to the implicated moral principles and the depicted moral dilemma as may be provided by, for example, the application's website; an in-depth philosophical analysis as may be provided by, for example, a fan website; and/or a generalized analysis of the moral dilemma subject matter as the latter may be provided by, for example, Wikipedia.

The Dilemmas function satisfies a number of different objectives beyond the informative and entertainment objectives. Among these are the many educational opportunities both in a home and in a classroom. The Dilemmas function is advantageously designed to stimulate discussions among viewers regarding the moral dilemmas depicted within a movie. It provides an opportunity to compare and contrast the decisions viewers would make under similar circumstances, and to stimulate intellectual discussions that reveal an individual's character and values. The features of the Dilemmas function can serve to stimulate family conversations that could lead to a child's moral development and character growth. Within a classroom, teachers may use features of the Dilemmas function to showcase ethical practices and moral principles relevant to their subject matter. The Dilemmas function's second screen embodiment, responsive to a user's preferences, is configured to facilitate any of a number of educational, informative, and/or entertaining activities. For example, in one second screen embodiment, one individual (e.g., a parent/teacher)

has access to a relationship descriptor and the moral principle descriptors and is able to query others (e.g., children/students) to identify them.

A user's answers to a moral dilemma questions may be tabulated and summarized at the end of the movie to inform the user of how the user's decisions compare to the agent's actions in the movie (e.g., what the characters decided), and/or compared to other users' answers to the moral dilemma questions. An entertaining psychological profile mat by provided the user that is responsive to the user's and community replies. Additionally, responsive to the user's preferences, dilemma answers may be posted to social media, and otherwise shared with friends (e.g., emailed), and the dilemma community at large. Aggregation of the data may provide a reading on the moral compass of a culture, and other opportunities for research.

Figure 5A:
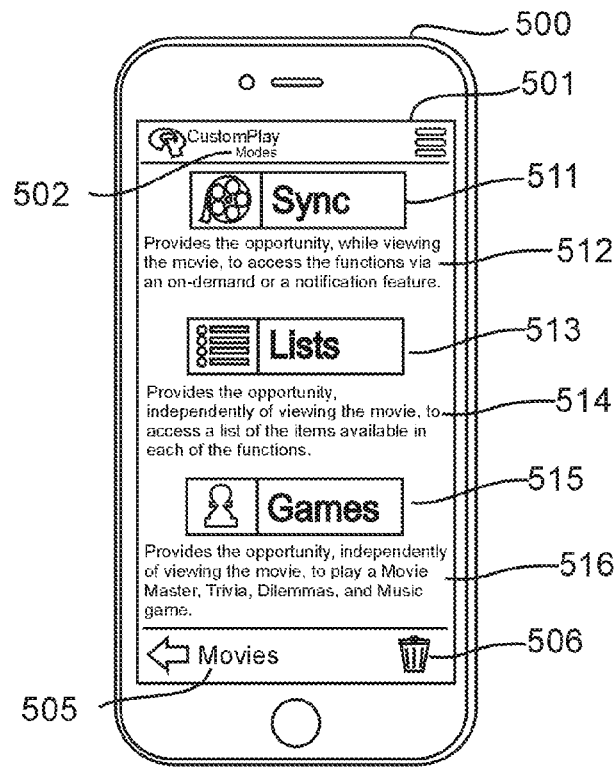
FIG. 5A is an exemplary illustration of an iPhone implementation of the application interface which enables the selection of the Sync, Lists, and Games modes.

While elements of the inventions are detailed with respect to an application running on an iPad, the possible embodiments are not limited to any particular device. For example, FIG. 5A is an exemplary illustration of an iPhone implementation of the application interface which enables the selection of the Sync, Lists, and Games modes. A comparison with its iPad counterpart demonstrates that this class of screens can be readily accommodated by dropping the display of the movie box art which serves principally a decorative function in the iPad exemplary embodiment.

In this exemplary embodiment, the application is downloaded and installed on an iPhone device 500. This interface screen 501 identifies the Mode selection as the active function 502, displays a selection button for the Sync mode 511, the Lists mode 513, and the Games mode 515, and a corresponding explanations for the Sync mode 512, the Lists mode 514, and the Games mode 516. The interface screen 501 also enables returning to the movies' map selection screen 505 and deleting the current movie map 506.

Figure 5B:
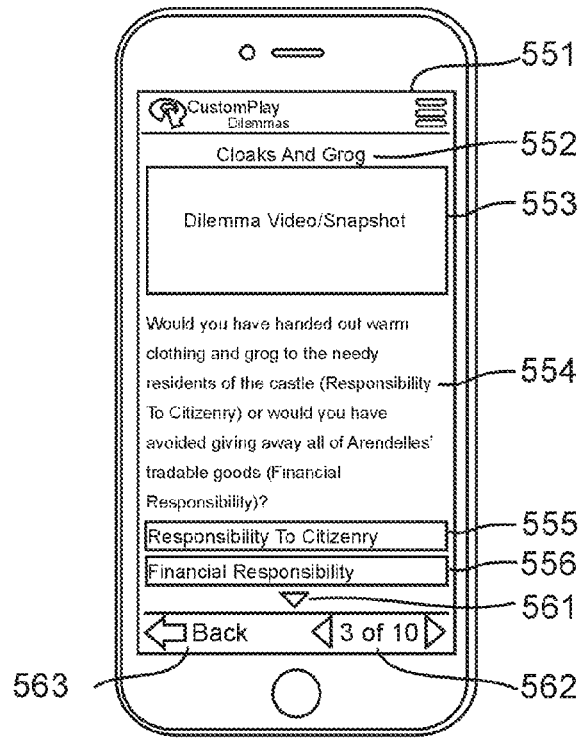
FIG. 5B is an exemplary illustration of an iPhone implementation of the application interface displaying information and features of a dilemma question available in Lists mode.

FIG. 5B is an exemplary illustration of an iPhone implementation of the application interface displaying information and features of a dilemma question available in Lists mode. A comparison with its iPad counterpart demonstrates that this class of screens can be readily accommodated by adjusting the layout and placement of the features of the function and by taking advantage of vertical scrolling capabilities of, for example, an iPhone.

As is the case with its iPad Lists mode counterpart, the features of the Dilemma function included in this exemplary embodiment 551 comprises a title 552 for a moral dilemma depicted within the movie, a dilemma video/snapshot 553 is made available to provide context for a dilemma question identifying the two moral principles that are in conflict 554, and first moral principle labeled button 555 and second moral principle labeled button 556. In this exemplary embodiment, a vertical icon 561 is displayed indicating that additional information is available by swiping down. The additional information comprises, for example, a general dilemma question, and the yes/no buttons. As is suggested by the illustrated left and right arrows and the identification of the current dilemma and the total number of dilemmas in the movie (e.g., 3 of 10) 562, a user need not return to the List screen to access a preceding or following dilemma. An iPhone embodiment, for example, enables swiping among the presentation of dilemma questions. A back arrow icon button 563 permits returning to a list selection screen.

Figure 5C:
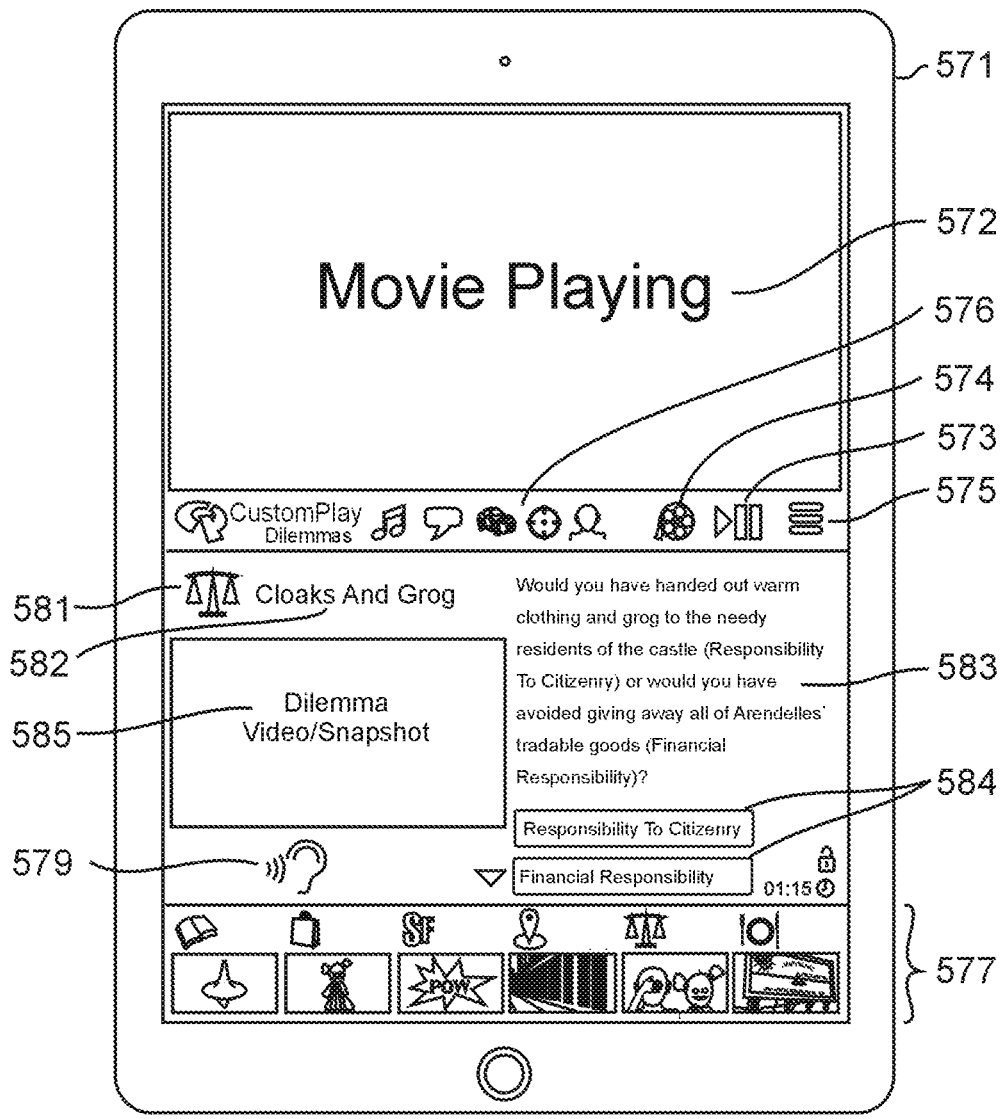
FIG. 5C is an exemplary illustration of an implementation of the application in a single device simultaneously playing a movie and displaying information and features of a function.

In a preferred embodiment, the functions of the application are synergistically integrated with a playing of a movie in a single device. FIG. 5C is an exemplary illustration of an implementation of the application in a single device simultaneously playing a movie and displaying information and features of a function. In a preferred embodiment, capabilities of a device, such as a Surface Pro, iPad Pro, laptop computer, or smart television, are utilized to simultaneously play a movie on a portion or window of the device, while providing the user the capability to access the various functions and features of the application on another portion or window of the device. In one exemplary embodiment, the movie playing is performed by an independent application, while the Sync, Lists, and Games functions are provided by a second separate application. Alternatively, a single synergistically integrated application provides both movie playing with associated movie playing controls, and the Sync, Lists, and Games functions.

The particular synchronization methodology that is implemented is responsive to the level of integration between the movie playback functions and Sync, Lists, and Games functions, as well as the capabilities of the host system. In those instances that the movie playback application is independent of the application providing the Sync, Lists, and Games functions, whether the embodiment is a single system or a combination of primary/secondary systems, synchronization may implement a methodology similar to or analogous to those detailed in the '006 publication or the '630 publication. In a single device embodiment, the synchronizing function would take advantage of the speakers and microphones commonly available in these devices. In those instances that the movie playback application may provide information to the application providing the Sync, Lists, and Games functions, whether the embodiment is a single system/device or a combination of primary/secondary system/devices, synchronization may implement a passing/retrieving, whether cooperatively or not, of synchronizing information from one application to the other. In those instances that a synergistically integrated application provides both movie playing with associated movie playing controls, and the Sync, Lists, and Games functions, then the functions of the application internally share the necessary synchronization information.

In the exemplary illustration of FIG. 5C, the capabilities of a portable computing system 571, such as a Surface Pro, iPad Pro, laptop computer, are utilized to play a movie on a portion of the screen 572. Play controls 573 (e.g., pause/play) may be provided, as illustrated, by the single integrated application or by the separate movie playing application. In a preferred embodiment, double tapping the play/pause icon 573 enables a display of a complement of movie playback controls comprising, for example, play, pause, rewind, slow rewind, slow forward, fast forward, skip forward, skip backward, angle selection, what? (rewind with subtitles), audio/subtitle controls, and brightness controls. Additionally, an edit controls icon 574 enables a display of a complement of movie editing controls comprising, for example, mark in/out, clear, include/exclude, frame forward, frame backward, and time line information and controls. Full featured edit controls 574 facilitate creating customized presentations of the movie, playlist of segments from within the movie, and extracting one or a plurality of segments from within the movie.

The exemplary illustration of FIG. 5C also depicts a Sync mode embodiment comprising a pull down menu icon button 575 that provides access to the functions of the application, on-demand functions icon buttons 576 to enable the Music, Quotes, Vehicles, Weapons, and Who on-demand functions, a timeline organized display of multiple function notifications 577, and features of the Dilemma function 581-585. In the exemplary embodiment illustrated in FIG. 5C, while the movie is playing or is paused in the movie playing window 572, responsive to the current movie play location, the movie map, and user actions, features 581-585 of the Dilemma function are displayed and enabled. In a preferred Sync mode embodiment, a notification of, and a displaying of, a moral dilemma question is in synchronization with a playing of a movie from which the moral dilemma is derived. Usually the location in the movie where the moral dilemma question is presented immediately follows the scene, portion of a scene, or depiction disclosing or establishing the elements of the moral dilemma, but ideally precedes the depiction disclosing the moral dilemma decision of the character.

The Dilemma function features are displayed and enabled comprise, for example, a function icon (e.g., Dilemma icon) 581 that identifies the active function (e.g., Dilemma function), a title 582 for a moral dilemma depicted within the movie (e.g., "Cloaks And Grog"), a moral dilemma question identifying the two moral principles that are in conflict 583 (e.g., "Would you have handed out warm clothing and grog to the needy residents of the castle (Responsibility To Citizenry) or would you have avoided giving away all of Arendelles' tradable goods (Financial Responsibility)?"), and a two moral principle labeled buttons 584 (e.g., "Responsibility To Citizenry" and "Financial Responsibility") for a user to select a choice; and a video/snapshot 585 that is responsive to the function and current play location to provide visual context. In the event that the video/snapshot is a video rather than a single video frame, a single video frame (e.g., a video frame from within the video) may be displayed until the playing of the movie is paused.

Additionally, this particular exemplary embodiment incorporates an innovative feature that addresses the shortcomings associated with written information. Advantageously, a user activating the read icon button 579 causes the playing of an audio that reads the dilemma question 583 for the user through, for example, the devices speakers. This feature may be implemented with any of the various function's write-ups or information items in any of the devises, and advantageously may be enabled by a user verbally requesting a reading (e.g., voice recognition of a "Read" command).

Figure 6A:
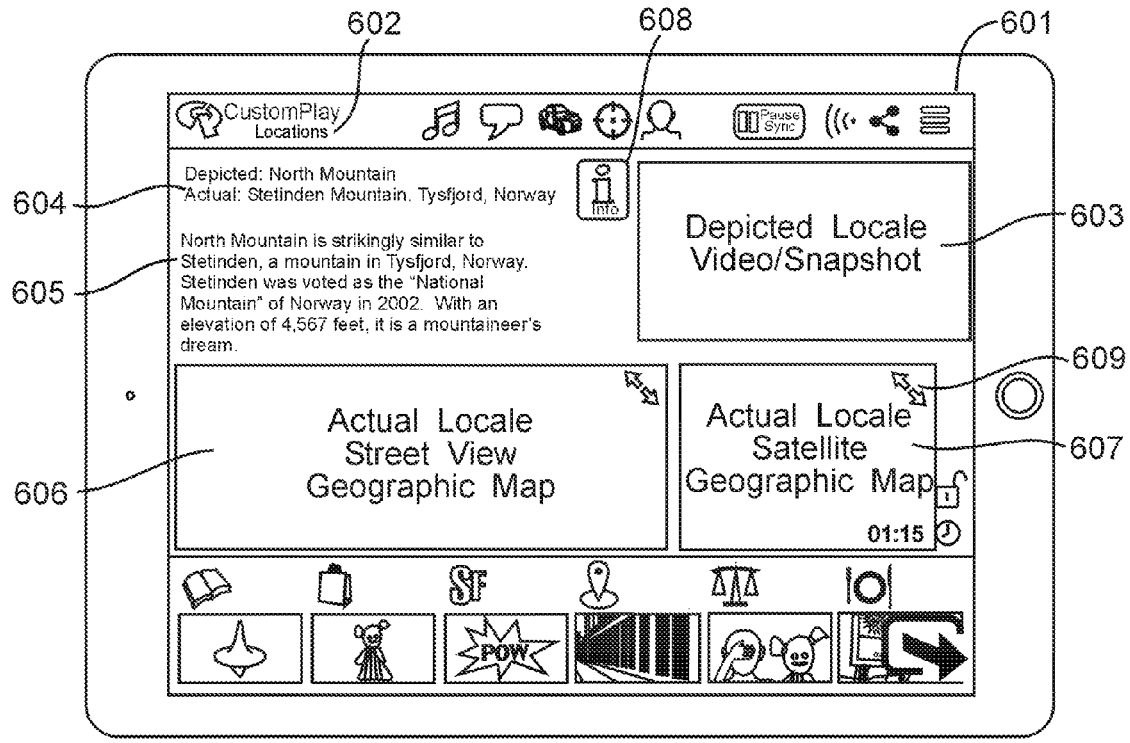
FIG. 6A is an illustration of an application interface displaying information and features of the Locations function in Sync notification mode.

FIG. 6A is an illustration of an application interface displaying information and features of the Locations function in Sync notification mode. As in other exemplary illustrations, the interface screen 601 identifies Locations as the active function 602. The displayed features of the Locations function comprises, for example, a video/snapshot 603 (e.g., a video frame) from within the movie and related to the depicted locale; an identity of the locale as represented in the movie and an actual identity of the locale 604 (e.g., Depicted: North Mountain. Actual: Stetinden Mountain, Tysfjord, Norway"); a write-up 605 (e.g., "North Mountain is strikingly similar to Stetinden, a mountain in Tysfjord, Norway. Stetinden was voted as the 'National Mountain' of Norway in 2002. With an elevation of 4,567 feet, it is a mountaineer's dream.") related to the identified actual locale (e.g., "Stetinden Mountain, Tysfjord, Norway"); an interactive Street View geographic map of the actual locale 606; an interactive satellite geographic map of the actual local 607 being at substantially the same latitude and longitude as the Street View map but at a substantially different magnification; and an information icon 608 to enable a user to retrieve, for example, a corresponding website pages of additional information relating to the actual locale. For example, in the case of a locale being associated with a restaurant, the additional information relating to the actual locale would be a menu of the restaurant's meals.

While the interactive Street View geographic map of the actual locale 606 and the interactive satellite geographic map of the actual local 607 are fully interactive within the insert portions of the primary windows, each may be independently enlarged, by pressing an enlarge/reduce button 609, to a size that substantially utilizes the entire primary window or screen.

Figure 6B:
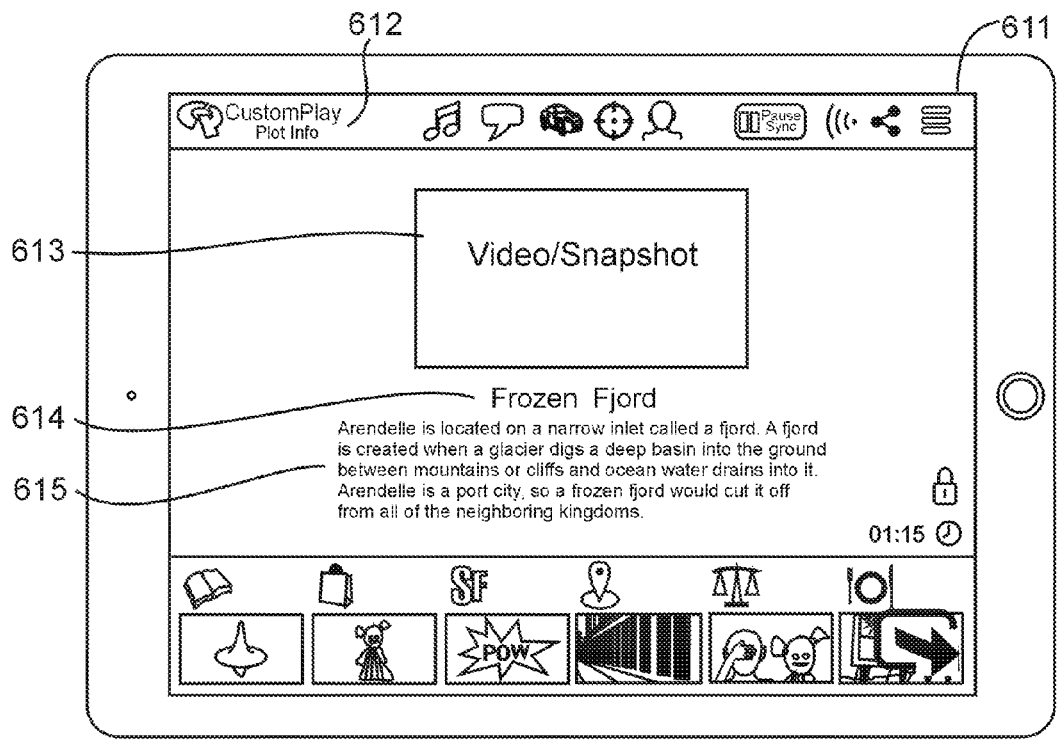
FIG. 6B is an illustration of an application interface displaying information and features of the Plot Info function in Sync notification mode.

FIG. 6B is an illustration of an application interface displaying information and features of the Plot Info function in Sync notification mode. As in other exemplary illustrations, the interface screen 611 identifies Plot Info as the active function 612. The displayed features of the Plot Info function comprises, for example, a video/snapshot 613 (e.g., a video frame) from within the movie and related to the depicted information item; a title of the Plot Info item 614; and a write-up 615 (e.g., "Arendelle is located on a narrow inlet called a fjord. A fjord is created when a glacier digs a deep basin into the ground between mountains or cliffs and ocean water drains into it. Arendelle is a port city, so a frozen fjord would cut it off from all of the neighboring kingdoms."); an interactive Street View geographic map of the actual locale 606; an interactive satellite geographic map of the actual local 607 being at substantially the same latitude and longitude as the Street View map but at a substantially different magnification; and an information icon 608 to enable a user to retrieve, for example, corresponding website pages of additional information relating to the actual locale. For example, in the case of a locale being associated with a restaurant, the additional information relating to the actual locale would be a menu of the restaurant's meals.

Figure 6C:
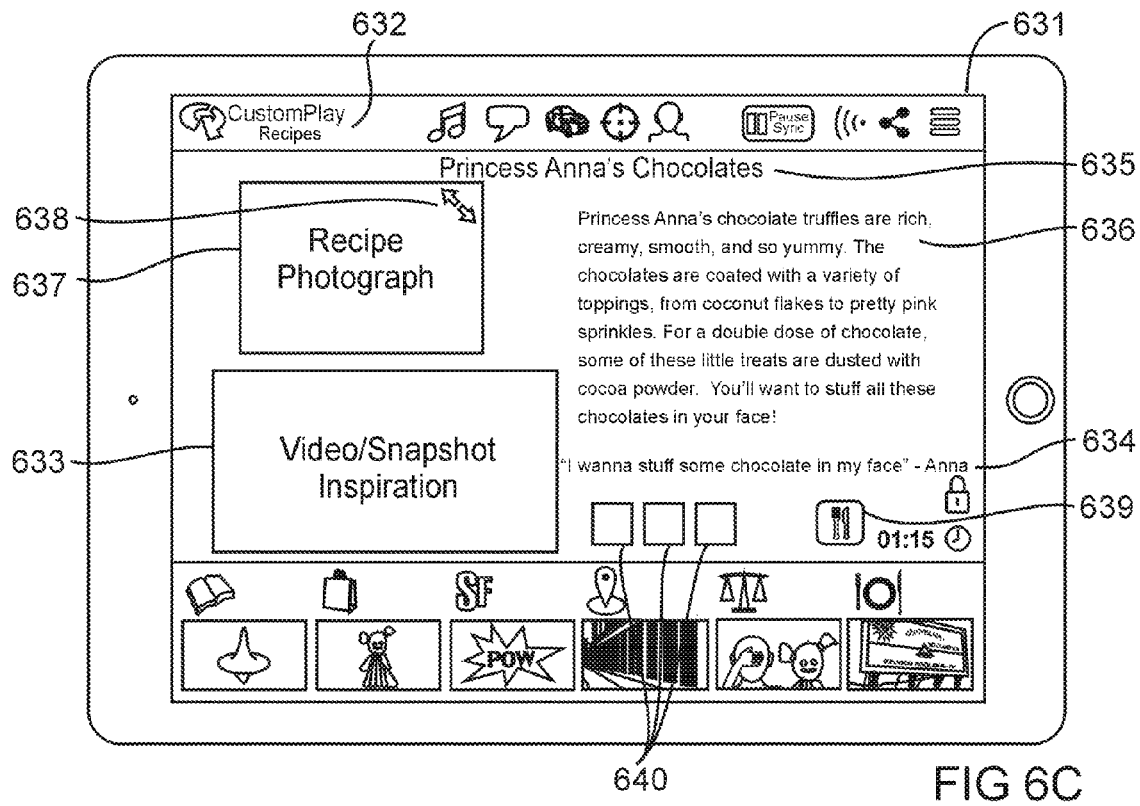
FIG. 6C is an illustration of an application interface displaying information and features of the Recipes function in Sync notification mode.

FIG. 6C is an illustration of an application interface displaying information and features of the Recipes function in Sync notification mode. As in other exemplary illustrations, the interface screen 631 identifies Recipes as the active function 632. The displayed features of the Recipes function comprises, for example, a movie video/snapshot 633 that depicts the inspiration for the food item; a quote 634 (e.g., "I wanna stuff some chocolate in my face"—Anna) from the movie that provides inspiration for, or is creatively related to the depicted food item; a recipe title 635 (e.g., "Princess Anna's Chocolates"); a food recipe write-up 636 (e.g., "Princess Anna's chocolate truffles are rich, creamy, smooth, and so yummy. The chocolates are coated with a variety of toppings, from coconut flakes to pretty pink sprinkles. For a double dose of chocolate, some of these little treats are dusted with cocoa powder. You'll want to stuff all these chocolates in your face!") relating to the identified recipe item; a photograph of the prepared and plated recipe item 637; and a recipe icon 639 that provides access to the actual recipe for the targeted food item (e.g., preparation time, servings, list of ingredients, preparation instructions, purchase links to special items or tools, individual and community ratings).

As is the case with other features and content of the functions, the photograph of the prepared and plated recipe item 637 may be enlarged, by pressing the enlarge/reduce button 638, to a size that substantially utilizes the entire primary window or screen. Additionally, dedicated social media buttons 640 (e.g., Facebook, Twitter, and Email) provide efficient posting and communications capabilities that are responsive to pre-established information relating to the active function. For example, activation of the Facebook icon would enable the application's automated preparation of a posting of information, images (e.g., recipe photograph 637), and links consistent with Facebook's requirements and responsive to the recipe item being depicted.

The application's modes and the information items supporting a function's features have the potential to enable a great variety of informative and entertaining embodiments. For example, during Sync mode, rather than automatically displaying recipe information, a user would merely be notified that the current scene has inspired a recipe. In addition to an icon representing the function, a video frame within the movie and responsive to the function and current play location is also displayed to clearly identify the video frame that is the source of the recipe inspiration. In such an embodiment, the user would be given an opportunity to think of potential recipes prior to the inspired recipe being revealed. The recipe's ingredients may be sequentially time-spaced revealed to provide additional clue to the user. Alternatively, or additionally, a user may be provided a set of recipe titles from which to select the title associated with the recipe created for the scene. At any time during the process, a next key or reveal key advances the process or discloses the created recipe.

Figure 6D:
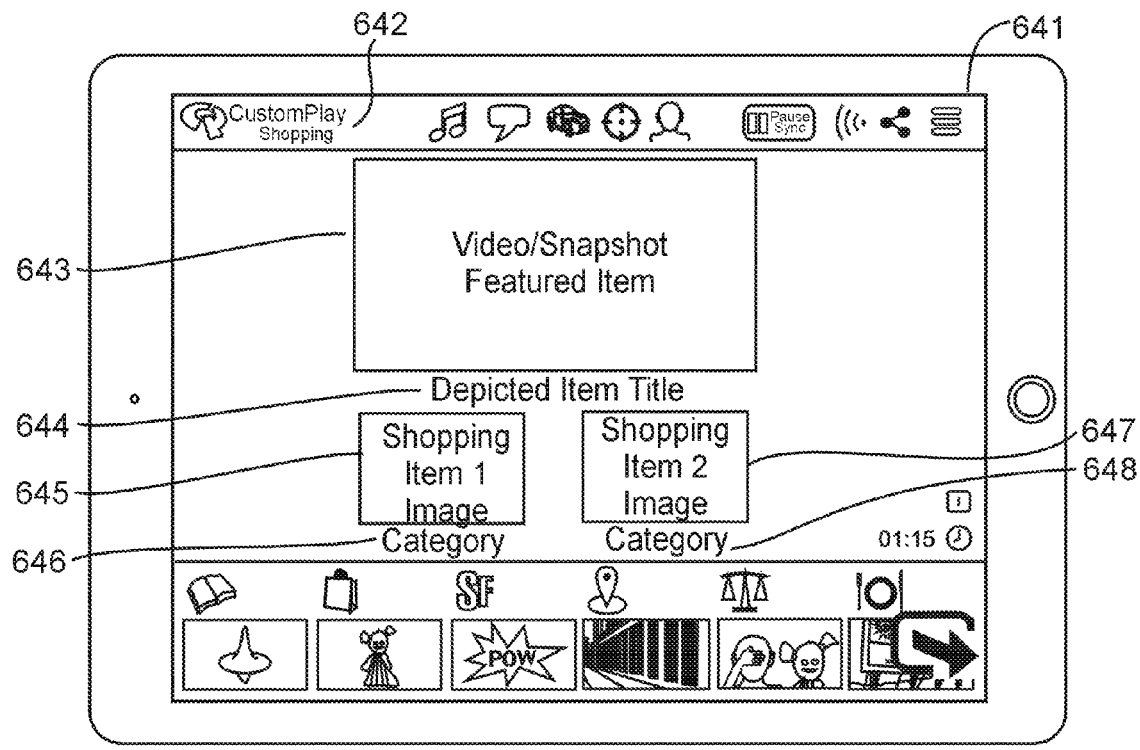
FIG. 6D is an illustration of an application interface displaying information and features of the Shopping function in Sync notification mode.

FIG. 6D is an illustration of an application interface displaying information and features of the Shopping function in Sync notification mode. As in other exemplary illustrations, the interface screen 641 identifies Shopping as the active function 642. The displayed features of the Shopping function comprises, for example, a movie video/snapshot 643 that depicts the featured item; a title or descriptor of the depicted featured item 644; an image of a shopping item 645 related to the depicted featured item; and a category title/descriptor 646 related to the shopping item. In certain situations, the displayed features of the Shopping function also comprises an image of a second shopping item 647 related to the depicted featured item; and a category title/descriptor 648 related to the second shopping item. The images of the shopping items 645 647 act as buttons to provide access to websites that provide information and/or a purchase opportunity for the displayed shopping items.

Figure 6E:
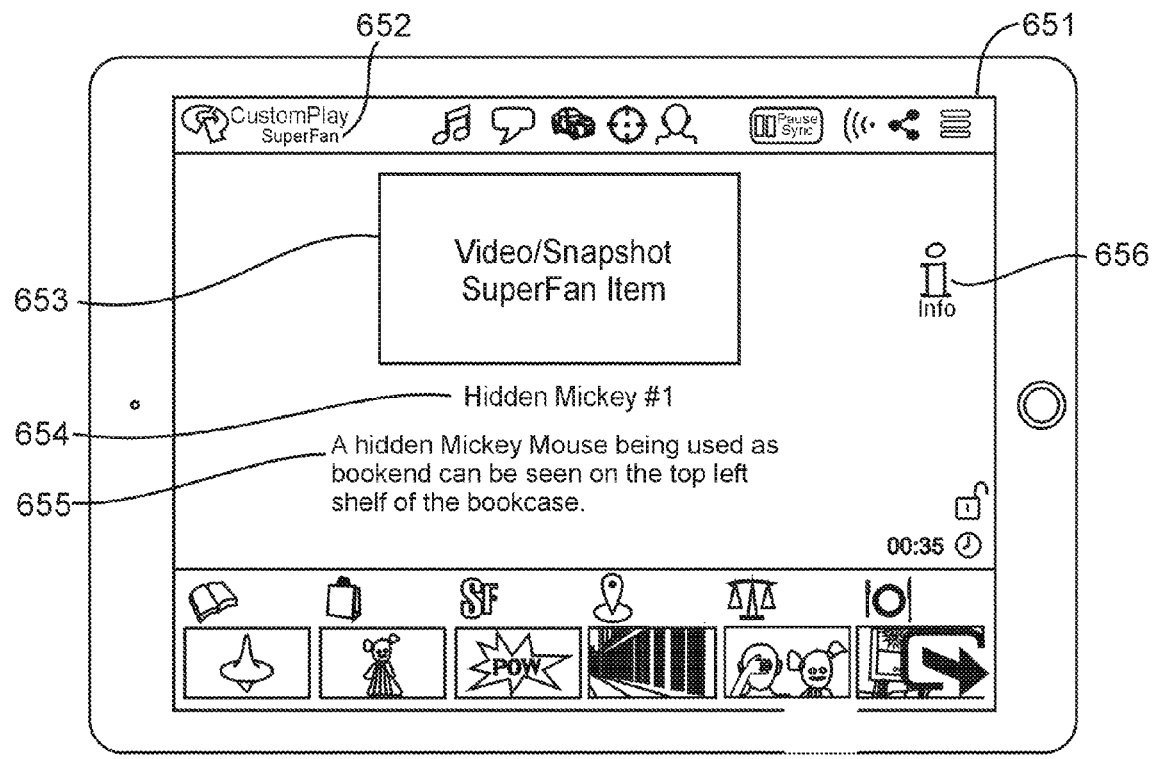
FIG. 6E is an illustration of an application interface displaying information and features of the SuperFan function in Sync notification mode.

FIG. 6E is an illustration of an application interface displaying information and features of the SuperFan function in Sync notification mode. As in other exemplary illustrations, the interface screen 651 identifies SuperFan as the active function 652. The displayed features of the SuperFan function comprises, for example, a movie video/snapshot 653 that depicts the SuperFan item; a title 654 identifying the SuperFan item; a write-up 655 explaining the SuperFan item; and an information icon 656 to enable a user to retrieve, for example, a corresponding website pages of additional information relating to the SuperFan item.

Figure 6F:
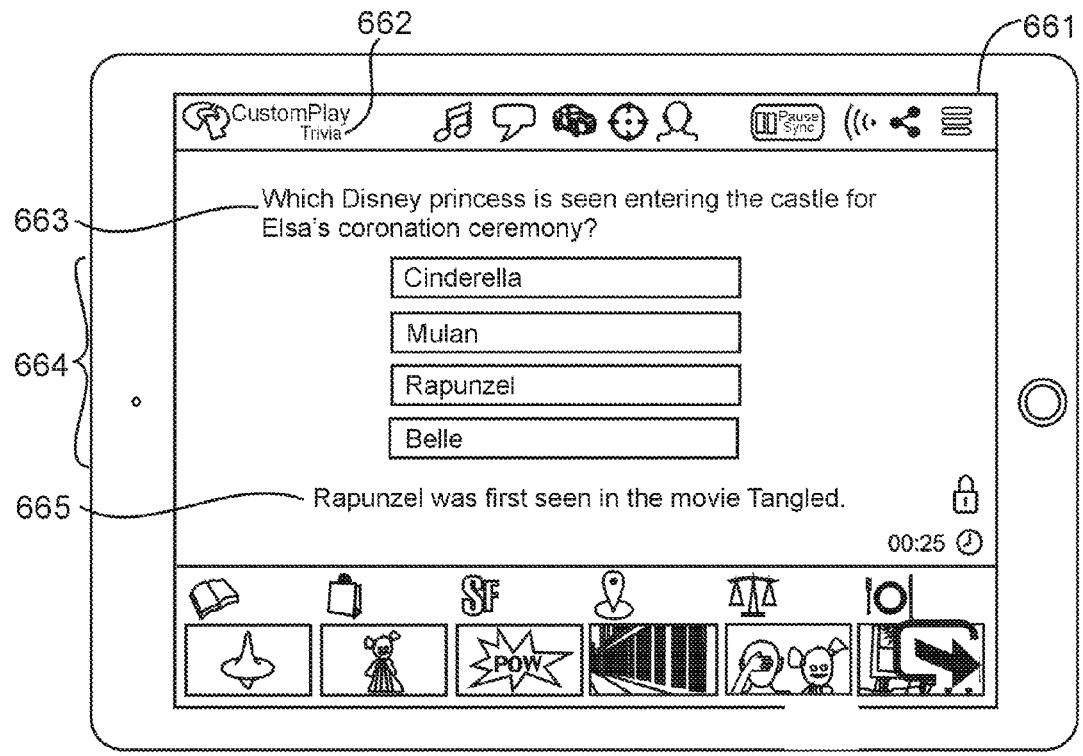
FIG. 6F is an illustration of an application interface displaying information and features of the Trivia function in Sync notification mode.

FIG. 6F is an illustration of an application interface displaying information and features of the Trivia function in Sync notification mode. As in other exemplary illustrations, the interface screen 661 identifies Trivia as the active function 662. The displayed features of the Trivia function comprises, for example, a question 663 that, preferably although not necessarily, relates to the substantially synchronized depiction of content from within the movie; a set of potential answers 664, and a write-up 665 explaining a correct answer and/or providing additional information relating to the subject matter of the questions. Obviously, the write-up 665 explaining a correct answer is not displayed until after the user has selected at least one of the answers or, depending on the feature design, selected the correct answer.

Figure 7A:
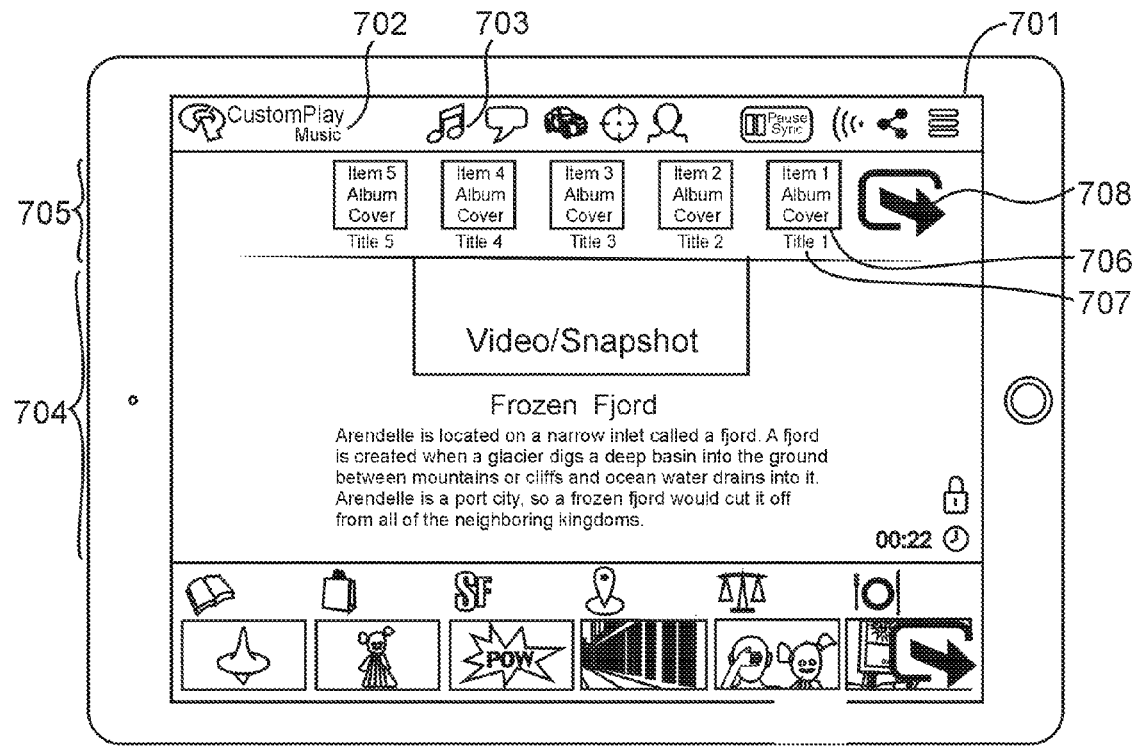
FIG. 7A is an illustration of an application interface displaying information and features of the Music function in Sync on-demand mode.

FIG. 7A is an illustration of an application interface displaying information and features of the Music function in Sync on-demand mode. The Music function is Sync on-demand mode is activated by pressing the Music function on-demand icon button 703 at any time during the playing of the movie. In this example, the Music function on-demand icon button 703 has been activated while the primary screen displayed features of the Plot Info function 704. Upon activation of the Music function, the interface screen 701 identifies Music as the active function 702, and superimposes a Music timeline 705 depicting, responsive to the current movie play location, an album cover art 706 and a title 707 for each of a plurality (e.g., 5) of the most recent musical items played in the movie. As in the notification timeline, the identification of the most recent musical items played (e.g., Item 1) is located last in the timeline.

Alternatively, or additionally, to displaying an album cover art 706 and a title 707, a video/snapshot, that is representative of the depiction within the movie that is associated with the musical item, may be displayed. As in the case with the notification timeline, when a user scrolls backwards through the Music timeline 705 so that the current musical item is no longer visible in the time line, a re-sync timeline icon button 708 is displayed.

Figure 7B:
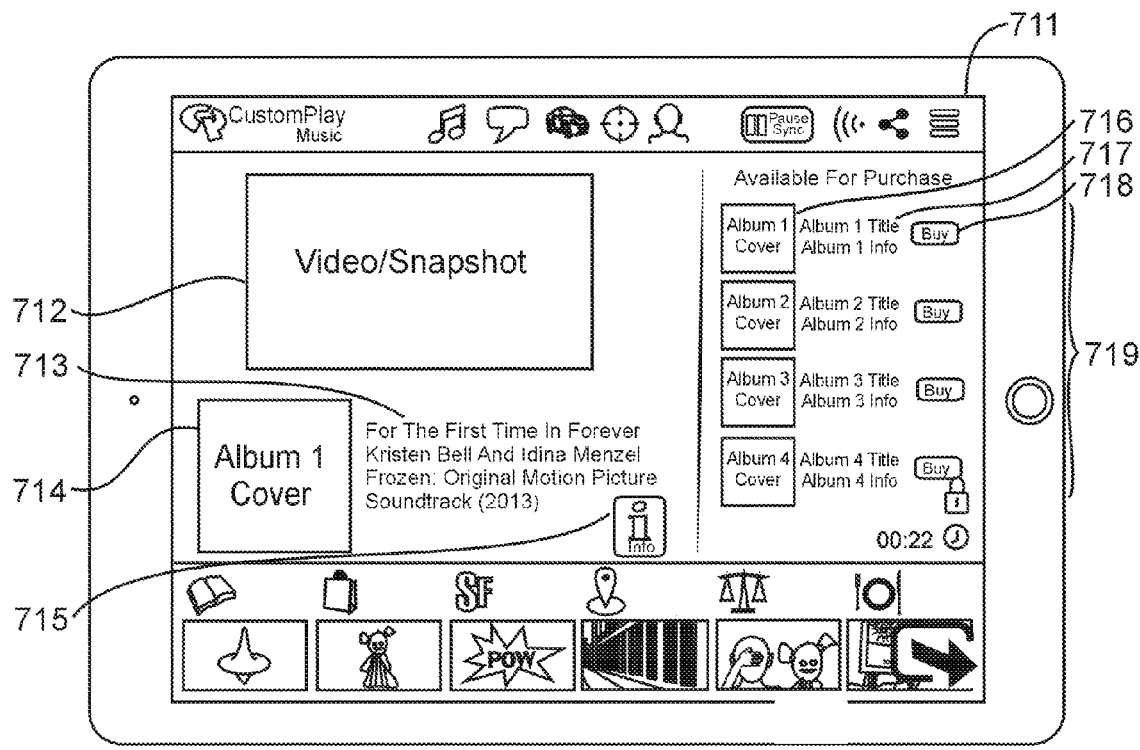
FIG. 7B is an illustration of an application interface displaying information and features of the Music function for a selected musical item.

Upon selection of an item in the Music timeline, the features of the Music function associated with a specific musical item are displayed. FIG. 7B is an illustration of an application interface displaying information and features of the Music function for a selected musical item. The application interface's 711 displayed features of the Music function in Sync on-demand mode comprises, for example, a video/snapshot that is representative of the depiction within the movie that is associated with the selected musical item 712; a song title, artist, album, and release year 713; album art 714; a write-up providing information relating to the musical item; and an information icon 715 to enable a user to retrieve, for example, from a remote source or a local source, information relating to the musical item, the artist, or the musical item as it relates to the movie.

Advantageously, the displayed features of the Music function in Sync on-demand mode also comprises the display of information relating to the purchase of the musical item. Musical item purchase information comprises, for example, album cover art 716, album title and information 717, and one or more icon buttons 718 to enable purchasing the musical item directly or from a third party website, resource, merchant, or artist (e.g., iTunes, Google Play, or a source directly controlled by the artist). As is depicted in the interface 711, the musical item purchase information 719 may be provided for one or a plurality of album titles, releases, or renditions of the musical item.

Figure 7C:
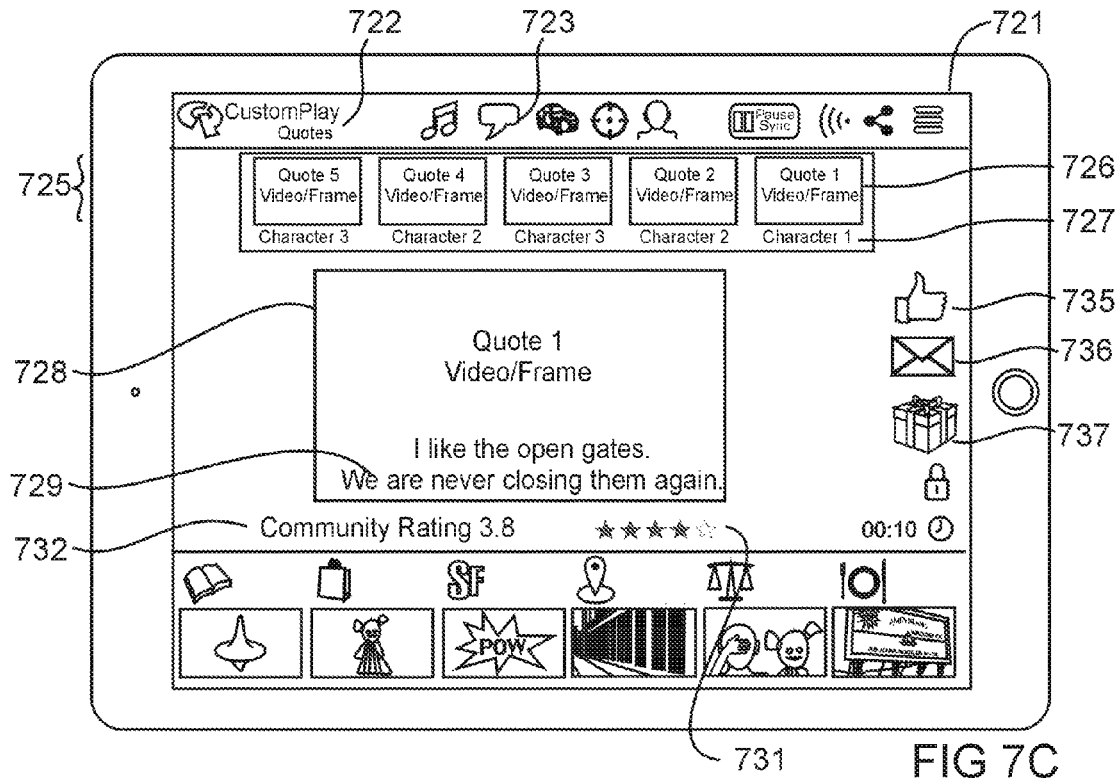
FIG. 7C is an illustration of an application interface displaying information and features of the Quotes function in Sync on-demand mode.

FIG. 7C is an illustration of an application interface displaying information and features of the Quotes function in Sync on-demand mode. The Quotes function is Sync on-demand mode is activated by pressing the Quotes function on-demand icon button 723 at any time during the playing of the movie. In this example, the Quotes function on-demand icon button 723 has been activated. Upon activation of the Quotes function, the interface screen 721 identifies Quotes as the active function 722, and superimposes a Quotes timeline 725 depicting, responsive to the current movie play location, a video/snapshot 726 that is representative of the depiction within the movie that is associated with the quotation item, and depicting a descriptor 727 relating to the quotation item (e.g., a name of the character relating to the quotation, usually the character that spoke the quote dialogue). The video/snapshot 726 and the descriptor 727 are depicted for each of a plurality (e.g., 5) of the most recent quotation items played in the movie. As in the notification timeline, the identification of the most quotation items played (e.g., Quote 1) is located last in the timeline.

Upon selection of an item in the Quotes timeline, the features of the Quotes function associated with a specific quotation item are displayed in the primary window. The displayed features of the Quotes function in Sync on-demand mode comprises, for example, a video/snapshot that is representative of the depiction within the movie that is associated with the selected quotation item 728; and the text of the actual quotation 729. Additionally, a user is provided the means to rate the quote 731 (e.g. 1-5 stars), and following a user indicating a rating, a community rating is displayed 732. An innovative feature of the Quote function is the capability to automatically generate a meme suitable for sharing on a social media platform 735 (e.g., Facebook), or for otherwise communicating 736 (e.g., email). An innovative commercial feature of the Quote function is the capability to efficiently purchase 737 one of a plurality of quote customized products (e.g., t-shirts, mugs, banners, posters, decals, and bumper stickers) featuring the quote and an image. As is detailed with respect to the Music function in Sync on-demand mode, the depiction of the Quotes timeline need not be displayed at the same time that the features of the Quote function are displayed in the primary screen.

Figure 7D:
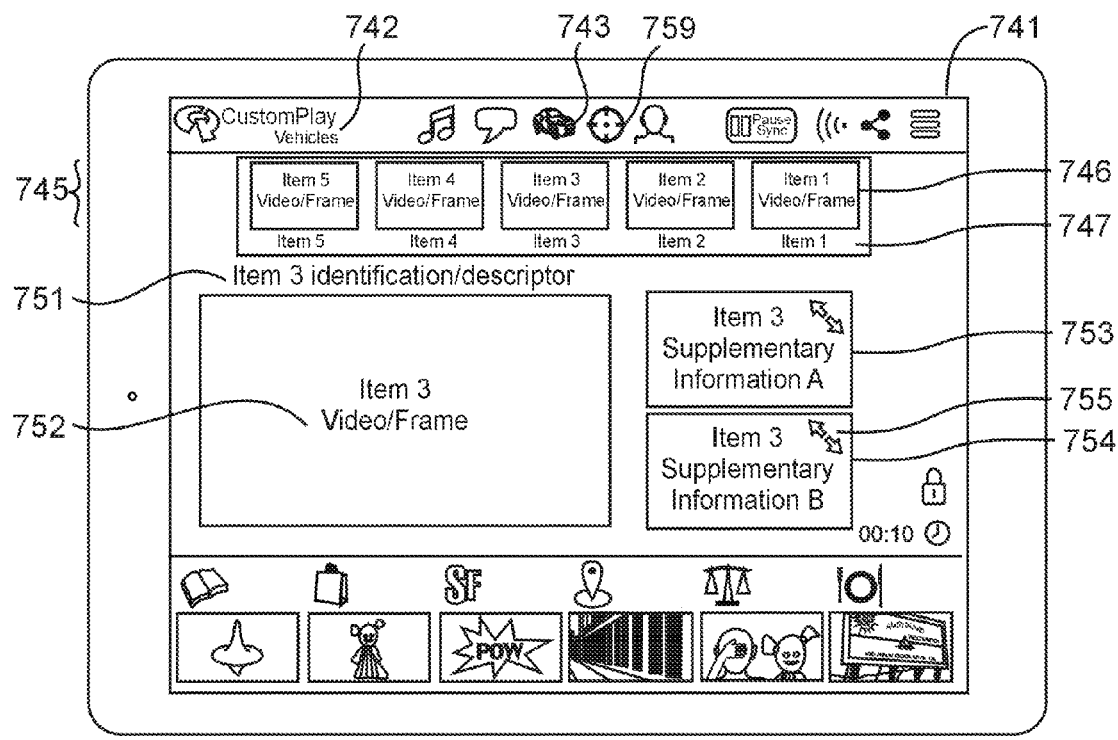
FIG. 7D is an illustration of an application interface displaying information and features of the Vehicles and Weapons functions in Sync on-demand mode.

FIG. 7D is an illustration of an application interface displaying information and features of the Vehicles and Weapons functions in Sync on-demand mode. The Vehicles function is Sync on-demand mode is activated by pressing the Vehicles function on-demand icon button 743 at any time during the playing of the movie. Similarly, the Weapons function is Sync on-demand mode is activated by pressing the Weapons function on-demand icon button 759 at any time during the playing of the movie. The illustrative example detailed with respect to FIG. 7D is applicable to both the Vehicles and Weapons functions as well as any item, and thus the illustration utilizes the term "item".

In this example, the Vehicles function on-demand icon button 743 has been activated. Upon activation of the Vehicles function, the interface screen 741 identifies Vehicles as the active function 742, and superimposes a Vehicles timeline 745 depicting, responsive to the current movie play location, a video/snapshot 746 that is representative of the depiction within the movie that is associated with the vehicle item, and depicting a descriptor 747 relating to the vehicle item (e.g., an identification of an automobile). The video/snapshot 746 and the descriptor 747 are depicted for each of a plurality (e.g., 5) of the most recent vehicle items played in the movie. As in the notification timeline, the identification of the most recently depicted vehicle (e.g., Item 1) is located last in the timeline.

Upon selection of an item in the Vehicles timeline, the features of the Vehicles function associated with a specific vehicle item are displayed in the primary window. The displayed features of the Vehicles function in Sync on-demand mode comprises, for example, a title, identification, and/or descriptor of the vehicle item 751; a video/snapshot that is representative of the depiction within the movie of the selected vehicle item 752; a selectable image/video 753 associated with an internally or externally retrievable supplementary information relating to the selected vehicle item; and a second selectable image/video 754 associated with an internally or externally retrievable alternative and/or complementary supplementary information relating to the selected vehicle item. The retrievable supplementary information 753 and the retrievable alternative and/or complementary supplementary information 754 may be accessed and enlarged, by pressing an enlarge/reduce button 755, to a size that substantially utilizes the entire primary window or screen. If the supplementary information is obtained from a website, the content of the website may be encapsulated within the primary window or the entire screen. As is detailed with respect to the Music function in Sync on-demand mode, the depiction of the Vehicles timeline need not be displayed at the same time that the features of the Vehicles function are displayed in the primary screen.

Figure 7E:
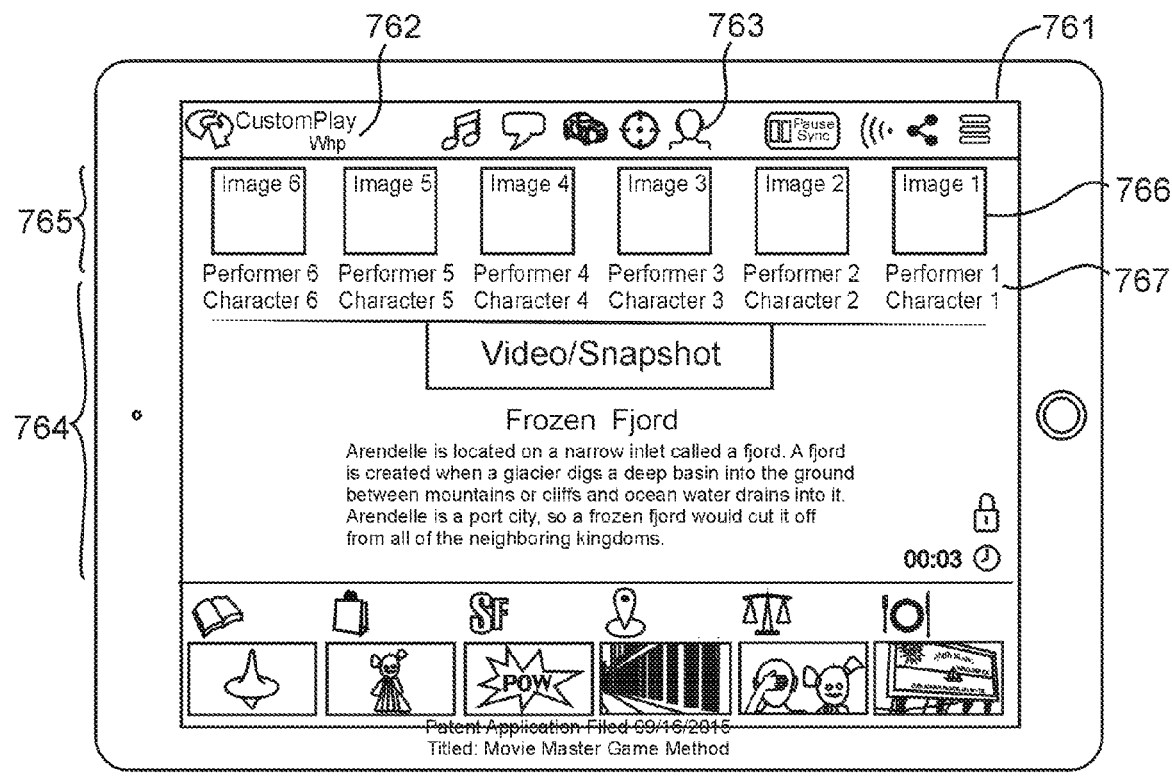
FIG. 7E is an illustration of an application interface displaying information and features of the Who function in Sync on-demand mode.

FIG. 7E is an illustration of an application interface displaying information and features of the Who function in Sync on-demand mode. The Who function is Sync on-demand mode is activated by pressing the Who function on-demand icon button 763 at any time during the playing of the movie. In this example, the Who function on-demand icon button 763 has been activated while the primary screen displayed features of the Plot Info function 764. Upon activation of the Who function, the interface screen 761 identifies Music as the active function 762, and superimposes a Who timeline 765 depicting, responsive to the current movie play location, an video/frame or image of the performer/character 766, preferable extracted from within the movie for each of a plurality (e.g., 5) of the most recent characters depicted during the playing of the movie.

As in the notification timeline, the identification of the most recent characters played (e.g., Image 1) is located last in the timeline. As in the case with the notification timeline, when a user scrolls backwards through the Who timeline 765 so that the current performer/character is no longer visible in the time line, a re-sync timeline icon button is displayed. Generally, especially in the case of the Who on-demand timelines, a single instance of performer/character is included in the timeline irrespective of the number of times that the performer/character may be included in the movie map. Duplicate instances of a performer/character are not included in the timeline. Nonetheless, advantageously, the identification of a performer/character in the Who timeline may be duplicated if, for example, a user scrolls backwards through the Who timeline materially past a first identification of the performer/character. Further, the identification of a performer is duplicated when the performer is associated with different characters. In those instances the image 766 is responsive to the particular performer/character combination.

Figure 7F:
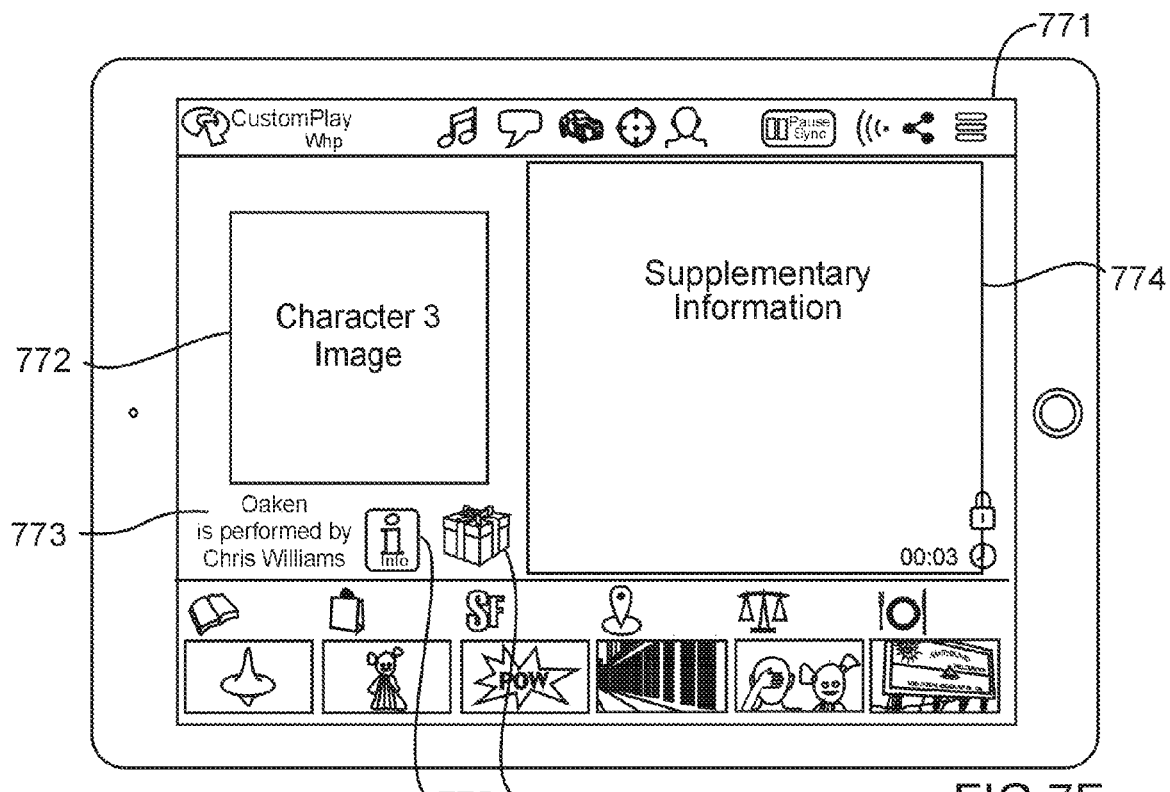
FIG. 7F is an illustration of an application interface displaying information and features of the Who function for a selected performer/character.

Upon selection of an item in the Who timeline, the features of the Who function associated with a specific performer/character are displayed. FIG. 7F is an illustration of an application interface displaying information and features of the Who function for a selected performer/character. The application interface's 771 displayed features of the Who function in Sync on-demand mode comprises, for example, a video/snapshot that is representative of the performer/character as depicted within the movie 772; an identification of the performer/character 773 (e.g., Oaken is performed by Chris Williams), supplementary information 774 relating to the performer/character; and an information icon 775 to enable a user to retrieve, for example, from a remote source or a local source, information relating to the performer/character. The information icon button 775 enables toggling the supplementary information 774 between performer information and character information.

Advantageously, the displayed features of the Who function in Sync on-demand mode also comprises the display of information relating to the purchase of responsive items. One or more icon buttons 778 enable purchasing items directly or from a third party website, resource, merchant, or performer (e.g., iTunes, Google Play, or a source directly controlled by the performer).

In one embodiment, responsive to a user preference and linkage information, the supplementary information 774 provided defaults to, for example, a website page providing information about the performer (e.g., Chris Williams IMDb website page) who performed the character (e.g., Oaken in the movie Frozen) and comprises a performer image, biography information, and filmography information. In the case of character supplementary information, the Who function information includes a write-up of the character and additionally or alternatively a linkage to a website page of the character (e.g., disney.wikia.com/wiki/Oaken). In a preferred embodiment, the information icon button 775 enables a user to sequence through a plurality of informative and/or entertaining supplementary information related to the performer and/or the character. For example, in this implementation, the information items supporting the Who function comprise a plurality of website links each specifically chosen for their particularly noteworthy entertainment or information value (e.g., mic.com/articles/79455/7-moments-that-made-frozen-the-most-progressive-disney-movie-ever).

Alternatively, in, for example, a simpler embodiment, upon selection of an item in the Who timeline, a website page providing information about the performer (e.g., Chris Williams IMDb website page) who performed the character (e.g., Oaken in the movie Frozen) is displayed in the entire primary window or screen.

The probability that information for an item is available when a user may request it is a principal factor in determining whether a function, in Sync mode, is implemented as an on-demand methodology or as a notification methodology. For example, if the Filmmaking function is selective in the presentation of information relating to the making of the movie, the filmmaking function would be best be implemented utilizing the notification methodology. Alternatively, if the Filmmaking function is exhaustive in the presentation of information relating to the making of the movie, the filmmaking function would be best be implemented utilizing an on-demand methodology. Therefore, while some functions have been described in the context of the notification methodology and other in the context of the on-demand methodology, the functions are not necessarily confined to either presentation methodology.

Further, the presentation of the information and features of the functions detailed herein is not limited to the particular manner that is illustrated in this disclosure. U.S. patent application publication 20150093093 titled "Second Screen Subtitles Function", U.S. patent publication 20150170325 titled "Second Screen Recipes Function", and U.S. patent application Ser. No. 14/856,456 titled "Moral Dilemma Movie Game Method", disclose other possible presentation methodologies and configurations of the information and features of the functions detailed herein. Accordingly, the entire disclosures of these references are hereby incorporated by reference.

Figure 8A:
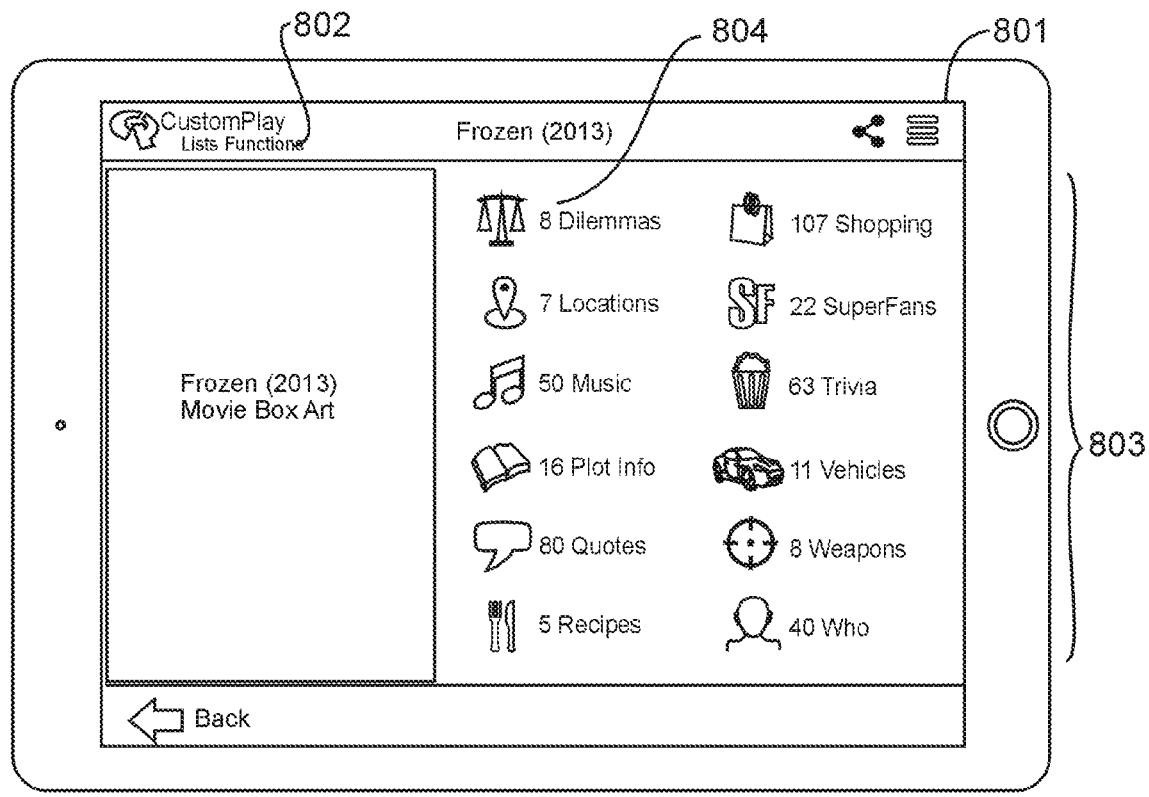
FIG. 8A is an illustration of an application interface enabling the selection of one of the functions in Lists mode.

Still further, as the incorporated references detail, the presentation of the information and features of the functions is not limited to the Sync mode. For example, FIG. 8A is an illustration of an application interface enabling the selection of one of the functions in Lists mode. In Lists mode the user is provided the opportunity, independently of viewing the movie (i.e., without requiring synchronization with the playing of the movie), to access the application's functions. This interface screen 801 identifies the Lists functions selection as the active function 802, and displays function icons for each of a plurality of functions 803. The information and features of each functions is available from a list of the available items. In the example of FIG. 8A, the number of items available in each function for the selected movie are displayed 804 (e.g., 8 Dilemmas).

Figure 8B:
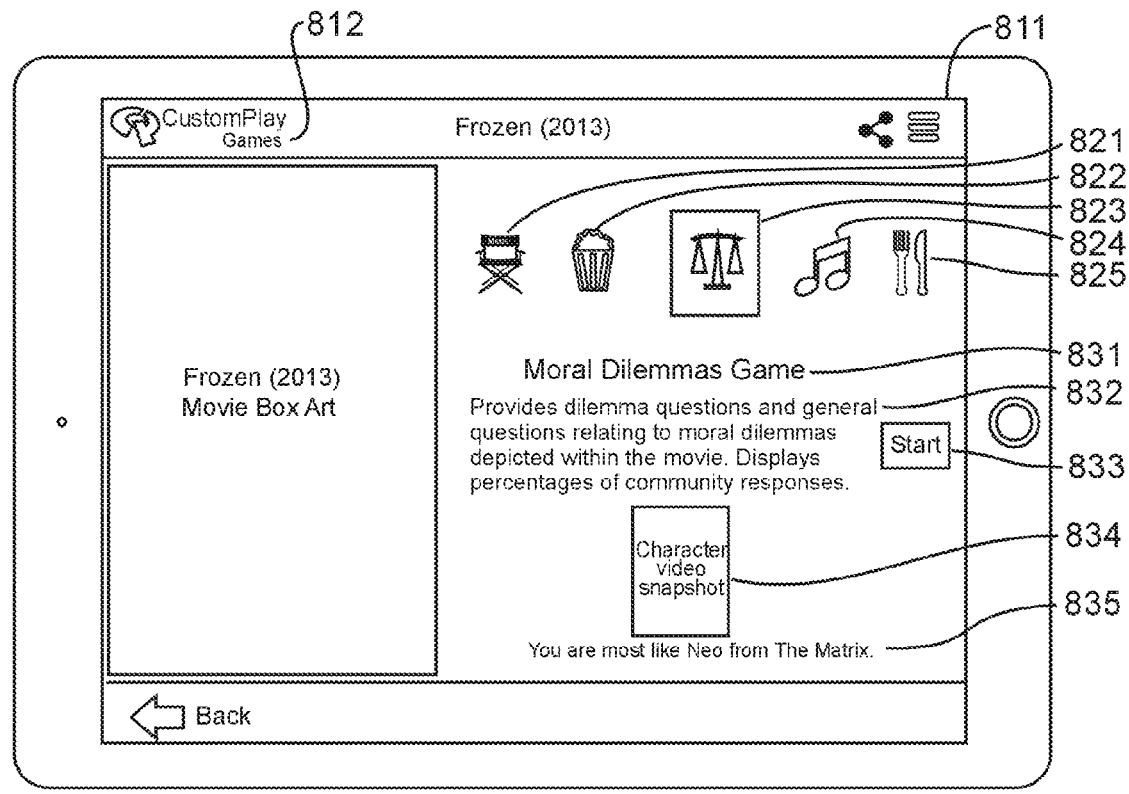
FIG. 8B is an illustration of an application interface enabling the selection of one of the informational and entertainment functions in Games mode.

FIG. 8B is an illustration of an application interface enabling the selection of one of the informational and entertainment functions in Games mode. In Games mode the user is provided the opportunity, independently of viewing the movie, to play any of a number of games that utilize various features and information of the functions. This interface screen 811 identifies the Games selection as the active function 812. In the example of FIG. 8B, the available games are Movie Master 821, Trivia 822, Dilemmas 823, Music 824, and Recipes 825. Selecting an icon 823 causes the display of game identification 831, such as a title, and a write-up 832 describing the game. A start button 833 enables the playing of the selected game 823. In the event that a selected game was previously played, a trophy, award, score, and/or information are displayed. In the case of the Dilemmas game 823, the information comprises a character video/snapshot 834 and a write-up 835 (e.g., "You are most like Neo from The Matrix.")

Figure 9A:
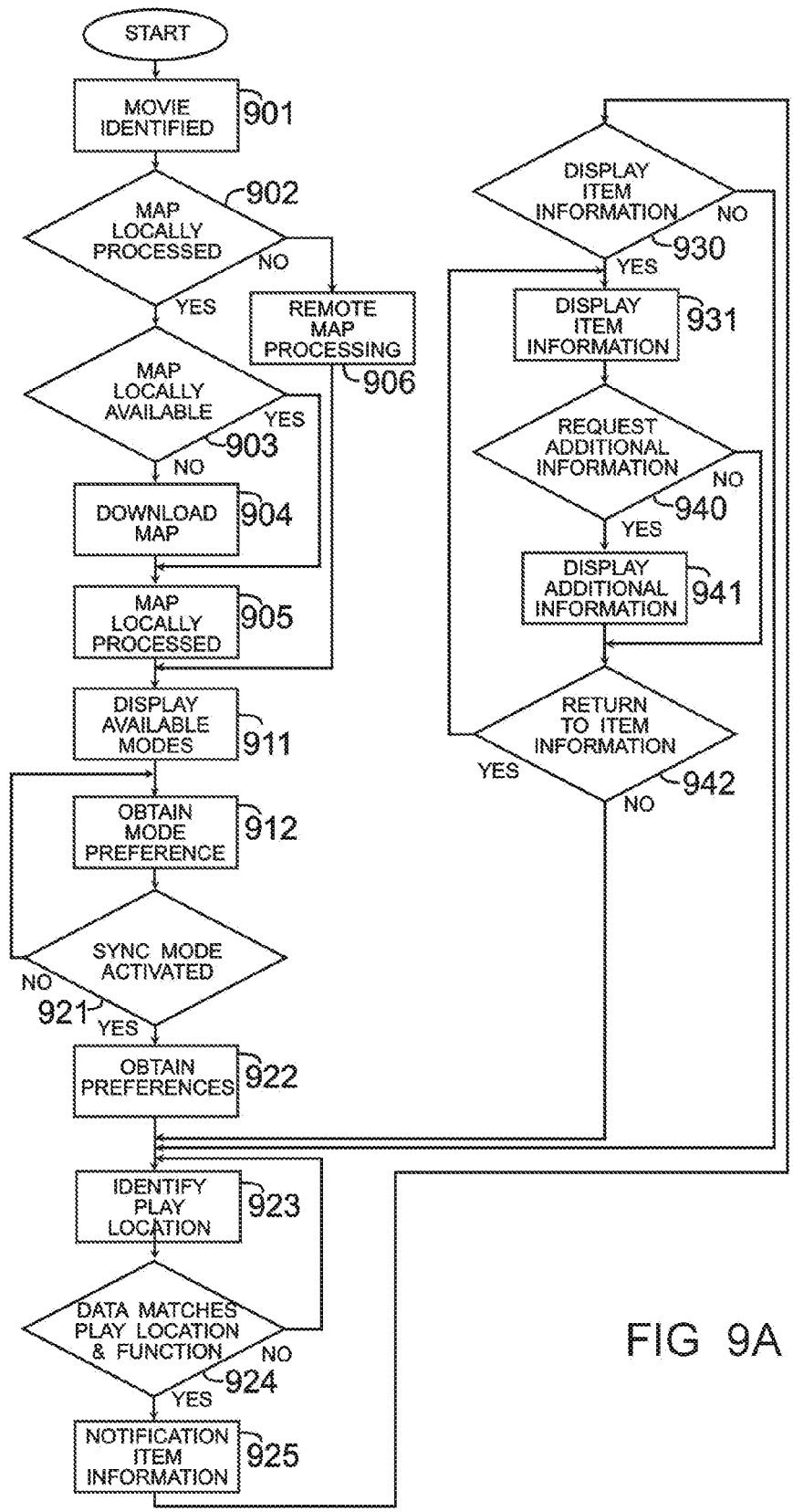
FIG. 9A is a flow chart of a method of accessing the application functions.

FIG. 9A is a flow chart of a method of accessing the application functions. The method is implemented with an apparatus, such as a smartphone, tablet, personal computer, capable of processing information and instructions executable by a processor. This particular embodiment is detailed with respect to the Sync mode, and thus the functions are engaged substantially in synchronization with the playing of the corresponding movie. The disclosures of the '325 publication with respect to the Second Screen Embodiments (e.g., ¶¶ 219-265 and related FIGS) are incorporated herein by reference.

Referring to FIG. 9A, in a preferred embodiment, following a selection of a movie, a user identifies the movie being played to the software application. Alternatively, the movie being played is identified by, for example, an audio fingerprint matching methodology. In an exemplary embodiment, as the movie is played, the application obtains sufficient instances of a representation (e.g., acoustic fingerprint, digital fingerprint, or audio signature) of the audio to be able to identify, within a certain time, the movie being played 901. If the movie or a particular release of the movie is not identified, an appropriate message seeking user input may be provided.

In those embodiments, where the movie map is processed locally by the system's application 902, once the movie is identified 901, a search of the available movie maps is performed 903 to determine if a movie map for the identified movie is currently stored in the system. If a map is not locally available 903, or if updating of maps is automatically performed at this point, then the map is downloaded from a remote source 904 (e.g., a web server) and processed 905 (e.g., merged with local user database and/or updating). If a map is locally available 903 and updating of the map is not required or possible, the map is locally processed 905 to display the available application modes (e.g., Sync, Lists, and Games) 911. If a map is not locally processed 902, then the map is processed by another system and/or remotely processed 906 in order to communicate to, and display the available modes on the local device 911.

A user's mode, function, and feature preferences may be pre-established, established, and/or modified at any time (e.g., prior to or during a playing of the movie). The mode, function, and feature preferences are obtained 912 to determine if the Sync mode has been activated 921. If the Sync mode has not been activated 921, then the application remains on the mode selection screen 912, and/or, for example, remains on standby mode to receive further user or system actions.

If the sync mode has been selected 921, then the function and feature preferences are obtained 922 and the play location within the movie is identified 923. Once a play location within the movie is identified 923, the item data is queried 924 (e.g., a plurality of video frame identifiers and/or segments are searched) to identify video frame identifiers and/or segments that are responsive to the play location and the particular notifications that are activated. If no data is responsive, then the play location is continued to be monitored 923. If data is responsive 924, a notification that item information is available is initiated 925. In addition to a visual display, the notification that item information is availability 925 may additionally or alternatively comprise and audio notification, vibration, and/or increase brightness of the second screen or portion of the second screen.

If the particular embodiment implements a contemporaneous display of features of a function 930, then alternatively to, or in addition to, the item notification 925, the information associated with an item that is responsive to the play location and the activated function (e.g., Dilemma function) is automatically displayed 931. Item information comprises features of a function such as a dilemma question. If the particular embodiments does not implements an automatic display of features of a function 930, then, in addition to, the item notification 925 and following a user request, the features associated with an item that is responsive to the play location and the activated function are displayed 931 (e.g., a dilemma question is displayed). If a user's request for item information is in response to a prior item notification, then the information associated with that prior notification is utilized to display the appropriate item information.

If a request is not received from a user for item information 930 in response to the display of an indication that item information is available 925, then, if the function notification mode is still activated 921, the current play location is continued to be monitored 923.

If a user requests additional item information 940 relating to displayed item information 931, then the display of additional item information is enabled 941 in response to the request for additional item information. Termination of the display of additional item information 942 returns to the screen providing item information 931. This would be particularly advantageous where multiple item information is displayed. Alternatively, termination of the display of additional item information 941 restores the function notification activation routines 923. A termination of the display of additional item information may take many forms, such as exiting the additional information function (e.g. exiting a website, and exit or escape request). If a user does not request additional item information relating to displayed item information 940, and there are no additional items to be displayed 942, then the function notification activation routines 923 are restored, unless the user elects to exit the application.

The flow chart of FIG. 9A has been intentionally drafted to disclose a number of possible embodiments. A number of permutations, combinations, substitutions, and/or additions in the specific steps, and recursive functions may be initiated at different points in the process than those illustrated. In an exemplary embodiment, the step of obtaining preferences 922 is further responsive to a user activating an on-demand function (e.g., Who, What, Locations, Plot Info, Filmmaking, Trivia, and Info) during a playing of the movie. Such an action would then be followed by the identification of the current play location 923, the display of item information 931, and, if requested 940, the display of additional item information 941. Further, a step or steps may be performed at a local system (e.g., smartphone), by a remote system (e.g., remote server); or by a combination of systems (e.g., tablet, remote server, and third party website).

Second screen (e.g., a smartphone) embodiments comprise: downloading, over a communications network from a remote information provider, supplementary information (e.g., a movie map and, depending on the embodiment, an acoustic database) to a memory of the second screen device; receiving synchronizing information that is responsive to a playing of a movie on a primary screen device (e.g., the second screen device receiving, over a Wi-Fi network, from the primary screen device an identification of a current play location within the movie being played on the primary screen device; or using the second screen's built-in microphone to receive audio information, principally from movie playing on the primary screen device, to generate an acoustic fingerprint; or downloading synchronizing information from a remote information provider); establishing, responsive to the synchronizing information, a synchronization to the playing of the movie on the primary screen device (e.g., utilizing the identification of a current play location or comparing the acoustic fingerprint to an acoustic database to determine the current play location of the movie playing on the primary screen device); and displaying the supplementary information on the second screen device responsive to the synchronization to the movie playing on the primary screen device, whereby the display of supplementary information on the second screen device is synchronized to a playing of the movie on the primary screen device (e.g., television).

Individual steps may be performed by the primary screen device, the second screen device, a remote information provider, alone or in logical combination. For example, an identification of a current play location may be performed by the primary screen device, the second screen device, or by a remote information provider by means of analyzing information (e.g., an acoustic fingerprint") received from the second screen device over a computer communications network.

An embodiment that relies, for example, on the movie itself providing synchronizing information comprises a set of software applications that are capable of integrating synchronizing information within the movie, and capable of extracting and communicating the synchronizing information from the primary screen to a secondary screen in order to synchronize the display, on the second screen, of responsive information and content. In an exemplary embodiment, the hardware platform comprises a personal computer retrieving a movie from a streaming movie service provider (e.g., Google streamed movie) and displaying the movie on a primary screen. Software routines in the personal computer obtain synchronizing information (e.g., timing information such a current location time code) from the movie as the movie is played. The software application comprises routines that have access to movie playback functions that provide the required synchronizing information (e.g., time code feedback). For example, in a PC embodiment playing a Google streamed movie, the getCurrentTime function returns the time code of the current play location. Similar time code retrieval functionality is available with the Microsoft Media Player, and most software media players.

A number of methodologies may be implemented to otherwise synchronize second screen functionality with a playing of a movie on a primary screen. Generally, with respect to second screen systems and methods, and specifically, with respect to the apparatus, systems, architectures, methods, and functionalities for synchronizing the display of information on a second screen to a playing of a movie on a primary screen, the following disclosures are incorporated herein by reference: U.S. Pat. No. 8,150,165 titled "System And Method For Visual Recognition"; U.S. Pat. No. 8,374,387 titled "Video Entity Recognition In Compressed Digital Video Streams"; U.S. Pat. No. 8,516,528 titled "Synchronization Of 2nd Screen Applications"; U.S. Pat. No. 8,516,533 titled "Second Screen Methods And Arrangements"; U.S. patent application 20110289532 titled "System And Method For Interactive Second Screen"; U.S. patent application 20090327894 titled "Systems And Methods For Remote Control Of Interactive Video"; U.S. patent application 20130111514 titled "Second Screen Interactive Platform"; and U.S. patent application 20140071342 titled "Second Screen Content".

In those instances where the movie does not directly provide current play location data, synchronization may be accomplished by continuously and/or intermittingly matching audio samples (e.g., an acoustic fingerprint) captured from the movie to a database of acoustic data in order to obtain movie map synchronization with a playing of a movie on a primary system device. In an acoustic fingerprint embodiment, a second screen device receiving synchronizing information that is responsive to a movie playing on a primary screen device may comprise, for example, the second screen device's microphone capabilities receiving (e.g., listening to) an audio that is provided by a playing of the movie. The following disclosures, exemplary of the references available to one of ordinary skill in the art, are incorporated herein by reference: U.S. Pat. No. 6,990,453 titled "System and methods for recognizing sound and music signals in high noise and distortion", U.S. Pat. No. 7,194,752 titled "Method and apparatus for automatically recognizing input audio and/or video streams"; U.S. Pat. No. 7,627,477 titled "Robust and invariant audio pattern matching"; U.S. Pat. No. 7,907,211 titled "Method and device for generating and detecting fingerprints for synchronizing audio and video"; U.S. Pat. No. 8,452,586 titled "Identifying music from peaks of a reference sound fingerprint"; and U.S. Pat. No. 8,686,271 titled "Methods and systems for synchronizing media". Currently available open source applications, such as Echonest, are exemplary of provide source code for the implementation of acoustic fingerprint synchronization.

A current play location within a movie may be identified by continuously and/or intermittingly matching audio samples (e.g., an acoustic signature) to a database of acoustic data to retain movie map synchronization with the playing of the movie on the primary screen. "An acoustic fingerprint is a condensed digital summary, deterministically generated from an audio signal, that can be used to identify an audio sample or quickly locate similar items in an audio database." (Source: Wikipedia acoustic fingerprint.) Intermittent samples of audio (e.g., an acoustic fingerprint every 20 seconds or approximately a total of 360 samples in an average motion picture) may be supplemented by maintaining an expected play clock during the sampling interval. Advantageously, the methodology may reduce the amount of acoustic signature data in the movie map while still providing an effective identification of a current play location within the necessary precision tolerances. Further, the methodology enables materially reducing the frequency of audio sampling responsive to the second screen functions that are activated and user actions. For example, if a user has only enabled the Plot Info second screen function, which averages 15 notification instances in a motion picture, maintaining movie map and movie playback synchronization may only require matching 30-40 audio samples.

Synchronization to a playing of a movie comprises creation of acoustic fingerprints and a movie's acoustic database, comparison of the acoustic fingerprint during a playing of a movie to the acoustic database of the movie, establishing synchronization, maintaining synchronization, establishing sync for the first time, and resuming synchronization from a synchronization pause. A preferred synchronization embodiment achieves synchronization to a playing of a movie by implementing advantageous and innovative techniques specifically suited to synchronizing to a playing of a full-length motion picture.

To create an acoustic database for a movie, the audio track of the movie is sampled at a 8 kHz sampling rate. A Fast Fourier Transform (FFT) is performed, every 128 ms, on 1024 bytes of audio data, which produces frequency domain information. In the frequency domain, peak frequencies for 16 frequency ranges are determined (200-300 Hz, 300-400 Hz, 400-500 Hz, 500-600 Hz, 600-700 Hz, 700-800 Hz, 800-900 Hz, 900-1000 Hz, 1000-1200 Hz, 1200-1400 Hz, 1400-1600 Hz, 1600-2000 Hz, 2000-2400 Hz, 2400-2800 Hz, 2800-3200 Hz and 3200-3600 Hz). The array of integer values representing the peak frequencies in each range is then stored in the acoustic database for the movie. To create an individual acoustic fingerprint during playback of the movie, a device's microphone listens to the audio of a movie, which is then processed implementing a methodology similar to, or complimentary to the methodology implemented in the creation of the acoustic database.

As the audio of the movie is processed, 32 consecutive rows of peak frequency information is obtained from the playing of the movie and compared against a first set of 32 rows of data from the acoustic database. To compare against the entire acoustic database, a subsequent set of 32 rows of the database drops the first row of data from the initial set of 32 rows and adds the next row of data. Thus, each new set overlaps 30 rows of data from the previous set.

Each 1.024 seconds a new set of 32 consecutive rows of peak frequency information is obtained from the playing of the movie. The new set drops 8 rows from the previous set and adds the next 8 rows. Thus, each new set of 32 consecutive rows (the new acoustic fingerprint from the playing of the movie) overlaps 16 rows of data from the previous set of 32 consecutive rows. This new acoustic fingerprint is compared to the acoustic database in the same manner described above.

To match an acoustic fingerprint to the acoustic database, each frequency range is given a weight. Frequencies below 1200 Hz have multiplier of 0.2, 1200 to 2000 have multiplier 0.1 and the remainder have multiplier 0.05. A score is calculated as an absolute value of the difference between fingerprint peak frequency in a specific range and the acoustic database peak frequency in the same range. The differences are then multiplied by the weight coefficient and added up for all ranges in all 32 rows of data. The top 256 best matches (lowest scores) are kept as potential matches. Synchronization is established when a first best match of a first set of 256 scores, is followed by a next comparison of a subsequent fingerprint of the movie to the acoustic database of the movie that also yields, within two seconds, a best match to a second set of 256 scores, and is followed by a third comparison of a third fingerprint of the movie to the acoustic database of the movie that also yields, within two seconds, a best match a third set of 256 scores.

Advantageously, in order to minimize false matches, when first attempting to synchronize to the playing of a movie, it is presumed that a user has started the playing of the movie at the beginning of the movie. Thus, the initial attempt at synchronizing to the playing of the movie is limited to the first 256 seconds of the movie (e.g., an initial portion of the movie). In other words, the potential that there could have been a better sequence of 3 matches later in the movie is initially ignored. If synchronization is not established within an initial period of time (e.g., 30 seconds), then the matching process is expanded to cover the entire acoustic database of the movie. It has been found that the most efficient matches occurs at a very beginning of a movie that includes, for example, a production opening logo with a dominant sound track (e.g., music).

To maintain synchronization, it is no longer required that a subsequent comparison yield a best match to a set of 256 best scores. Confirmation of the expected continued synchronization is achieved by a match to any one of the 256 best scores that occur within two seconds of a previous synchronization location in the movie. If none of the 256 best scores is determined within a 2 second window of previous sync point, a previous match is incremented by one 1 second, and a 3 minute synchronization suspend timer is started. If within the 3 minutes that the synchronization suspend timer is counting down there is a single match to a 256 best scores, synchronization is confirmed, and the 3 minute synchronization suspend timer is reset. Otherwise, it is presumed that the movie has been paused, the synchronization attempts are discontinued, and function notification routines are suspended.

During a 3 minutes sync grace period the entire acoustic database is searched, and the current expected synchronization location is abandoned if a sequence of 5 consecutive matches are found. This situation would arise when a user has fast forwarded or skipped to a different location in the movie. From a new confirmed synchronized location in the movie normal synchronization routines are executed.

If synchronization has been paused by either failure to establish synchronization or the user pausing the synchronization, synchronization routines are resumed upon a user activating the pause sync/sync toggle button. Resumption of the synchronization routines first occurs within +/−256 seconds from last confirmed synchronization location (i.e., a location prior to the 3 minute sync suspend period). If synchronization is found within +/−256 seconds from the last confirmed synchronization location, then synchronization proceed as normal. If no synchronization is found within +/−256 seconds from the last confirmed synchronization within a period of 30 seconds, then synchronization is attempted over the entire acoustic database.

It is noted that while certain exemplary methodologies of matching an acoustic fingerprint to the acoustic database are detailed, directly or by incorporation, the synchronization techniques that may be implemented are not limited those explicitly detailed above. Further, and specifically, for example, the sampling rate, the number of frequency ranges, the number or rows of data, the overlap of data, the frequency rate, the score calculation, weight coefficient, the number of matches, the initial portion of the movie, the sync grace period, and other synchronization related techniques, steps, and parameters may be tuned, supplemented, altered, or omitted to suit a great variety of implementations. For example, the 256 best scores parameter detailed above is largely a design choice not materially different than, for example, a 288 best scores parameter. Many variations of the parameters, elements, techniques, and steps included in a particular synchronization embodiment are possible by way of permutation, combination, substitution, deletion, and/or additions.

Attempting synchronization, within the confines of a household, to a movie playing on a primary screen device may be hampered by extraneous audio, sounds, and noises. In addition to the ambient, background, atmospheric audio, sounds, and noises that are present during a playing of a movie, attempting synchronization within a full motion picture often exceeding two hours is conceptually more complex than attempting recognition of, and/or synchronization within, a musical item usually of 2-3 minutes in length that is characterized by an usually distinct acoustic profile.

In those instances when a user elects to skip around within a playing of the movie, synchronization may be facilitated by the availability of capabilities that a user may use to define an approximate area to focus the synchronization attempts. Such user capabilities may include a movie timeline, selection of a portion of the movie (e.g., first second, third, or fourth quarter), and/or the manual imputing of a timecode.

The synchronized display of features and information of a function on a second screen device with a movie playing on a primary screen device are enhanced by the implementation of complementary synchronization methodologies that are synergistically integrated to provide a more effective identification of a play location within the movie. Innovatively, each conceptually differentiated methodology being responsive to and/or tuned to different characteristics of the audio provided by the movie. In one exemplary embodiment, acoustic data and/or a database is generated for those segments of the movie dominated by musicality or special audio effects, separate acoustic data and/or an acoustic database is generated for those segments of the movie dominated by dialog, and an additional acoustic data and/or a database is generated for those segments of the movie dominated by silence. The later involving the use of descriptors, relative volume measurements, and segment definitions indentifying a beginning and ending of the absence of a distinctive audio or silence period.

In a preferred embodiment, complementary synchronization methodologies that are conceptually differentiated and may be synergistically integrated comprises the use of acoustic fingerprint matching in combination with use of speech to text routines that generate a dialogue fingerprint (e.g. convert a portion of dialogue to text). Dialogue fingerprint matching routines compare the spoken dialogue of the movie to a dialogue database comprising the text, or other dialogue information, and associated timing information. While a number of manual, software assisted, and automated methods may be implemented, in a preferred embodiment, customized speech to text software is utilized to create the dialogue database and to capture movie timecode information. Similar routines are utilized to listen for dialogue as the movie is played and convert a portion of the captured dialogue into a dialogue fingerprint.

The following disclosures, exemplary of the references available to one of ordinary skill in the art, are incorporated herein by reference: U.S. Pat. No. 4,181,813 titled "System and method for speech recognition"; U.S. Pat. No. 4,903,305 titled "Method for representing word models for use in speech recognition"; U.S. Pat. No. 5,909,667 titled "Method and apparatus for fast voice selection of error words in dictated text"; U.S. Pat. No. 6,480,823 titled "Speech detection for noisy conditions"; U.S. Pat. No. 7,698,131 titled "Speech recognition system for client devices having differing computing capabilities"; U.S. Pat. No. 8,738,367 titled "Speech signal processing device"; U.S. Pat. No. 8,856,004 titled "Text processing using natural language understanding"; and U.S. Pat. No. 9,195,650 titled "Translating between spoken and written language".

Speech to text or speech recognition generally entails recording the audio dialogue by means of the synchronizing device's microphone and audio processing routines capabilities; contemporaneously or subsequently converting the analog audio signal, usually filtered for unwanted noise and frequency, to digital data; dividing the signal into small segments known as phonemes (phonemes are the building blocks of words in our language (e.g. the "th" sound), analyzing the phonemes against a statistical model database using the Markov Model to translate the spoken words to text. Advanced speech recognition routines may be additionally implemented to account for accents, pronunciation and dialects. Where the device has access directly to the digital component of the movie the digital to analog step, for example, is omitted.

In the case of the dialogue of a motion picture, the transcript of the dialogue, which may be already present in the dialogue database, can be utilized to expedite and facilitate the accurate conversion of dialogue (e.g., what a character in the movie is saying) to text that is directly associated with, or may be used to identify, a location within the playing of the movie.

The use of complementary audio fingerprint and dialogue to text conversion methodologies is particularly advantageous since the matching of an acoustic fingerprint to an acoustic database methodology is particularly well suited for the portions of the movie dominated by musicality or special audio effects, and a matching of a dialogue fingerprint to a dialogue database methodology is particularly well suited for the portions of the movie dominated by dialogue. In synergistically integrating, for example, the audio fingerprint and dialogue fingerprint methodologies; it is advantageous to incorporate routines that assign a confidence indicator to each methodology in a substantially simultaneous matching event. For example, in a segment of the movie dominated by dialogue, the acoustic fingerprint methodology may fail to efficiently and timely achieve synchronization and thus, the particular search of the database may be associated with a low or negative confidence indicator, while a dialogue to text methodology and the resulting search of the dialogue database may be associated with a high confidence synchronization indicator. This enables the synchronization determining routines to, not only address portions of the movie with clearly differentiated music and dialogue characteristics, but to also, for example, since there is an a certain amount of overlap, resolve conflicts inherent in acoustically challenging portions of the movie.

Where the device has access directly to the movie, other information (e.g., subtitle track) that is part of the movie and that is directly accessible by the synchronizing device may be additionally or alternatively used to identify a current play location within the movie.

Because the same speech to text methodology is implemented in both the creation of the movie textual database and the dialogue fingerprint, it is not important, in certain embodiments, that the speech to text routines attempt to determine the correct textual information (e.g. actual words spoken by a character). Item that may be perceived as errors in conventional speech to text routines are advantageous in facilitating synchronization, provided that both the creation of the movie dialogue database and the generation of the dialogue fingerprint produce the same dialogue information (e.g. word errors or data). Thus, in one preferred embodiment, routines, for example, that account for accents, pronunciation and dialects would not be implemented. In a particular embodiment of attempting to synchronize to a location within a playing of a movie, the simpler less accurate, but consistent in the inaccuracies, in converting text to speech routines offer advantages of enhancing information differentiation.

However, a dialogue database comprising an accurate textual transcript of the dialogue associated with frame accurate movie timecode information can support the implementation of multiple functions. Innovatively, a dialogue database comprising an accurate textual transcript of the dialogue associated with frame accurate movie location timecode can be used to support both the synchronization methodologies and the dialogue display detailed in U.S. Pat. No. 6,408,128 "Replaying with supplementary information a segment of a video", and in U.S. publication 20150093093 titled "Second Screen Subtitles Function", which are incorporated herein by reference.

The U.S. Pat. No. 6,408,128 patent discloses, for example, a method of replaying a portion of a video comprising the steps of: receiving, during a playing of a video, a replay request to replay a portion of a video; storing a request location of the playing of the video responsive to the replay request; skipping, responsive to the replay request, the video to a replay location that is responsive a preestablished replay preference; enabling a playing of subtitles; playing the video and the subtitles from the replay location; and discontinuing the playing of subtitles responsive to the request location.

The 20150093093 publication discloses, for example, a video information display method comprising: downloading, over a communications network and to a memory of a second screen device, a subset of subtitles, the subset of subtitles corresponding to preselected portions of a dialogue of a video; receiving audio information principally from a playing of the video on a primary screen device; generating an acoustic fingerprint responsive to the received audio information; establishing, responsive to the acoustic fingerprint, a synchronization to the playing of the video on the primary screen device; and displaying the subset of subtitles on the second screen device responsive to a time period offset synchronization to the video playing on the primary screen device, the time period offset synchronization being responsive to a user's time period offset preference, whereby the display of the subset of subtitles on the second screen device is intermittent and lags a contemporaneous playing of the video on the primary screen device.

The use of the dialogue and timecode information that may have been created to support, for example, the "What" function and/or the subtitle delay function is innovatively and advantageously utilized to enhance the synchronization of the display, on a second screen, of movie related information during a playing of the movie on a primary screen.

Figure 9B:
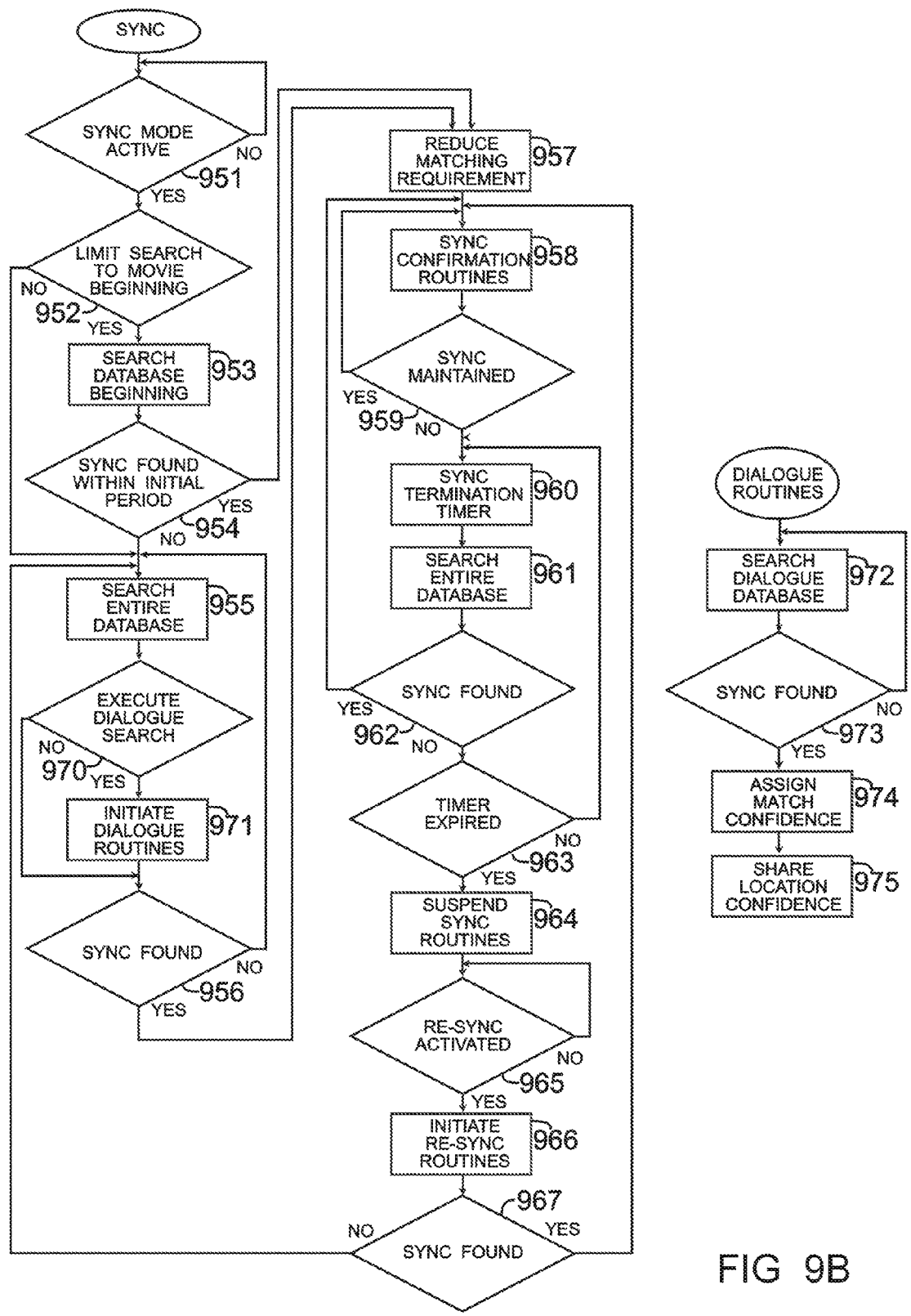
FIG. 9B is a flow chart summarizing a method of synchronizing the display of movie related information on a second screen device with a playing of the movie on a primary screen device.

FIG. 9B is a flow chart summarizing a method of synchronizing the display of movie related information on a second screen device with a playing of the movie on a primary screen device. In the activation of the synchronization routines is responsive to a user selection of the Sync mode 951 and are not activated if the user selects the Lists and Games mode of the application. Advantageously, upon first activating the Sync mode 951, the initial attempts at synchronizing to the playing of the movie is limited to searching 952 for a match in that portion of the acoustic database corresponding to the beginning portion of the movie 953. Alternatively, the initial attempts at synchronizing to the playing of the movie are not limited to that portion of the acoustic database corresponding to the beginning portion of the movie.

If synchronization is determined within an initial period of time 954, then the synchronization routines are made more efficient 957, and synchronization confirmation routines are enabled 958. With respect to synchronization, the term "determined" should be understood to cover the meaning of the terms "determined", "found", "established", "acquired", "presumed", and the like.

If synchronization is not determined within an initial period of time 954, then the matching process is expanded to cover, substantially or materially, the entire acoustic database of the movie 955. If synchronization is not determined 956 when the matching process covers, substantially or materially, the entire acoustic database of the movie 955, the matching process continues 955 until terminated by, for example, another function, user action, or time-out routine. If Sync is determined 956, following the matching process is expanded to cover, substantially or materially, the entire acoustic database, then efficient synchronization routines are made responsive to the established synchronization (e.g., limited to a period within the confirmed synchronization location) 957, and synchronization confirmation routines are enabled 958.

If continued synchronization is confirmed 959, then the synchronization confirmation routines continue to be executed 958. If continued synchronization is not confirmed 959, then synchronization suspend timer routine is initiated 960 responsive to a synchronization grace period and the acoustic database is searched 961. If synchronization is determined 962, then synchronization confirmation routines are then executed 958. If synchronization has not been found 962, and if the predefined synchronization suspend timer has not expired 963, then, responsive to the running synchronization timer 960, search of the acoustic database continues 961. If synchronization has not been found 962, and if the predefined synchronization suspend timer has expired 963, then synchronization routines are suspended 964.

If, for example, a user requests that synchronization routines be activated 965, then specific re-synchronization routines are executed 966 that are responsive to a previously confirmed synchronization location. In other words, if subsequent to an initial identifying of a location within the movie, and subsequent to a suspension of a searching of the acoustic database and of the dialogue database, a resumption of the searching of the acoustic database and of the dialogue database is limited to a portion of the databases that is responsive to a last identified location within the movie. If the re-synchronization routines 966 acquire synchronization 967, then synchronization confirmation routines are executed 958. If the re-synchronization routines 966 fail to acquire synchronization 967, then a search of the acoustic database routines are executed 955, and, if a dialogue search is to be performed 970, the dialogue search routines are executed.

In an embodiment that implements conceptually differentiated and complementary synchronization methodologies that are synergistically integrated to provide a more effective identification of a play location within the movie, the execution of the routines of a complementary or secondary synchronization methodology may be integrated in parallel and/or sequentially with the routines of a primary synchronization methodology, and may integrated in one or more places within the sequence of routines of the primary synchronization methodology.

The flow chart of FIG. 9B illustrates an example of a potential integration of a parallel sequence of dialogue synchronization routines 971-975 following a failure of the acoustic synchronization routines within the initial period 954. If dialogue synchronization routines are to be executed 970, then, in parallel with the search of the entire acoustic database 955, the dialogue synchronization routines 971-975 are executed. Dialogue synchronization routines comprise initiating the dialogue routines 971 and searching the dialogue database 972. If synchronization is determined 973, then, optionally, a match confidence rating is associated with the identified location in the movie 974, and the information is passed to the primary synchronization methodology 975 to determine if synchronization has been found 956. If synchronization is not initially determined 973 by the dialogue synchronization routine, the process may be continued 972, suspended, or, responsive to the dialogue search routines, terminated.

The synchronization routines 971-975 of a secondary methodology may be integrated at any point or points within the synchronization routines of the primary methodology. Further, the synchronization routines 971-975 of a secondary methodology may precede initiation of the synchronization routines of the primary methodology. For example, in a sequential integration rather than a parallel integration, the dialogue synchronization routines 971-975 are immediately executed prior to, and preempt, the initial limited search of the acoustic database 953. Alternatively, the dialogue synchronization routines 971-975 are implemented immediately following initial limited search of the acoustic database 953 and prior to the matching process being expanded to cover, substantially or materially, the entire acoustic database of the movie 955

An exemplary second screen device embodiment comprises a second screen device performing the steps of: downloading, from a remote information provider, a movie map comprising, for each of a plurality of an application's functions (e.g., Dilemmas, SuperFan, Recipes), a plurality of information items (e.g., images, write-ups, recipes) relating to depictions within a movie and each information item being associated with a notification location within the movie (e.g., a location during the playing of the movie where a notification that information is available is displayed in the second screen device), the movie map further comprising an acoustic database and a dialogue database (e.g., databases that enable matching an acoustic fingerprint and dialogue fingerprint to identify a current play location within the movie); generating an acoustic fingerprint that is responsive to a playing of a movie on a primary screen device; searching, responsive to the acoustic fingerprint, a portion of an acoustic database corresponding to a beginning portion of the movie; subsequently searching, responsive to the acoustic fingerprint, the acoustic database; generating a dialogue fingerprint (e.g., capturing audio and using speech to text routines to obtain searchable word/textual information) that is responsive to the playing of the movie on the primary screen device (e.g., a television); searching, responsive to the dialogue fingerprint, a dialogue database; identifying, responsive to the searching of the acoustic database and responsive to the searching of the dialogue database, a location within the movie; displaying, responsive to the identified location, an indication that information is available; and displaying, responsive to a request for information, an information item that is associated with the identified location.

Figure 10:
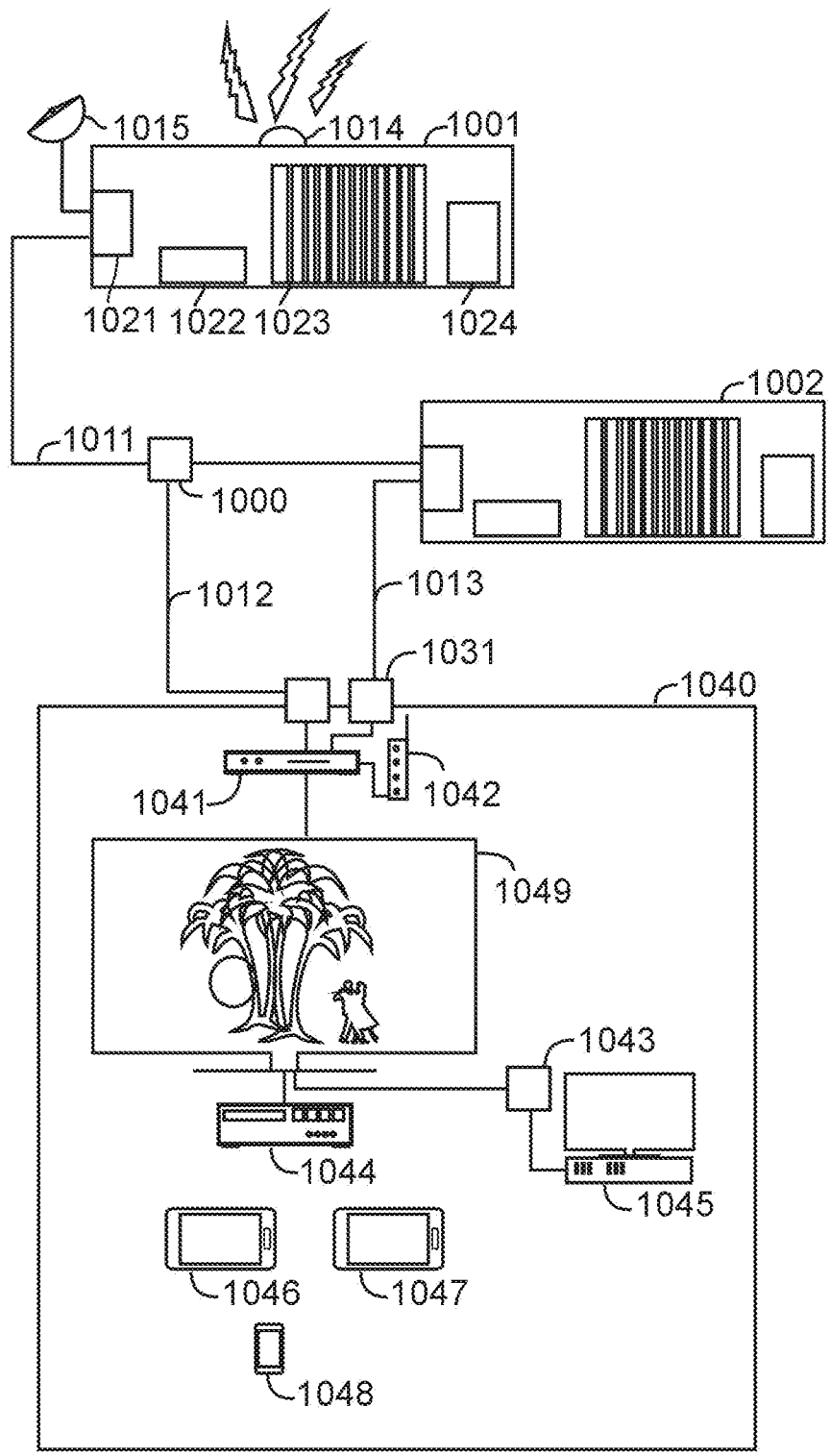
FIG. 10 is a schematic diagram of a communications, systems, and devices infrastructure.

FIG. 10 is a schematic diagram of a communications, systems, and devices infrastructure. In an exemplary embodiment of the communications, systems, and devices infrastructure, participants comprise any number of movie 1001 and/or information 1002 providers, and end-users systems 1040. A provider of movie and/or information 1001-1002 is not limited to any combination of movie and/or information services; and the services, while complementary, may be proprietary, exclusive, and independent of the services of other providers. Each participant, whether principally a provider 1001-1002 or end user 1040 is able to retrieve and transmit movie and/or information from and to any other participant.

The delivery of movie and services are herein intended to be deployable by a variety of possible communications systems, networks, infrastructures, computer and server networks, and system configurations. FIG. 10 suggests a plurality of systems, networks, infrastructures, and system configurations that may be implemented. Shown are wired and non-wired communications networks using, for example, one or a hybrid combination of fiber optic 1011, coaxial cable 1012, twisted copper wire 1013, cellular 1014, and/or satellite 1015.

A movie provider, for example 1001, comprises: i) communications technologies 1011 for establishing a plurality of movie and communications streams to a plurality of end-users 1040 to enable the uploading and/or downloading of information and/or movie content; ii) processing hardware and software 1022 for retrieving an end user's movie preferences, content preferences, function preferences and requests, search terms and search requests, and for processing the user's movie preferences, content preferences, function preferences and requests, in-movie services, synchronization data, search terms and search requests, and supporting the game functions; iii) mass storage random access memory devices 1023 for storing and retrieving movie maps and information items supporting the application functions such as the Dilemma, Movie Master, and Music games, and/or for storing a moviebase comprising a plurality of any combination of movies, information items supporting the application functions and services, synchronization data and databases, and/or information; and iv) processing hardware and software 1024 for maintaining accounting and support services in connection with movie and/or information services provided.

Movie providers may be further categorized according to the functions served and/or the extent and character of the information and moviebase maintained. Movie services providers 1001, e.g., a cable companies, may be capable of providing a greater variety of services than for example information providers 1002, e.g., websites. Movie and information services available over the internet are suggestive of the wide range of multimedia and information configurations that are possible.

A user's system access to the resources of a movie services provider 1001-1002 need not be direct. A requested movie, function, features, service, and/or request may be streamed or downloaded, in real time or non-real-time, to a services provider that may be more economically accessible to the intended user. Within the network 1000, some movie services provider may not directly provide any services to users, but act as centralized movie originators or depositories for other services providers.

In one of many possible embodiments, an end-user movie system infrastructure 1040 acquires access to the network 1000 and the various services providers 1001-1002 via a communications device 1031, e.g., cable distribution box, satellite dish. An end-users movie system infrastructure 1040 comprises a great variety of systems, communications devices, computing devices, and screens 1041-1049 capable of processing information and instructions executable by a processor executing the application, functions, and features disclosed herein. Principally communications devices include, for example, a modem 1041, e.g., cable modem; an internal communications device 1042, e.g., wired and wireless router; and a network/wireless extender 1043. The end-user's communication interfaces such as Wi-Fi, Ethernet, cellular, 4G LTE, HDMI, Optical, G.hn, and USB facilitate communications among the end-users various computing/communicating systems and multi-screen combinations 1044-1049, which include, for example, set top box 1044, e.g., cable box; PC/monitor 1045; tablets 1046-1047; smartphone 1048; and television 1049. An end user system may be generally categorized as principally a communications device, a computing device, or a screen. However, systems, such as tablets 1046-1047, smartphones 1048, and portable/notebook computers 1045, comprise all three functions and are capable of performing the application's methods and steps. Further, a television system 1049 may include computing, storage, and communications capabilities that may otherwise be separately provided in a set-top box or television media accessory 1044.

Communications may be established by any of a variety of wired or wireless communications networks including, for example, Wi-Fi and cellular (e.g., 4G LTE) communications networks. Thus, a computing system need not be directly or indirectly connected by wire to a screen 1049. For example, a computing device 1045 may be connected to a second screen 1049 via a communications port 1043. The communications port may be of varying degrees of intelligence and capabilities, it may serve to boost or manage the signal, or have no other purpose than to serve as a convenient outlet in which to plug and unplug devices.

The particular location of an end-user's systems, devices, screens, subsystems, or components are not limited herein to any particular location or combination of locations. A variety of configurations are possible to meet the various needs of the end user at any particular time. In a preferred embodiment an end-user configuration comprises a primary display system 1049, one or multiple secondary display systems such as a personal computer or portable computer 1045, tablets 1046-1047, and/or smartphone 1048.

An application software appropriate for the communications infrastructure may reside directly or indirectly in a primary display system, secondary display system (e.g., device), and/or in separate system in communication with the primary display system and secondary display system. In stand alone modes or function of the application, a secondary display system (e.g., second screen device) operates as the primary system.

Multi-system combinations include, for example, television 1049 and smartphone 1048, pc/laptop 1045 and smartphone 1048, television 1049 and pc/laptop 1045, and television 1049 and multiple tablets 1046-1047. Multi-system combinations need not be limited to a primary system and a secondary system. For example, a second system such as a tablet 1046 may provide a second system experience with respect to a primary system such a television 1049, and with respect to another second system such as a second tablet 1047.

Multi-system usage modes may be broadly categorized as disruptive (e.g., multi-tasking unrelated content) or complementary; sequential (e.g., usage of a primary system is followed by usage of a second system) or simultaneous; planned (e.g., expected usage of a second system as part of the viewing of the content on a primary system) or spontaneous; and/or dependent (e.g., highly integrated with content on the primary system) or independent. However, a multi-system usage may be, for example, both disruptive and complementary. Disruptive, for example, in the sense that the linear movie experience is interrupted, while at the same time complementary in the sense that information is provided that the user would deem advantageous in enhancing the movie experience. In the Sync mode embodiments a second system's user interface provides interactive capabilities that are highly tailored and synergistically integrated with the specific content displayed on a primary system. By contrast, in Lists mode and in certain Games mode embodiments a second system's software application (e.g., iPad application) provides capabilities that are independent of a primary system. Further, Lists mode and Games mode embodiments do not limit where a user may enjoy the application various functions.

Implementation of the novel features detailed herein are not confined to the communications infrastructure, services providers, and end-user systems detailed with respect to FIG. 10. As is detailed in the '325 publication, a great many alternate or complementary systems, devices, components, elements, and services may be utilized.

It is noted that while certain exemplary embodiments are detailed, directly or by incorporation, the inventions are not limited to the exemplary embodiment, information, or features utilized in any mode, function, and/or specific embodiment. An advantage of a particular embodiment, mode, function, feature, information, or element is not necessarily limited to that particular embodiment, mode, function, feature, information, or element. While most of the FIGS illustrate the use of a tablet (e.g., an iPad), an alternate preferred embodiment is based on the use of a smartphone (e.g., iPhone) which has downloaded, in a conventional manner, the application comprising substantially all of the features of each function.

A remote web server that processes API requests from a user's device, a website server, a smartphone, a tablet, a hybrid device, a laptop, and a computing communications device, each may comprise the necessary processing, memory, and communications capabilities required to fully operate the application's various functions and methodologies disclosed herein. Alternatively, for example, a remote services provider may perform most of the processing and the second display system (second screen device) largely acting as a display device, transmitting user requests and synchronizing data to the remote services provider for processing. In an exemplary embodiment analogous to that of a website server, a movie map, acoustic database, dialogue database, are not downloaded in their entirety to the second screen device, rather, primarily, information be displayed is transmitted to the second screen.

For example, an exemplary synchronization methodology comprises the steps of generating, with a second screen device, an acoustic fingerprint that is responsive to a playing of a movie on a primary screen device; searching, responsive to the acoustic fingerprint, a portion of an acoustic database corresponding to a beginning portion of the movie; subsequently searching, responsive to the acoustic fingerprint, the acoustic database; generating, with the second screen device, dialogue information that is responsive to the playing of the movie on the primary screen device; searching, responsive to the dialogue information, a dialogue database; identifying, responsive to the searching of the acoustic database and responsive to the searching of the dialogue database, a location within the movie; displaying, on the second screen device and responsive to the identified location, an indication that information is available; and displaying, on the second screen device and responsive to a request for information, an information item that is responsive to the displayed indication that information is available.

In such an embodiment, the steps of, for example, searching a portion of an acoustic database, subsequently searching the acoustic database, and searching a dialogue database may be performed by a remote information provider, or by the second screen device following a downloading, by the second screen device, of the acoustic database and the dialogue database. In the case that the searching of the databases is performed by the remote information provider, an acoustic fingerprint generated by the second screen device need not be more than a captured portion of audio. In certain embodiments, the step of, for example, generating an acoustic fingerprint may be performed by a remote information provider rather than by the second screen device. In an alternate embodiment, all of the steps may be performed by an application installed on a primary screen device (e.g., a television) or a device (e.g., Apple TV) directly displaying content on the primary screen device.

Many variations of the elements included in a particular embodiment are possible by way of permutation, combination, substitution, deletion, and/or additions. A function may be enhanced by the addition of features and information elements (e.g., segment definitions, frame identification, play location identification, image and thumbnail identifiers, write-ups, and linkages) detailed with respect to another function.

The information items supporting functions or features of a function is not limited to the information explicitly disclosed herein. The information items supporting a specific function or specific feature of a function also comprises the information that is implicit, that is logically necessary to support the feature, and/or that is analogous to disclosed information supporting a different function or a different feature of a function. A movie map addressing the functions and features illustrated or detailed herein comprises a great database of additional information that may be mined to support the various functions, features, and playback functions.

The teachings disclosed herein, directly and indirectly by, for example, incorporation, are intended to show a variety of architectures, services, capabilities, systems, methods, and inventive elements which are combined and may be combined to suit particular embodiments. While an object of incorporation is to provide additional detail explanation, the synergies among and between the various inventive elements is a significant feature of and object of incorporation. A feature, structure, method, or step that is disclosed with respect to a certain mode or function may be similarly implemented in another mode and function.

The incorporation by reference at a specific place within the specification is not intended to limit the extent to which the reference is incorporated, or the manner in which it may be integrated. Where a teaching may be deemed to be at cross purposes, or otherwise incompatible, with some other teaching, it ought to be understood as a possible alternative to be utilized as a particular preferred embodiment may require.

While elements of the inventions have been detailed in conjunction with specific embodiments thereof, it is evident that many alternatives, modifications and variations are possible and will be apparent to those skilled in the art in light of the foregoing descriptions. Accordingly, it is intended to embrace all such alternatives, modifications, variations, and combinations as fall within the spirit and broad scope of the specification. The teachings that have been cited and incorporated herein are offered by way of example, and not limitation, of the underlying foundation of knowledge and skill that is available to a person of ordinary skill in the art. Many of the features, components, and methods found in the art may be incorporated, as suggested herein, in a preferred embodiment; and since other modifications and changes varied to fit particular requirements and environments will be apparent to those skilled in the art, the inventions are not limited to the embodiments set forth or suggested herein. It is to be understood that the inventions are not limited thereby. It is also to be understood that the specific details shown are merely illustrative, and that the inventions may be carried out in other ways without departing from the broad spirit and scope of the specification.

What is claimed is:

1. A method comprising the steps of:
generating, with a second screen device, an acoustic fingerprint that is responsive to a playing of a movie on a primary screen device;
searching, responsive to the generating of the acoustic fingerprint, an acoustic database;
identifying, responsive to the searching of the acoustic database, a location within the movie;
displaying, on the second screen device, an indication that information is available, the information relating to the identified location within the movie, the displaying of the indication that information is available being responsive to a predefined playing time separation from a previous display of an indication that information is available, the displaying being further responsive to a displaying of a greater proportion of indications that information is available for one movie related information function than a displaying of indications that information is available for another movie related information function, the one movie related information function comprising fewer items of information than the another movie related information function;
receiving a request for information, the request being responsive to the displayed indication that information is available; and
displaying, on the second screen device, an item of information that is responsive to the request for information.

2. The method of claim 1 wherein the displaying of a greater proportion of indications that information is available for one movie related information function than a displaying of indications that information is available for another movie related information function is responsive to a selection of one of a plurality of information item display presets; wherein a selected information item display preset is associated with a preset descriptor; and wherein the indication that information is available identifies a movie related information function.

3. The method of claim 1 wherein the predefined playing time separation is responsive to a user's preference.

4. The method of claim 1 wherein the predefined playing time separation is responsive to a user's preference; and wherein the displaying of a greater proportion of indications that information is available for one movie related information function than a displaying of indications that information is available for another movie related information function is responsive to a selection of one of a plurality of information item display presets.

5. The method of claim 1 wherein the displaying of a greater proportion of indications that information is available for one movie related information function than a displaying of indications that information is available for another movie related information function is responsive to a selection of one of a plurality of information item display presets; and wherein the indication that information is available identifies a movie related information function.

6. The method of claim 1 wherein the displaying of a greater proportion of indications that information is available for one movie related information function than a displaying of indications that information is available for another movie related information function is responsive to a selection of one of a plurality of information item display presets; and wherein a selected information item display preset is associated with a preset descriptor.

7. The method of claim 1 wherein the predefined playing time separation is responsive to a system default.

8. A method comprising the steps of:
generating, with a second screen device, an acoustic fingerprint that is responsive to a playing of a movie on a primary screen device;
searching, responsive to the generating of the acoustic fingerprint, an acoustic database;
identifying, responsive to the searching of the acoustic database, a location within the movie;
displaying, on the second screen device, an item of information that relates to the identified location within the movie, the displaying being responsive to a predefined playing time separation from a previous display of an item of information, and the displaying being further responsive to a displaying of a greater proportion of items of information of one movie related information function than a displaying of items of information of another movie related information function, the one movie related information function comprising fewer items of information than the another movie related information function.

9. The method of claim 8 wherein the displaying of a greater proportion of items of information of one movie related information function than a displaying of items of information of another movie related information function is responsive to a selection of one of a plurality of information item display presets; and wherein a selected information item display preset is associated with a preset descriptor.

10. The method of claim 8 wherein the displaying of a greater proportion of items of information of one movie related information function than a displaying of items of information of another movie related information function is responsive to a selection of one of a plurality of information item display presets.

11. The method of claim 8 wherein the predefined playing time separation is responsive to a user's preference; and wherein the displaying of a greater proportion of items of information of one movie related information function than a displaying of items of information of another movie related information function is responsive to a selection of one of a plurality of information item display presets.

12. The method of claim 8 wherein the predefined playing time separation is responsive to a system default.

13. A second screen device comprising:
a communications interface capable of downloading, over a communications network from a remote information provider and to a memory of the second screen device, an acoustic database, and a plurality of items of information each associated with a location within a movie and with one of a plurality of movie related information functions;

an integrated microphone, in the second screen device, capable of receiving audio information from a playing of the movie on a primary screen device; and a processor, in the second screen device, executing an application capable of generating an acoustic fingerprint that is responsive to the playing of the movie on the primary screen device; capable of searching, responsive to the generating of the acoustic fingerprint, an acoustic database; capable of identifying, responsive to a searching of the acoustic database, a location within the movie; and capable of causing, on a display screen of the second screen device, a displaying of an item of information that is responsive to the identified location within the movie, the displaying being responsive to a predefined playing time separation from a previous display of an item of information, and the displaying being further responsive to a displaying of a greater proportion of items of information of one movie related information function than a displaying of items of information of another movie related information function, the one movie related information function comprising fewer items of information than the another movie related information function.

14. The second screen device of claim 13 wherein the displaying of a greater proportion of items of information of one movie related information function than the displaying of items of information of another movie related information function is responsive to a selection of one of a plurality of information item display presets; and wherein a selected information item display preset is associated with a preset descriptor.

15. The second screen device of claim 13 wherein the displaying of a greater proportion of items of information of one movie related information function than the displaying of items of information of another movie related information function is responsive to a selection of one of a plurality of information item display presets.

16. The second screen device of claim 13 wherein the predefined playing time separation is responsive to a system default.

17. The second screen device of claim 13 wherein the predefined playing time separation is responsive to a user's preference.

18. The second screen device of claim 13 wherein the displaying of a greater proportion of items of information of one movie related information function than the displaying of items of information of another movie related information function is responsive to the user's selection of an information item display preset.

19. The second screen device of claim 13 wherein the displaying of an item of information is further responsive to a request for information that follows an indication that information is available.

20. The second screen device of claim 13 wherein the displaying of an item of information is further responsive to a request for information that follows an indication that information is available; and the indication that information is available identifies a movie related information function.

* * * * *